US010911926B2

(12) United States Patent
Pellegrini et al.

(10) Patent No.: US 10,911,926 B2
(45) Date of Patent: Feb. 2, 2021

(54) SYSTEMS AND METHODS FOR EMERGENCY DATA INTEGRATION

(71) Applicant: RapidSOS, Inc., New York, NY (US)

(72) Inventors: William Pellegrini, Graham, WA (US); Lucas Richard Eager Leavitt, Forest Hill, NY (US); BingJun Sy, Flushing, NY (US); Henry Katz, Brookline, MA (US); Gabriel Mahoney, Brooklyn, NY (US); Andrew Hwang, Brooklyn, NY (US); Zvika Ferentz, Rye Brook, NY (US); Riccardo Pellegrini, New York, NY (US); Angela Lynn Orthmeyer, Brooklyn, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 16/740,207

(22) Filed: Jan. 10, 2020

(65) Prior Publication Data
US 2020/0314623 A1 Oct. 1, 2020

Related U.S. Application Data

(60) Provisional application No. 62/946,961, filed on Dec. 11, 2019, provisional application No. 62/926,466, (Continued)

(51) Int. Cl.
*H04W 4/90* (2018.01)
*H04W 4/021* (2018.01)
(Continued)

(52) U.S. Cl.
CPC .............. *H04W 4/90* (2018.02); *G06F 16/29* (2019.01); *G06Q 50/265* (2013.01);
(Continued)

(58) Field of Classification Search
CPC ....... H04W 4/02; H04W 4/023; H04W 4/024; H04W 4/025; H04W 4/029; H04W 4/04;
(Continued)

(56) References Cited

U.S. PATENT DOCUMENTS 5,379,337 A 1/1995 Castillo et al.
5,479,482 A 12/1995 Grimes
(Continued)

FOREIGN PATENT DOCUMENTS

CA 2662606 A1 10/2009
CA 2697986 A1 9/2010
(Continued)

OTHER PUBLICATIONS

Abel et al. Semantics + Filtering + Search = Twitcident exploring information in social web streams. HT'12—Proceedings of 23rd ACM Conference on Hypertext and Social Media (10 pgs) (Jun. 25-28, 2012).

(Continued)

*Primary Examiner* — Jean A Gelin
(74) *Attorney, Agent, or Firm* — Wilson Sonsini Goodrich & Rosati

(57) ABSTRACT

A disclosed apparatus obtains emergency data for multiple device types from a plurality of emergency data sources and provides a jurisdictional map view to a plurality of emergency network entities, where each emergency network entity corresponds to a given geographic boundary. The jurisdictional map view corresponds to a respective emergency network entity's geographic boundary. The apparatus determines portions of the emergency data corresponding to emergencies occurring within each respective emergency network entity geographic boundary, and provides location indicators within each respective jurisdictional map view, with each location indicator corresponding to an emergency.

28 Claims, 22 Drawing Sheets

Related U.S. Application Data filed on Oct. 26, 2019, provisional application No. 62/826,680, filed on Mar. 29, 2019.

(51) Int. Cl.
| | |
|---|---|
| *G06F 16/29* | (2019.01) |
| *G06Q 50/26* | (2012.01) |
| *H04W 76/15* | (2018.01) |
| *H04W 80/06* | (2009.01) |

(52) U.S. Cl.
CPC .......... *H04W 4/021* (2013.01); *H04W 76/15* (2018.02); *H04W 80/06* (2013.01)

(58) Field of Classification Search
CPC ......... H04W 4/90; H04W 8/10; H04W 76/50; H04W 64/00; H04W 64/003; H04W 64/006
See application file for complete search history.

(56) References Cited

U.S. PATENT DOCUMENTS

| | | | |
|---|---|---|---|
| 5,563,931 A | 10/1996 | Bishop et al. | |
| 5,596,625 A | 1/1997 | Leblanc | |
| 5,710,803 A | 1/1998 | Kowal et al. | |
| 5,742,666 A | 4/1998 | Alpert | |
| 6,014,555 A | 1/2000 | Tendler | |
| 6,133,853 A | 10/2000 | Obradovich et al. | |
| 6,249,674 B1 | 6/2001 | Verdonk | |
| 6,252,943 B1 | 6/2001 | Johnson et al. | |
| 6,256,489 B1 | 7/2001 | Lichter et al. | |
| 6,363,138 B1 | 3/2002 | Aprile | |
| 6,459,782 B1 | 10/2002 | Bedrosian et al. | |
| 6,477,362 B1 | 11/2002 | Raith et al. | |
| 6,502,030 B2 | 12/2002 | Hilleary | |
| 6,510,315 B1 | 1/2003 | Arnson | |
| 6,556,816 B1 | 4/2003 | Gafrick et al. | |
| 6,571,092 B2 | 5/2003 | Faccin et al. | |
| 6,574,323 B1 | 6/2003 | Manuel et al. | |
| 6,587,545 B1 | 7/2003 | Antonucci et al. | |
| 6,594,666 B1 | 7/2003 | Biswas et al. | |
| 6,600,812 B1 | 7/2003 | Gentillin et al. | |
| 6,628,933 B1 | 9/2003 | Humes | |
| 6,680,998 B1 | 1/2004 | Bell et al. | |
| 6,707,421 B1 | 3/2004 | Drury et al. | |
| 6,731,610 B2 | 5/2004 | Sajikawa et al. | |
| 6,993,118 B2 | 1/2006 | Antonucci et al. | |
| 7,054,611 B2 | 5/2006 | Eisner et al. | |
| 7,058,385 B2 | 6/2006 | Lauper | |
| 7,177,400 B2 | 2/2007 | Eisner et al. | |
| 7,224,773 B2 | 5/2007 | Croak et al. | |
| 7,271,704 B2 | 9/2007 | McSheffrey et al. | |
| 7,313,402 B1 | 12/2007 | Rahman | |
| 7,324,801 B2 | 1/2008 | Droste et al. | |
| 7,349,706 B2 | 3/2008 | Kim et al. | |
| 7,409,044 B2 | 8/2008 | Leduc | |
| 7,436,938 B2 | 10/2008 | Savaglio et al. | |
| 7,437,143 B1 | 10/2008 | Williams | |
| 7,469,138 B2 | 12/2008 | Dayar et al. | |
| 7,483,519 B2 | 1/2009 | Binning | |
| 7,519,351 B2 | 4/2009 | Malone et al. | |
| 7,519,372 B2 | 4/2009 | MacDonald et al. | |
| 7,548,158 B2 | 6/2009 | Titus et al. | |
| 7,565,131 B2 | 7/2009 | Rollender | |
| 7,646,854 B2 | 1/2010 | Anderson | |
| 7,676,215 B2 | 3/2010 | Chin et al. | |
| 7,684,782 B2 | 3/2010 | Ashley, Jr. et al. | |
| 7,848,733 B2 | 12/2010 | Bull et al. | |
| 7,937,067 B2 | 5/2011 | Maier et al. | |
| 7,949,326 B2 | 5/2011 | Gallagher et al. | |
| 8,009,810 B2 | 8/2011 | Seidberg et al. | |
| 8,041,335 B2 | 10/2011 | Khetawat et al. | |
| 8,041,341 B1 | 10/2011 | Malackowski et al. | |
| 8,045,954 B2 | 10/2011 | Barbeau et al. | |
| 8,068,881 B2 | 11/2011 | Schrager | |
| 8,102,972 B2 | 1/2012 | Poremba | |
| 8,126,424 B2 | 2/2012 | Piett et al. | |
| 8,150,367 B1 | 4/2012 | Malladi et al. | |
| 8,165,560 B2 | 4/2012 | Stenquist | |
| 8,165,562 B2 | 4/2012 | Piett et al. | |
| 8,185,087 B2 | 5/2012 | Mitchell, Jr. et al. | |
| 8,195,121 B2 | 6/2012 | Dunn et al. | |
| 8,219,135 B2 | 7/2012 | De Amorim et al. | |
| 8,244,205 B2 | 8/2012 | Wu | |
| 8,249,546 B1 | 8/2012 | Shah et al. | |
| 8,249,547 B1 | 8/2012 | Fellner | |
| 8,289,953 B2 | 10/2012 | Ray et al. | |
| 8,306,501 B2 | 11/2012 | Moodbidri et al. | |
| 8,326,260 B1 | 12/2012 | Bradish et al. | |
| 8,369,488 B2 | 2/2013 | Sennett et al. | |
| 8,396,970 B2 * | 3/2013 | Black | G06F 9/5027 709/226 |
| 8,401,565 B2 | 3/2013 | Sandberg et al. | |
| 8,417,090 B2 | 4/2013 | Fleming | |
| 8,417,212 B2 | 4/2013 | Cepuran et al. | |
| 8,442,481 B2 | 5/2013 | Maier et al. | |
| 8,442,482 B2 | 5/2013 | Maier et al. | |
| 8,472,973 B2 | 6/2013 | Lin et al. | |
| 8,484,352 B2 | 7/2013 | Piett et al. | |
| 8,489,062 B2 | 7/2013 | Ray et al. | |
| 8,494,868 B2 | 7/2013 | Saalsaa | |
| 8,509,729 B2 | 8/2013 | Shaw | |
| 8,516,122 B2 | 8/2013 | Piett et al. | |
| 8,538,370 B2 | 9/2013 | Ray et al. | |
| 8,538,468 B2 | 9/2013 | Daly | |
| 8,594,015 B2 | 11/2013 | Dunn et al. | |
| 8,606,218 B2 | 12/2013 | Ray et al. | |
| 8,625,578 B2 | 1/2014 | Roy et al. | |
| 8,626,112 B2 | 1/2014 | Ray et al. | |
| 8,630,609 B2 | 1/2014 | Ray et al. | |
| 8,644,301 B2 | 2/2014 | Tamhankar et al. | |
| 8,682,279 B2 | 3/2014 | Rudolf et al. | |
| 8,682,281 B2 | 3/2014 | Dunn et al. | |
| 8,682,286 B2 | 3/2014 | Dickinson et al. | |
| 8,712,366 B2 | 4/2014 | Greene et al. | |
| 8,747,336 B2 | 6/2014 | Tran | |
| 8,751,265 B2 | 6/2014 | Piett et al. | |
| 8,755,767 B2 | 6/2014 | Maier et al. | |
| 8,760,290 B2 | 6/2014 | Piett et al. | |
| 8,811,935 B2 | 8/2014 | Faccin et al. | |
| 8,825,687 B2 | 9/2014 | Marceau et al. | |
| 8,848,877 B2 | 9/2014 | Seidberg et al. | |
| 8,866,606 B1 | 10/2014 | Will et al. | |
| 8,868,028 B1 | 10/2014 | Kaltsukis | |
| 8,880,021 B2 | 11/2014 | Hawkins | |
| 8,890,685 B1 | 11/2014 | Sookman et al. | |
| 8,918,075 B2 | 12/2014 | Maier et al. | |
| 8,948,732 B1 | 2/2015 | Negahban et al. | |
| 8,971,839 B2 | 3/2015 | Hong | |
| 8,984,143 B2 | 3/2015 | Serra et al. | |
| 9,008,078 B2 | 4/2015 | Kamdar et al. | |
| 9,014,657 B2 | 4/2015 | Rohde et al. | |
| 9,019,870 B2 | 4/2015 | Khan et al. | |
| 9,071,643 B2 | 6/2015 | Saito et al. | |
| 9,077,676 B2 | 7/2015 | Price et al. | |
| 9,078,092 B2 | 7/2015 | Piett et al. | |
| 9,094,816 B2 | 7/2015 | Maier et al. | |
| 9,167,379 B1 | 10/2015 | Hamilton et al. | |
| 9,244,922 B2 | 1/2016 | Marceau et al. | |
| 9,258,680 B2 | 2/2016 | Drucker | |
| 9,277,389 B2 | 3/2016 | Saito et al. | |
| 9,351,142 B2 | 5/2016 | Basore et al. | |
| 9,369,847 B2 | 6/2016 | Borghei | |
| 9,384,491 B1 | 7/2016 | Briggs et al. | |
| 9,402,159 B1 | 7/2016 | Self et al. | |
| 9,408,051 B2 | 8/2016 | Finney et al. | |
| 9,420,099 B1 | 8/2016 | Krishnan et al. | |
| 9,497,585 B1 | 11/2016 | Cooley et al. | |
| 9,503,876 B2 | 11/2016 | Saito et al. | |
| 9,544,750 B1 | 1/2017 | Self et al. | |
| 9,591,467 B2 | 3/2017 | Piett et al. | |
| 9,629,185 B1 | 4/2017 | Gluckman et al. | |
| 9,635,534 B2 | 4/2017 | Maier et al. | |

(56) References Cited

U.S. PATENT DOCUMENTS

| | | |
|---|---|---|
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,998,507 B2 | 6/2018 | Mehta et al. |
| 10,002,375 B1 | 6/2018 | Scythes et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,165,431 B2 | 12/2018 | Bozik et al. |
| 10,375,558 B2 | 8/2019 | Katz et al. |
| 10,419,915 B2 | 9/2019 | Mehta et al. |
| 10,447,865 B2 | 10/2019 | Mehta et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0203572 A1 | 10/2004 | Aerrabotu et al. |
| 2004/0229620 A1 | 11/2004 | Zhao et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0151642 A1 | 7/2005 | Tupler et al. |
| 2005/0190892 A1* | 9/2005 | Dawson ............... H04M 7/006 379/37 |
| 2006/0085275 A1* | 4/2006 | Stokes ............... G06Q 30/00 705/27.1 |
| 2006/0109960 A1 | 5/2006 | D'Evelyn et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0294058 A1 | 11/2008 | Shklarski |
| 2009/0134982 A1* | 5/2009 | Robertson ............... H04H 20/59 340/326 |
| 2009/0186596 A1 | 7/2009 | Kaltsukis |
| 2009/0214000 A1* | 8/2009 | Patel ............... H04W 12/06 379/45 |
| 2009/0257345 A1 | 10/2009 | King |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0238018 A1 | 9/2010 | Kelly |
| 2010/0262668 A1 | 10/2010 | Piett et al. |
| 2011/0009086 A1 | 1/2011 | Poremba et al. |
| 2011/0029600 A1 | 2/2011 | Theimer |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1* | 2/2012 | Kazmi ............... H04W 76/50 455/404.2 |
| 2012/0092161 A1 | 4/2012 | West |
| 2012/0144019 A1 | 6/2012 | Zhu et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0065569 A1* | 3/2013 | Leipzig ............... H04W 4/16 455/416 |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0309994 A1 | 11/2013 | Hellwig et al. |
| 2013/0331055 A1 | 12/2013 | McKown et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0248848 A1 | 9/2014 | Mufti et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2015/0029836 A1 | 1/2015 | Hans et al. |
| 2015/0055453 A1 | 2/2015 | Chaki et al. |
| 2015/0081209 A1 | 3/2015 | Yeh et al. |
| 2015/0085997 A1* | 3/2015 | Biage ............... H04M 11/04 379/45 |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0057595 A1 | 2/2016 | Ahmed et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |

(56) References Cited

U.S. PATENT DOCUMENTS

| | | |
|---|---|---|
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0337831 A1 | 11/2016 | Piett et al. |
| 2016/0345171 A1 | 11/2016 | Kulkarni et al. |
| 2016/0353266 A1 | 12/2016 | Winkler et al. |
| 2016/0363931 A1 | 12/2016 | Yang et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0099579 A1* | 4/2017 | Ryan ................. H04M 3/5116 |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0213251 A1 | 7/2017 | Nunally et al. |
| 2017/0238129 A1* | 8/2017 | Maier .................... H04W 4/029 455/404.2 |
| 2017/0238136 A1 | 8/2017 | Smith |
| 2017/0245113 A1 | 8/2017 | Hooker |
| 2017/0287085 A1* | 10/2017 | Smith ............... H04M 1/72538 |
| 2017/0310827 A1 | 10/2017 | Mehta et al. |
| 2017/0316698 A1 | 11/2017 | Stenneth et al. |
| 2017/0325056 A1 | 11/2017 | Mehta et al. |
| 2017/0359712 A1* | 12/2017 | Meredith .......... H04M 3/42059 |
| 2018/0020091 A1 | 1/2018 | Self et al. |
| 2018/0039737 A1 | 2/2018 | Dempers et al. |
| 2018/0053401 A1 | 2/2018 | Martin et al. |
| 2018/0077282 A1 | 3/2018 | Herron et al. |
| 2018/0242133 A1 | 8/2018 | Anand et al. |
| 2018/0262544 A1 | 9/2018 | Mehta et al. |
| 2018/0352408 A1* | 12/2018 | Baer ...................... H04W 60/04 |
| 2019/0020993 A1 | 1/2019 | Nguyen |
| 2019/0073894 A1 | 3/2019 | Mehta et al. |
| 2019/0104395 A1 | 4/2019 | Mehta et al. |
| 2019/0130719 A1* | 5/2019 | D'Amico .................. G06F 9/44 |
| 2019/0166480 A1 | 5/2019 | Rauner |
| 2019/0174288 A1 | 6/2019 | Bozik et al. |
| 2019/0174289 A1 | 6/2019 | Martin et al. |
| 2019/0253861 A1 | 8/2019 | Horelik et al. |
| 2019/0281165 A1 | 9/2019 | Mehta et al. |
| 2019/0306664 A1* | 10/2019 | Mehta ..................... H04W 4/90 |
| 2019/0320310 A1 | 10/2019 | Horelik et al. |
| 2019/0380020 A1 | 12/2019 | Pellegrini et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |

OTHER PUBLICATIONS

Chowdhury et al. Tweet4act: Using incident-specific profiles for classifying crisis-related messages. Proceedings of the 10th International ISCRAM Conference (pp. 834-839) (2013).
Co-pending U.S. Appl. No. 16/537,377, filed Aug. 9, 2019.
Co-pending U.S. Appl. No. 16/684,366, filed Nov. 14, 2019.
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 May 7-12, 2011 (10 pgs).
Meier. MatchApp: Next Generation Disaster Response App? iRevolution (12 pgs.) (Feb. 27, 2013).
National Emergency No. Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (May 8, 2012).
PCT/US2017/029465 International Search Report and Written Opinion dated Aug. 9, 2017.
PCT/US2018/063935 International Search Report and Written Opinion dated Mar. 22, 2019.
PCT/US2019/027538 International Search Report and Written Opinion dated Aug. 2, 2019.
U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/436,810 Office Action dated Aug. 9, 2019.
U.S. Appl. No. 16/436,810 Office Action dated Dec. 17, 2019.
U.S. Appl. No. 16/526,195 Office Action dated Dec. 27, 2019.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from<url:https://scholar.google.co.kr/citations/?user=h_4uUqAAAAAJ&hl=ko (156 pgs) (2014)</url:<a>.
U.S. Appl. No. 16/384,600 Office Action dated Apr. 2, 2020.
U.S. Appl. No. 16/421,355 Office Action dated Feb. 4, 2020.
Co-pending U.S. Appl. No. 16/920,394, filed Jul. 2, 2020.
U.S. Appl. No. 16/740,207 Office Action dated Aug. 17, 2020.

\* cited by examiner

PIDF-LO

```
HTTP/1.1 200 OK
Date: Tue, 01 Dec 2016 23:27:30 GMT
Content-Length: 489
Content-Type: application/EmergencyCallData.DeviceInfo+xml
<dev:EmergencyCallData.DeviceInfo
xmlns:dev="urn:ietf:params:xml:ns:EmergencyCallData:DeviceInfo">
<dev:DataProviderReference>d4b3072df.201409182208075@example.org
```

FIG. 6

EMERGENCY DATA RETRIEVAL NODE

```
{"apps": [ "lucas-rad-test", "CCInform-Sandbox" ],
"companies": ["neoteric", "test-company", "curbcall", "uber"],
"email": "leagerleavitt@rapidsos.com",
"developerId": "fc4fa636-a321-4e7b-a497-b3922df753a8",
"firstName": "Lucas",
"lastName": "Eager Leavitt",
"userName": "leagerleavitt",
"organizationName": "rapidsos",
"status": "active",
"attributes": [],
"createdAt": 1475683130277,
"createdBy": "vkoo@rapidsos.com",
"lastModifiedAt": 1511305645398,
"lastModifiedBy": "apigee-drupal+rapidsos_jevp@google.com"
```

FIG. 7

| | | Phone Number<br>(318) 675-1234 | Last Location Update<br>21:45:04 | Probable Address<br>Likelihood: 80% | Latitude : 39.7439<br>Longitude:-105.0196<br>Radius : 6.3m<br>Altitude : 4.5m |
|---|---|---|---|---|---|
| | Caller<br>Information | Personal Information | | | |
| | | Demographics | | | |
| | Location | | Name<br>Jane Doe | Birth Date<br>07-21-1984 | Gender<br>Female |
| | | | Height<br>5'0" | Weight<br>125lbs | Ethnicity<br>Puerto Rican |
| | Caller Provided<br>Locations | Languages:<br>English, German | Occupation<br>Lawyer | URL<br>http://rapidsos.com | |
| | | Contact Information | | | |
| | Device | Phone Number<br>(318) 675-1234 | Notes<br>Personal (Cell) | Emails<br>jdoe@RapidSOS.com | Notes<br>Primary Email |
| | | Addresses | | | |
| | Directions | Address<br>234 W 39th St, New York, New York, US 10018 | | | |
| | | Medical Information | | | |

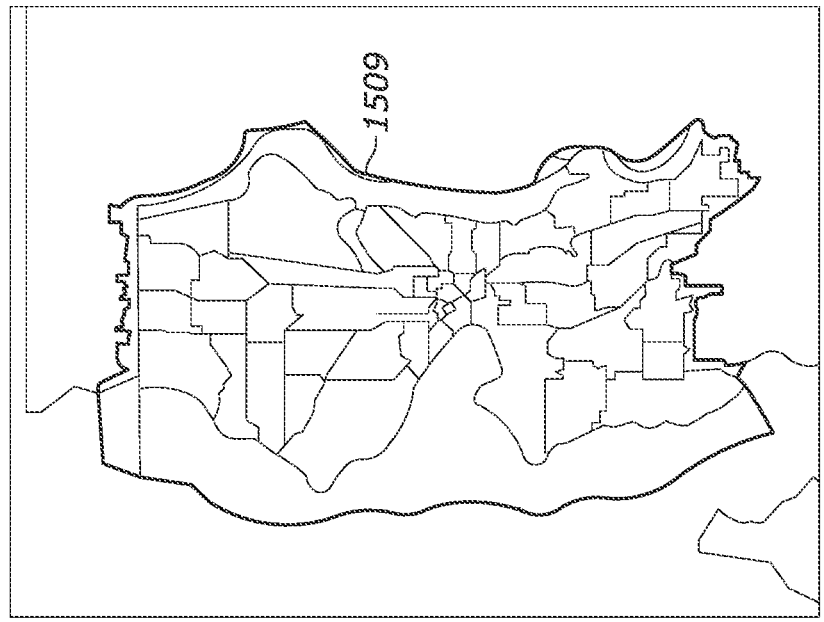
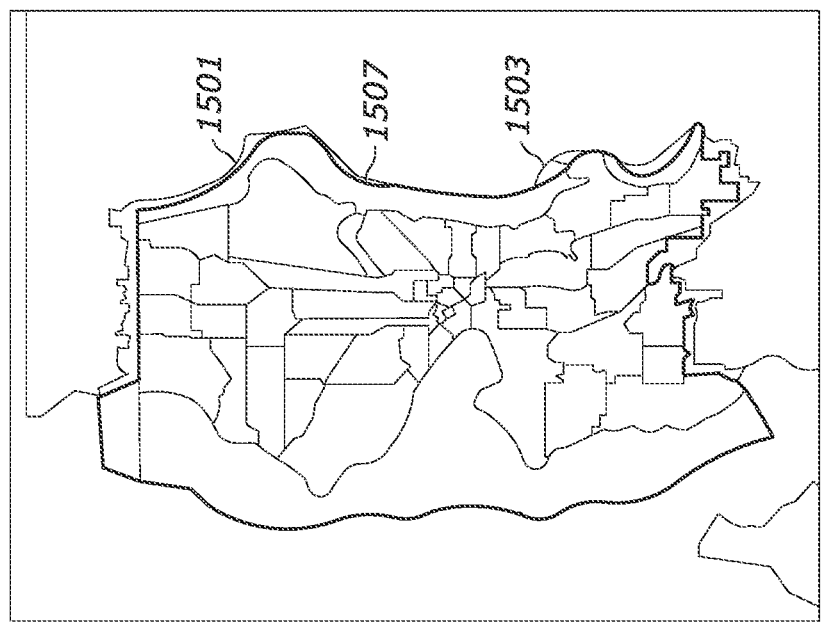
FIG. 15

SYSTEMS AND METHODS FOR EMERGENCY DATA INTEGRATION

CROSS-REFERENCE TO RELATED APPLICATIONS

The present application claims priority to U.S. Provisional Patent Application No. 62/946,961, filed Dec. 11, 2019, entitled "SYSTEMS AND METHODS FOR EMERGENCY DATA INTEGRATION", and further claims priority to U.S. Provisional Patent Application No. 62/926,466, filed Oct. 26, 2019, entitled "SYSTEMS AND METHODS FOR EMERGENCY DATA INTEGRATION," and further claims priority to U.S. Provisional Patent Application No. 62/826,680, filed Mar. 29, 2019, entitled "SYSTEMS AND USER INTERFACES FOR EMERGENCY DATA INTEGRATION", all of which are assigned to the same assignee as the present application, and all of which are hereby incorporated by reference herein in their entirety.

FIELD OF THE DISCLOSURE

The present disclosure relates generally to emergency calls, enhanced 9-1-1 (E911) and next generation 9-1-1 (NG911) emergency networks, and more particularly, to determination and provision of location data and other data for emergency calls.

BACKGROUND

Despite advances that have been made in emergency network technology, emergency networks remain relatively uncoordinated between jurisdictions both regionally and nationally. A given jurisdiction may not be aware of emergencies occurring near or outside of its boundaries, that may eventually impact it and require resource allocation. Additionally, because of ubiquitous, yet constantly evolving communication technologies and applications, emergency networks are bombarded with emergency communications from a plethora of non-homogeneous sources. Traditionally, emergency networks received voice calls from landline telephones via a public switched telephone network (PSTN) from which determining the caller and the caller's location was relatively straightforward because PSTN telephones were at fixed locations and associated with a given subscriber. The advent of wireless communication introduced additional complexities due to the mobility of callers. With the further advent of mobile Internet connectivity, which enables "over-the-top" voice-over-Internet-protocol (VoIP) and other messaging application communications, further challenges were introduced with respect to locating callers.

BRIEF DESCRIPTION OF THE DRAWINGS

FIG. 6 is a diagram illustrating an IETF PIDF-LO location object.

FIG. 7 is an example emergency data retrieval node.

FIG. 8 provides an example of an emergency response application webpage graphical user interface (GUI).

FIG. 11 is an example of an emergency response application graphical user interface.

FIG. 15 provides map views illustrating processing of a complex polygonal geofenced region by removing overlaps and slivers.

DETAILED DESCRIPTION

Figure 1:
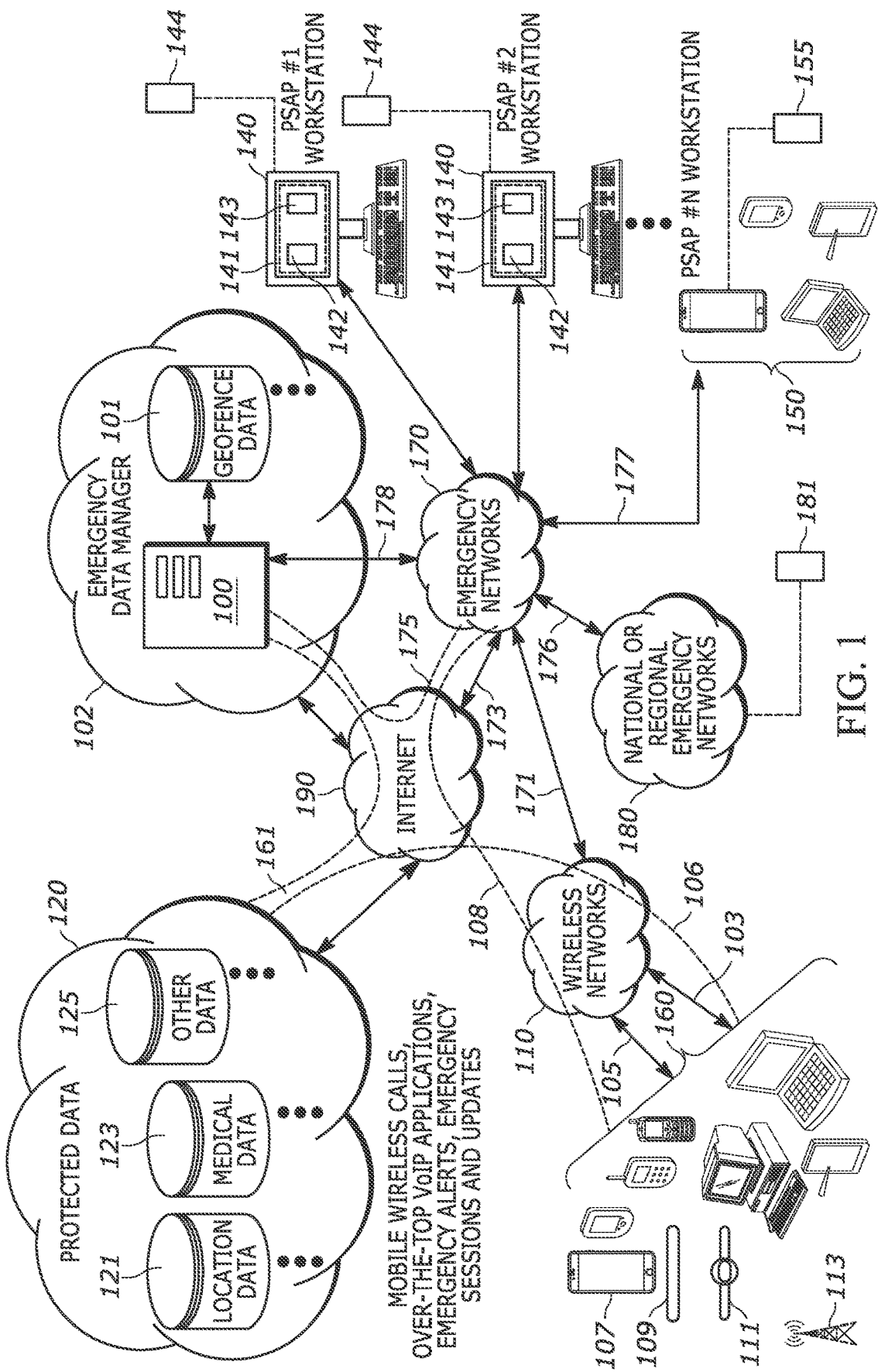
FIG. 1 is a diagram illustrating an emergency data management network in communication with various emergency networks and national or regional emergency networks.

Briefly, the present disclosure provides an emergency data manager and method of operation. Among other features, the emergency data manager provides emergency network entities, such as various workstations, with a jurisdictional map view showing the geographic boundary of the emergency network to which a specific emergency network entity belongs. Each of the emergency network entities corresponds to an emergency network that has a given geographic boundary, and therefore the jurisdictional map view corresponds to a respective emergency network, and corresponding emergency network entity's, geographic boundary. The emergency data manager obtains emergency data from various sources and determines portions of emergency data corresponding to emergencies occurring within each respective emergency network's geographic boundary. The emergency network entities corresponding to the emergency network are thereby provided with respective jurisdictional map views that display their respective emergency network's geographic boundary. The emergency data manager provides location indicators within each respective jurisdictional map view, with each location indicator corresponding to an emergency. The emergency data manager also provides a regional jurisdictional map view to a regional emergency network entity where the regional emergency network entity corresponds to a given regional emergency network geographic boundary that incorporates subordinate emergency network geographic boundaries. For example, the regional jurisdictional map view may be a countrywide view, or a statewide view.

One disclosed method includes: obtaining emergency data for multiple device types from a plurality of emergency data sources; providing a jurisdictional map view to a plurality of emergency network entities, where each emergency network entity corresponds to a given geographic boundary, and where the jurisdictional map view corresponds to a respective emergency network entity's geographic boundary; determining portions of the emergency data corresponding to emergencies occurring within each respective emergency network entity geographic boundary; and providing location indicators within each respective jurisdictional map view, with each location indicator corresponding to an emergency. The method may further include providing a regional jurisdictional map view to a regional emergency network entity, where the regional emergency network entity corresponds to a given regional geographic boundary that incorporates subordinate emergency network entity geographic boundaries.

The method may further include determining at least one complex polygon as an emergency network entity's geographic boundary, and providing a buffer zone defining an expanded boundary within the jurisdictional map view. The method may further include: determining associations between portions of the emergency data and specific emergency network entities based on each emergency network entity's geographic boundary; and providing the location indicators based on the associations. Location indicators may also be provided within the expanded boundary defined by corresponding buffer zones. The method may further include: establishing a plurality of network connections with the plurality of emergency network entities; and sending determined portions of the emergency data to a respective associated emergency network entity based on the associations.

Another disclosed method of operation includes: obtaining emergency data for multiple device types from a plurality of emergency data sources; establishing a plurality of network connections with a plurality of emergency network entities, each emergency network entity corresponding to a given geographic boundary; determining associations between portions of the emergency data and specific emergency network entities based on each emergency network entity's geographic boundary; and sending each determined portion of emergency data to a respective associated emergency network entity based on the determined associations.

The method may further include providing a jurisdictional map view to each emergency network entity, where the jurisdictional map view corresponds to a respective emergency network entity's geographic boundary, and where a determined portion of emergency data corresponding to the respective emergency network entity is related to emergencies occurring within a displayed geographic boundary. The method may further include: providing a regional jurisdictional map view to a regional emergency network entity, where the regional emergency network entity corresponds to a given regional geographic boundary that incorporates subordinate emergency network entity geographic boundaries.

The method may further include: showing location indicators within the jurisdictional map view, with each location indicator corresponding to an emergency. The method may further include: providing a selectable link corresponding to each location indicator within the jurisdictional map view; and providing emergency data related to an emergency at a location corresponding to the location indicator, in response to selection input via the selectable link. Determining associations between portions of the emergency data and specific emergency network entities based on each emergency network entity's geographic boundary, may include determining at least one complex polygon as an emergency network entity's geographic boundary. Establishing a plurality of network connections with a plurality of emergency network entities may include establishing a transport control protocol (TCP) connection with the plurality of emergency network entities.

A disclosed apparatus includes: a network component, operative to connect to the Internet; and a processor, operatively coupled to the network component. The processor is operative to: obtain emergency data for multiple device types from a plurality of emergency data sources; provide a jurisdictional map view to a plurality of emergency network entities, where each emergency network entity corresponds to a given geographic boundary, and where the jurisdictional map view corresponds to a respective emergency network entity's geographic boundary; determine portions of the emergency data corresponding to emergencies occurring within each respective emergency network entity geographic boundary; and provide location indicators within each respective jurisdictional map view, with each location indicator corresponding to an emergency.

The processor may be further operative to provide a regional jurisdictional map view to a regional emergency network entity, where the regional emergency network entity corresponds to a given regional geographic boundary that incorporates subordinate emergency network entity geographic boundaries. The processor may be further operative to determine at least one complex polygon as an emergency network entity's geographic boundary, and to provide a buffer zone defining an expanded boundary. The processor may be further operative to: determine associations between portions of the emergency data and specific emergency network entities based on each emergency network entity's geographic boundary; and provide the location indicators based on the associations. Location indicators may be provided within an expanded boundary defined by the buffer zones. The processor may be further operative to: establish a plurality of network connections with the plurality of emergency network entities; and send determined portions of the emergency data to a respective associated emergency network entity based on the associations.

Another disclosed apparatus includes: a network component, operative to connect to the Internet; and a processor, operatively coupled to the network component. The processor is operative to: obtain emergency data for multiple device types from a plurality of emergency data sources; establish a plurality of network connections with a plurality of emergency network entities, each emergency network entity corresponding to a given geographic boundary; determine associations between portions of the emergency data and specific emergency network entities based on each emergency network entity's geographic boundary; and send each determined portion of emergency data to a respective associated emergency network entity based on the determined associations.

The processor may be further operative to: provide a jurisdictional map view to each emergency network entity, where the jurisdictional map view corresponds to a respective emergency network entity's geographic boundary, and where a determined portion of emergency data corresponding to the respective emergency network entity is related to emergencies occurring within a displayed geographic boundary. The processor may be further operative to provide a regional jurisdictional map view to a regional emergency network entity, where the regional emergency network entity corresponds to a given regional geographic boundary that incorporates subordinate emergency network entity geographic boundaries.

The processor may be further operative to: show location indicators within the jurisdictional map view, with each location indicator corresponding to an emergency. The processor may be further operative to: provide a selectable link corresponding to each location indicator within the jurisdictional map view; and provide emergency data related to an emergency at a location corresponding to the location indicator, in response to selection input via the selectable link.

Another disclosed method of operation involves establishing a WebSocket connection between a public safety answering point (PSAP) and an emergency data manager; streaming location data to the PSAP from the emergency data manager via the WebSocket connection for a plurality of devices; and filtering the streaming location data to the PSAP based on the location data indicating location within a polygon defining a jurisdictional geofence for the PSAP.

Filtering the streaming location data to the PSAP based on the location data indicating location within a polygon may include defining at least one complex polygon as the polygon defining the jurisdictional geofence for the PSAP. Streaming location data to the PSAP from the emergency data manager via the WebSocket connection for a plurality of devices, may include streaming location data along with a plurality of device identifiers in response to a plurality of devices each initiating an emergency session with the PSAP, prior to establishment of the emergency sessions.

Streaming location data along with a device identifier in response to a device initiating an emergency session with the PSAP, may include streaming location data along with a device identifier in response to a device initiating an emergency session with the PSAP, where the emergency session is an emergency phone call. Streaming location data along with a device identifier in response to a device initiating an emergency session with the PSAP, may include streaming location data along with a device identifier in response to a device initiating an emergency session with the PSAP, where the emergency session is an emergency alert generated by the device.

The method may further include pushing a plurality of device identifiers and associated location information, to the emergency data manager 100 in response to emergency sessions or emergency alerts being initiated by the plurality of devices. The method may further include establishing a call queue at the PSAP using the plurality of device identifiers, prior to establishment of the emergency sessions. The method may further include displaying the call queue on a PSAP graphical user interface (GUI); and displaying location information associated with each of the plurality of device identifiers on a map indicating the polygon boundary. The method may further include displaying the call queue on a PSAP graphical user interface (GUI) and providing each device identifier as a selectable link; receiving selection input for selection of a specific selectable link for a specific device identifier; and displaying location information associated with the specific device identifier on a map indicating the polygon boundary.

The present disclosure also provides an emergency data manager operative to: establish a WebSocket connection with a PSAP; stream location data to the PSAP via the WebSocket connection for a plurality of devices; and filter the streaming location data to the PSAP based on the location data indicating location within a polygon defining a jurisdictional geofence for the PSAP.

The emergency data manager may be further operative to filter the streaming location data to the PSAP based on the location data indicating location within a polygon by defining at least one complex polygon as the polygon defining the jurisdictional geofence for the PSAP. The emergency data manager may be further operative to stream location data along with a plurality of device identifiers in response to a plurality of devices each initiating an emergency session with the PSAP, prior to establishment of the emergency sessions. The emergency session may be an emergency phone call or may be an emergency alert generated by the device.

The emergency data manager is further operative to receive a push a plurality of device identifiers and associated location information, in response to emergency sessions being initiated by the plurality of devices or in response to emergency alerts being generated by the plurality of devices.

A PSAP may include an emergency response application that is operative to establish a call queue using the plurality of device identifiers, prior to establishment of the emergency sessions. The emergency response application may be further operative to: display the call queue on a PSAP graphical user interface (GUI); and display location information associated with each of the plurality of device identifiers on a map indicating the polygon boundary. The emergency response application may be further operative to: display the call queue on a PSAP graphical user interface (GUI) and provide each device identifier as a selectable link; receive selection input for selection of a specific selectable link for a specific device identifier; and display location information associated with the specific device identifier on a map indicating the polygon boundary.

Another disclosed method includes establishing a WebSocket connection between an emergency service provider (ESP) and an emergency data emergency data manager; receiving a stream of emergency alerts from a plurality of devices, where each emergency alert includes location data; filtering the stream of emergency alerts to generate a filtered stream of emergency alerts for which the ESP is authorized to respond; and providing the filtered stream of emergency alerts to the ESP from the emergency data manager via the WebSocket connection. Filtering the stream of emergency alerts may include filtering the stream of emergency alerts based on a jurisdictional geofence defined as a polygonal boundary, or may include filtering the stream of emergency alerts based on location, type of emergency, ESP capabilities and ESP current status.

Filtering the stream of emergency alerts based on a jurisdictional geofence defined as a polygonal boundary may include filtering the stream of emergency alerts based on a jurisdictional geofence that includes a complex polygon. The filtering may also include removing overlapping sections and protruding sections between the polygonal boundary and at least one adjacent polygon.

Establishing a WebSocket connection between an emergency service provider (ESP) and an emergency data manager, may include establishing a WebSocket connection with a public safety answering point (PSAP) where the PSAP is the ESP.

The method may further include streaming location data along with a plurality of device identifiers in response to a plurality of devices each initiating an emergency session with the ESP, prior to establishment of the emergency sessions.

Among other advantages provided by the systems, servers, devices, methods, and media described in the present disclosure, is the ability to gather and deliver device-based hybrid locations (hereinafter, "enhanced locations") and additional data that may be pertinent to emergency situations to public safety services (PSS; e.g., public safety answering points, fire departments, police departments, paramedics, police officers, etc.). An emergency network may be operatively coupled to an emergency data manager that functions to receive enhanced locations (e.g., global positioning systems location data, map data) and additional data (e.g., medical history, video feeds, emergency reports, media reports) from various sources (e.g., medical databases, mobile devices of public or first responders, public cameras, police systems, media outlets) and at various times before, during, or after emergency situations and distribute enhanced locations and additional data to ESPs to aid the ESP in responding to live emergency situations. The emergency data manager may be a separate network entity that communicates with the emergency network via an Internet connection or by some other appropriate network connection. The enhanced locations and additional data may be delivered by the emergency data manager to a public safety answering point (PSAP). The enhanced locations and additional data may be displayed within a PSAP display such as, but not limited to, an Automatic Location Identification (ALI) display. The enhanced locations and additional data may be displayed using a graphical user interface provided by an emergency response application GUI separate from other PSAP GUI displays. An emergency response application may also be separate from other PSAP applications.

An emergency network entity, such as a PSAP workstation, may be provided with a device identifier, such as a phone number or IP address, etc., from an emergency caller through the emergency network. A PSAP operator may manually input the device identifier into an emergency response application to send a query to the emergency data manager and receive enhanced location and additional data from the emergency data manager in response to the query. However, in some implementations, a device identifier may be sent automatically for example, using a push operation to make an automatic query through a WebSocket connection between the emergency data manager and the emergency response application. In response to the device identifier push, the emergency data manager will provide the PSAP with enhanced location and additional data which will be received via the emergency response application, operating one or more PSAP workstations. The emergency response application may be integrated into an ESP system to form an integrated PSS system, such that the integrated ESP system may automatically receive enhanced location and additional data via a single, integrated GUI.

Among other advantages provided by the present disclosure, the emergency response application provides an emergency network, such as a PSAP, with critical information to aid in the response to a given emergency. In the case of location data, a PSAP is enabled to verify the location of an emergency caller via technology, rather than relying on a distressed caller to generate the location data. Thus, a PSAP can initiate a response before the user provides any location information, saving seconds or minutes on emergency response time. The present disclosure provides for the communication of enhanced location data and additional data to the PSAP via, for example, an emergency response application accessible by PSAP personnel, or as a software integration of a data pipeline with other emergency network (i.e. emergency service provider "ESP" systems). Disclosed herein are systems, applications, servers, devices, methods, and media that automatically push data to the PSAP, which is particularly beneficial because it streamlines the emergency response without requiring active input from the PSAP personnel.

Another advantage provided by the systems, servers, devices, methods, and media of the instant application is the ability to access an emergency response application provided to authorized emergency networks such as public safety services (PSAPs), for receiving and displaying emergency data, such as enhanced locations. The emergency response application is operative to verify public safety services, generate emergency data requests or queries, and display emergency data received from an emergency data manager. The emergency data manager and emergency response application are also operative to provide a graphical user interface to a computing device that is accessible by members of public safety services. The emergency response application may be integrated with one or more emergency networks/PSAP systems to provide a seamless and comprehensive emergency data delivery system.

Another advantage provided by the systems, servers, devices, methods and media of the present disclosure is the ability to protect potentially sensitive emergency data using geospatial analysis. An emergency data manager and an emergency response application use geofences to limit the delivery of emergency data to authorized recipients based on authoritative jurisdictional boundaries. Geofences may be received from PSAP administrators through the emergency response application. A geofence may define a jurisdiction of a particular PSAP, and may be displayed as a geofence boundary on a map via a graphical user interface provided by the emergency response application. Geofences received from PSAP administrators must be verified by public safety officials before the geofences are applied by the emergency data manager and displayed with a GUI of the emergency response application.

The emergency response application also provides an emergency management view in the graphical user interface (GUI). The emergency management view enables the PSAP staff to view ongoing recently received emergency calls within one or more geofenced jurisdictions displayed on the GUI. The emergency management view may display a call queue with numerous device identifiers associated with emergency caller devices, and the location of each caller. The caller's location may be updated in real time. The emergency management view may display the location of available emergency services within a variable proximity to one or more emergency callers, or within the jurisdictional geofence of one or more emergency callers. The PSAP may be enabled to coordinate the dispatch of emergency responders to emergency callers, so as to reduce response times and improve the allocation of resources.

Described herein are various methods for delivering emergency data to emergency networks such as, but not limited to, a public safety answering point (PSAP). One method includes: a) receiving available emergency data associated with a device identifier from one or more emergency data databases, the emergency data comprising a current location; b) retrieving a geofence associated with the PSAP using the identifier of the PSAP, wherein the geofence encloses a region within a jurisdiction of the PSAP; c) determining if the current location is within the geofence associated with the PSAP; d) in response to determining that the current location is within the geofence associated with the PSAP, transmitting the emergency data to a PSAP computing device; and e) providing an emergency response application comprising a graphical user interface (GUI) accessible by the computing device at the PSAP, the GUI comprising an interactive map showing an incident associated with the device identifier within the jurisdiction of the PSAP and at least one data overlay displaying at least a subset of the emergency data. The method may further include accessing an Automatic Location Information (ALI) feed or a Computer Aided Dispatch (CAD) spill to identify the incident and the associated device identifier. The emergency data associated with the device identifier may include one or more historical locations. The method may further include: a) determining if the one or more historical locations are within the geofence associated with the PSAP; and b) in response to determining that the one or more historical locations are within the geofence associated with the PSAP, transmitting the one or more historical locations to the computing device for display within the interactive map. Determining if the current location is within the geofence associated with the PSAP may include applying a buffer that expands one or more boundaries of the geofence when comparing the current location to the geofence. The buffer may be kilometers beyond a boundary of the geofence. Determining if the current location is within the geofence associated with the PSAP may include shrinking one or more boundaries of the geofence when comparing the current location to the geofence. The geofence associated with the PSAP may be submitted through the GUI by an administrator of the PSAP. The geofence may be a rectangle defined by the administrator of the PSAP on a map within the GUI. The rectangle may be defined using two latitude-longitude coordinates. The geofence may include a shape defined by the administrator of the PSAP on a map provided by the GUI. The geofence may be a polygon defined by the administrator of the PSAP on a map provided by the GUI. The geofence may include a GIS file. The geofence may include a GIS shapefile. The geofence may include a plurality of polygons. The method may include PSAP registration steps comprising: a) receiving a registration request for access to the emergency response application from an administrator of the PSAP through the GUI, the registration request that includes a name of the PSAP and a non-emergency landline telephone number of the PSAP; b) receiving an administrator-designated definition of the geofence associated with the PSAP through an interactive map provided by the GUI; c) verifying the PSAP using the name of the PSAP, the non-emergency landline telephone number of the PSAP, and the geofence associated with the PSAP; and d) in response to verifying the PSAP, generating credentials associated with the PSAP and providing access to the emergency response application to the administrator of the PSAP. The PSAP may be authorized to receive the emergency data using a temporary access token. The temporary access token may be generated by a credential management system. The credentials may be associated with the PSAP are generated and stored within a credential management system. The method may include: a) receiving selection of a new user account for a PSAP member from an administrator of the PSAP, wherein the selection of a new user account includes an email address associated with the PSAP member; b) delivering an email comprising the login information to the email address associated with the PSAP member; c) generating the new user account within the credential management system; and d) linking the new user account with both the login information and the credentials associated with the PSAP. The temporary access token may be generated by steps that include, for example: a) identifying the new user account within the credential management system using the login information; b) identifying the PSAP using the new user account; c) retrieving the credentials associated with the PSAP; and d) deriving the temporary access token from the credentials associated with the PSAP. The method may include: a) wherein the selection of a new user account further includes a user type for the new user account; b) wherein the emergency data request further includes the user type; and c) further provides differentiating access to the emergency data based on the user type. The method may include: a) in response to receiving the login information from the member of the PSAP, checking an IP address of the computing device against a whitelist of IP addresses; b) in response to determining that the IP address of the computing device is not on the whitelist of IP addresses: i) denying the member of the PSAP access to the emergency response application; and ii) delivering an interactive call to a landline associated with the PSAP, wherein the interactive call audibly dictates an access code; c) receiving the access code from the member of the PSAP through the GUI; and d) providing access to the emergency response application to the member of the PSAP. The method may include: a) in response to receiving the login information from the member of the PSAP, checking an IP address of the computing device against a whitelist of IP addresses; b) in response to determining that the IP address of the computing device is not on the whitelist of IP addresses: i) denying the member of the PSAP access to the emergency response application; and ii) delivering an email to an administrator of the PSAP, the email that has a confirmation link; c) receiving selection of the confirmation link; and d) in response to receiving selection of the confirmation link, providing access to the emergency response application to the member of the PSAP. The device identifier may be associated with an electronic device used to make an emergency call to the PSAP. The device identifier may be a phone number or an email address, etc. The device identifier may be manually submitted to the emergency response application by a member of the PSAP through an entry field provided by the GUI. Alternatively, the device identifier may be automatically submitted to the emergency response application by call-taking software installed on the computing device. The emergency data request may be an API GET request. The emergency data may include, but is not limited to, at least one of caller information, sensor data, emergency contact information, emergency indication, and medical information. The at least one data overlay may include, but is not limited to, one or more Internet of Things (IoT) sensors graphically depicted on the interactive map. The IoT sensors may include, but are not limited to, a network-enabled camera, video camera, environmental sensor, or any combination thereof. The at least one data overlay may include one or more first responders graphically depicted on the interactive map. The at least one data overlay may include, but is not limited to, traffic data graphically depicted on the interactive map. The emergency response application may be configured to allow user adjustment of one or more filters for graphically depicting at least a subset of the emergency data on the interactive map. The incident shown on the interactive map may be configured to be user selectable and to display at least a subset of the emergency data associated with the incident upon user selection. The at least a subset of the emergency data may include, but is not limited to, user name, user address, emergency contact information, or any combination thereof. The emergency response application may be configured to automatically remove one or more incidents from the interactive map over time. The interactive map may be configured to show a plurality of nearby incidents located in proximity to the incident. The emergency response application may be configured to display a queue of ongoing or recent incidents.

A disclosed method for delivering emergency data to a public safety answering point (PSAP), may include: a) providing an emergency response comprising a graphical user interface (GUI) accessible by a computing device at a public safety answering point; b) receiving login information for a member of the PSAP from the computing device; c) generating a temporary access token authorizing the member of the PSAP to access emergency data, wherein the temporary access token is derived from credentials associated with the PSAP; d) accessing a data feed of the PSAP to identify an emergency incident and an associated device identifier; e) associating the emergency incident with an identifier of the PSAP based on the temporary access token; f) receiving emergency data associated with the device identifier from one or more databases, the emergency data including a current location; and g) transmitting the emergency data to the computing device for display on the computing device through the GUI with an interactive map showing an incident associated with the device identifier within the jurisdiction of the PSAP and at least one data overlay displaying at least a subset of the emergency data.

A disclosed system for delivering emergency data to a public safety answering point (PSAP), may include: a) an emergency response application communicatively coupled to a network server and including a graphical user interface (GUI) accessible by a PSAP computing device through the computing network, wherein the emergency response application is configured to: i) receive emergency data regarding an emergency incident, the emergency data including a device identifier and a current location; and ii) display an interactive map through the GUI showing the emergency incident within the jurisdiction of the PSAP and at least one data overlay displaying at least a subset of the emergency data; and b) an emergency data manager communicatively coupled to the network server and configured to: i) gather emergency data associated with the device identifier from one or more databases, the emergency data comprising a current location; ii) retrieve a geofence associated with the PSAP using an identifier of the PSAP, wherein a geofence encloses a region within a jurisdiction of the PSAP; iii) determining if the current location is within the geofence associated with the PSAP; and iv) in response to determining that the current location is within the geofence associated with the PSAP, transmitting the emergency data to the computing device for display through the GUI. The system may be further configured to access an Automatic Location Information (ALI) feed or a Computer Aided Dispatch (CAD) spill to identify the incident and the associated device identifier. The emergency data associated with the device identifier may include, but is not limited to, one or more historical locations. The system may be further configured to: a) determine if the one or more historical locations are within the geofence associated with the PSAP; and b) in response to determining that the one or more historical locations are within the geofence associated with the PSAP, transmit the one or more historical locations to the computing device for display within the interactive map. Determining if the current location is within the geofence associated with the PSAP may further include applying a buffer that expands one or more boundaries of the geofence when comparing the current location to the geofence. The buffer may be kilometers beyond a boundary of the geofence. Determining if the current location is within the geofence associated with the PSAP may further include shrinking one or more boundaries of the geofence when comparing the current location to the geofence. The geofence associated with the PSAP may be submitted through the GUI by an administrator of the PSAP. The geofence may be a rectangle defined by the administrator of the PSAP on a map within the GUI. The rectangle may be defined using two latitude-longitude coordinates. The geofence may include a shape defined by the administrator of the PSAP on a map provided by the GUI. The geofence may be a polygon defined by the administrator of the PSAP on a map provided by the GUI. The geofence may include, but is not limited to, a GIS file such as a GIS shapefile. The geofence may include a plurality of polygons. The system may be further configured to receive a PSAP registration, the PSAP registration comprising: a) a registration request for access to the emergency response application from an administrator of the PSAP through the GUI, the registration request comprising a name of the PSAP and a non-emergency landline telephone number of the PSAP; b) an administrator-designated definition of the geofence associated with the PSAP through an interactive map provided by the GUI; c) verification of the PSAP using the name of the PSAP, the non-emergency landline telephone number of the PSAP, and the geofence associated with the PSAP; and d) credentials associated with the PSAP and providing access to the emergency response application to the administrator of the PSAP. The PSAP may be authorized to receive the emergency data using a temporary access token. The temporary access token may be generated by a credential management system. The credentials associated with the PSAP may be generated and stored within a credential management system. The system may be further configured to: a) receive a selection of a new user account for a PSAP member from an administrator of the PSAP, wherein the selection of a new user account includes an email address associated with the PSAP member; b) deliver an email that has the login information to the email address associated with the PSAP member; c) generate the new user account within the credential management system; and d) link the new user account with both the login information and the credentials associated with the PSAP. The temporary access token may be generated by steps including, for example: a) identifying the new user account within the credential management system using the login information; b) identifying the PSAP using the new user account; c) retrieving the credentials associated with the PSAP; and d) deriving the temporary access token from the credentials associated with the PSAP. The system may also include: a) wherein the selection of a new user account further includes a user type for the new user account; b) wherein the emergency data request further includes the user type; and c) further configured to differentiate access to the emergency data based on the user type. The system may be further configured to: a) in response to receiving the login information from the member of the PSAP, check an IP address of the computing device against a whitelist of IP addresses; b) in response to determining that the IP address of the computing device is not on the whitelist of IP addresses: i) deny the member of the PSAP access to the emergency response application; and ii) deliver an interactive call to a landline associated with the PSAP, wherein the interactive call audibly dictates an access code; c) receive the access code from the member of the PSAP through the GUI; and d) provide access to the emergency response application to the member of the PSAP. The system may be further configured to: a) in response to receiving the login information from the member of the PSAP, check an IP address of the computing device against a whitelist of IP addresses; b) in response to determining that the IP address of the computing device is not on the whitelist of IP addresses: i) deny the member of the PSAP access to the emergency response application; and ii) deliver an email to an administrator of the PSAP with a confirmation link; c) receive selection of the confirmation link; and d) in response to receiving selection of the confirmation link, provide access to the emergency response application to the member of the PSAP. The device identifier may be associated with an electronic device used to make an emergency call to the PSAP, and may be, but is not limited to, a phone number or an email address. The device identifier may be manually submitted to the emergency response application by a member of the PSAP through an entry field provided by the GUI. Alternatively, the device identifier may be automatically submitted to the emergency response application by call-taking software installed on the workstation/computing device. The emergency data request may be an API GET request. The emergency data may include, but is not limited to, at least one of caller information, sensor data, emergency contact information, emergency indication, and medical information. The at least one data overlay may include, but is not limited to, one or more Internet of Things (IoT) sensors graphically depicted on the interactive map. The IoT sensors may include, but are not limited to, a network-enabled camera, video camera, environmental sensor, or any combination thereof. The at least one data overlay may include, but is not limited to, one or more first responders graphically depicted on the interactive map. The at least one data overlay may include, but is not limited to, traffic data graphically depicted on the interactive map. The emergency response application may be configured to allow user adjustment of one or more filters for graphically depicting at least a subset of the emergency data on the interactive map. The incident shown on the interactive map may be configured to be user selectable and to display at least a subset of the emergency data associated with the incident upon user selection. The at least a subset of the emergency data may include, but is not limited to, user name, user address, emergency contact information, or any combination thereof. The emergency response application may be configured to automatically remove one or more incidents from the interactive map over time. The interactive map may be configured to show a plurality of nearby incidents located in proximity to the incident. The emergency response application may be configured to display a queue of ongoing or recent incidents.

A disclosed system for delivering emergency data to a public safety answering point (PSAP), the system configured to: a) provide an emergency response application that includes a graphical user interface (GUI) accessible by a workstation/computing device at a public safety answering point; b) receive login information for a member of the PSAP from the workstation/computing device; c) generate temporary access token authorizing the member of the PSAP to access emergency data, wherein the temporary access token is derived from credentials associated with the PSAP; d) access a data feed of the PSAP to identify an emergency incident and an associated device identifier; e) associate the emergency incident with an identifier of the PSAP based on the temporary access token; f) receive emergency data associated with the device identifier from one or more databases that includes, but is not limited to, a current location; and g) transmit the emergency data to the computing device for display on the workstation/computing device through the GUI on an interactive map showing an incident associated with the device identifier within the jurisdiction of the PSAP and at least one data overlay displaying at least a subset of the emergency data.

A disclosed non-transitory, non-volatile, computer readable storage media encoded with a computer program includes instructions executable by at least one processor, that when executed cause the processor to: a) receive available emergency data associated with a device identifier from one or more databases, the emergency data including, but not limited to, a current location; b) retrieve a geofence associated with the PSAP using the identifier of the PSAP, wherein the geofence encloses a region within the jurisdiction of the PSAP; c) determine if the current location is within the geofence associated with the PSAP; d) in response to determining that the current location is within the geofence associated with the PSAP, transmit the emergency data to a PSAP computing device; and e) provide an emergency response application with a graphical user interface (GUI) accessible by the computing device at the PSAP, where the GUI provides an interactive map showing an incident associated with the device identifier within the jurisdiction of the PSAP and at least one data overlay displaying at least a subset of the emergency data. The non-transitory, non-volatile, computer readable storage media executable instructions, when executed, may further cause the processor to access an Automatic Location Information (ALI) feed or a Computer Aided Dispatch (CAD) spill to identify the incident and the associated device identifier. The emergency data associated with the device identifier may include, but is not limited to, one or more historical locations. The non-transitory, non-volatile, computer readable storage media executable instructions, when executed, may further cause the processor to: a) determine if the one or more historical locations are within the geofence associated with the PSAP; and b) in response to determining that the one or more historical locations are within the geofence associated with the PSAP, transmit the one or more historical locations to the computing device for display within the interactive map. Determining if the current location is within the geofence associated with the PSAP may include applying a buffer that expands one or more boundaries of the geofence when comparing the current location to the geofence. The buffer may be kilometers beyond a boundary of the geofence. Determining if the current location is within the geofence associated with the PSAP may include shrinking one or more boundaries of the geofence when comparing the current location to the geofence. The geofence associated with the PSAP may be submitted through the GUI by an administrator of the PSAP. The geofence may be a rectangle defined by the administrator of the PSAP on a map within the GUI, and may be defined using two latitude-longitude coordinates. The geofence may include a shape defined by the administrator of the PSAP on a map provided by the GUI. The geofence may be, but is not limited to, a polygon defined by the administrator of the PSAP on a map provided by the GUI. The geofence may include a GIS file such as, but not limited to, a GIS shapefile. The geofence may include, but is not limited to, a plurality of polygons.

The non-transitory, non-volatile, computer readable storage media executable instructions, when executed, may further cause the processor to perform PSAP registration steps that include, for example: a) receiving a registration request for access to the emergency response application from an administrator of the PSAP through the GUI, where the registration request includes a name of the PSAP and a non-emergency landline telephone number of the PSAP; b) receiving an administrator-designated definition of the geofence associated with the PSAP through an interactive map provided by the GUI; c) verifying the PSAP using the name of the PSAP, the non-emergency landline telephone number of the PSAP, and the geofence associated with the PSAP; and d) in response to verifying the PSAP, generating credentials associated with the PSAP and providing access to the emergency response application to the administrator of the PSAP. The PSAP may be authorized to receive the emergency data using a temporary access token. The temporary access token may be generated by a credential management system. The credentials associated with the PSAP may be generated and stored within a credential management system. The non-transitory, non-volatile, computer readable storage media executable instructions, when executed, may further cause the processor to: a) receive selection of a new user account for a PSAP member from an administrator of the PSAP, where the selection of a new user account includes an email address associated with the PSAP member; b) deliver an email with the login information to the email address associated with the PSAP member; c) generate the new user account within the credential management system; and d) link the new user account with both the login information and the credentials associated with the PSAP. The temporary access token may be generated by steps including, for example: a) identifying the new user account within the credential management system using the login information; b) identifying the PSAP using the new user account; c) retrieving the credentials associated with the PSAP; and d) deriving the temporary access token from the credentials associated with the PSAP. The non-transitory, non-volatile, computer readable storage media executable instructions, when executed, may further cause the processor to: a) select a new user account including a user type for the new user account; b) wherein the emergency data request may further include the user type; and c) may further include differentiating access to the emergency data based on the user type. The non-transitory, non-volatile, computer readable storage media executable instructions, when executed, may further cause the processor to: a) in response to receiving the login information from the member of the PSAP, check an IP address of the computing device against a whitelist of IP addresses; b) in response to determining that the IP address of the computing device is not on the whitelist of IP addresses: i) deny the member of the PSAP access to the emergency response application; and ii) deliver an interactive call to a landline associated with the PSAP, where the interactive call audibly dictates an access code; c) receive the access code from the member of the PSAP through the GUI; and d) provide access to the emergency response application to the member of the PSAP. The non-transitory, non-volatile, computer readable storage media executable instructions, when executed, may further cause the processor to: a) in response to receiving the login information from the member of the PSAP, check an IP address of the workstation/computing device against a whitelist of IP addresses; b) in response to determining that the IP address of the computing device is not on the whitelist of IP addresses: i) deny the member of the PSAP access to the emergency response application; and ii) deliver an email to an administrator of the PSAP with a confirmation link; c) receive selection of the confirmation link; and d) in response to receiving selection of the confirmation link, provide access to the emergency response application to the member of the PSAP. The device identifier may be associated with an electronic device used to make an emergency call to the PSAP, and may be, but is not limited to, a phone number or an email address.

The device identifier may be manually submitted to the emergency response application by a member of the PSAP through an entry field provided by the GUI. The device identifier may be automatically submitted to the emergency response application by call-taking software installed on the computing device. The emergency data request may be an API GET request. The emergency data may include, but is not limited to, at least one of caller information, sensor data, emergency contact information, emergency indication, and medical information. The at least one data overlay may include, but is not limited to, one or more Internet of Things (IoT) sensors graphically depicted on the interactive map. The IoT sensors may include, but are not limited to, a network-enabled camera, video camera, environmental sensor, or any combination thereof. The at least one data overlay may include, but is not limited to, one or more first responders graphically depicted on the interactive map. The at least one data overlay may include, but is not limited to, traffic data graphically depicted on the interactive map. The emergency response application may be configured to allow user adjustment of one or more filters for graphically depicting at least a subset of the emergency data on the interactive map. The incident shown on the interactive map may be configured to be user selectable and to display at least a subset of the emergency data associated with the incident upon user selection. The at least a subset of the emergency data may include, but is not limited to, user name, user address, emergency contact information, or any combination thereof. The emergency response application may be configured to automatically remove one or more incidents from the interactive map over time. The interactive map may be configured to show a plurality of nearby incidents located in proximity to the incident. The emergency response application may be configured to display a queue of ongoing or recent incidents.

A disclosed non-transitory, non-volatile, computer readable storage media encoded with a computer program includes instructions executable by at least one processor, that when executed cause the processor to: a) provide an emergency response comprising a graphical user interface (GUI) accessible by a computing device at a public safety answering point; b) receive login information for a member of the PSAP from the computing device; c) generate a temporary access token authorizing the member of the PSAP to access emergency data, wherein the temporary access token is derived from credentials associated with the PSAP; d) access a data feed of the PSAP to identify an emergency incident and an associated device identifier; e) associate the emergency incident with an identifier of the PSAP based on the temporary access token; f) receive emergency data associated with the device identifier from one or more databases with a current location; and g) transmit the emergency data to the computing device for display on the computing device through the GUI, on an interactive map showing an incident associated with the device identifier within the jurisdiction of the PSAP and at least one data overlay displaying at least a subset of the emergency data.

A disclosed method for delivering emergency data to an emergency service provider (ESP), may include: a) receiving an emergency alert associated with a device identifier and a current location; b) determining a ESP for responding at the current location by retrieving a geofence associated with the ESP, and determining if the current location is within the geofence associated with the ESP; c) in response to determining that the current location is within the geofence associated with the ESP, transmitting the emergency data to an ESP computing device; and d) providing an emergency response application with a graphical user interface (GUI) accessible by the computing device at the ESP, showing a list of emergency alerts and an interactive map with an incident location associated with the device identifier. The list of emergency alerts may include a list of emergency calls located within the geofence of the ESP. The list of emergency alerts may be ordered by the time the emergency call was received. The emergency alert may include an emergency notification indicating an on-going emergency call. The emergency alert may be initiated by user input on a user device associated with the device identifier. The emergency alert may be initiated by one or more sensor readings from a user device associate with the device identifier. The method may include identifying two or more emergency alerts associated with an incident. The GUI may include a section providing emergency data regarding the selected emergency alert. The emergency data associated with the device identifier may include one or more historical locations. The device identifier may be, but is not limited to, a phone number, an email address, or an IP address. The emergency data may include, but is not limited to, caller information, sensor data, emergency contact information, emergency indication, and medical information. The at least one data overlay may include, but is not limited to, one or more Internet of Things (IoT) sensors graphically depicted on the interactive map. The IoT sensors may include, but are not limited to, a network-enabled camera, video camera, environmental sensor, or any combination thereof. The at least one data overlay may include, but is not limited to, one or more first responders graphically depicted on the interactive map. The at least one data overlay may include, but is not limited to, traffic data graphically depicted on the interactive map. The emergency response application may be configured to allow user adjustment of one or more filters for graphically depicting at least a subset of the emergency data on the interactive map. The incident shown on the interactive map may be configured to be user selectable and displays at least a subset of the emergency data associated with the incident upon user selection. The at least a subset of the emergency data may include, but is not limited to, user name, user address, emergency contact information, or any combination thereof. The emergency response application may be configured to automatically remove one or more incidents from the interactive map over time.

A disclosed method for presenting emergency data at a workstation/computing system of an emergency network (i.e. emergency service provider (ESP)), may include a) receiving, emergency data sourced from one or more databases, including a current location and an associated device identifier; b) detecting, an emergency alert associated with the device identifier; c) linking the emergency alert to the emergency data; and d) providing a graphical user interface (GUI) with: i) an interactive map showing a geographic representation of a jurisdiction of the ESP and graphically depicting one or more emergency alerts within the jurisdiction, wherein the one or more emergency alerts includes the emergency alert associated with the device identifier; and ii) a list of one or more emergency alerts showing at least a subset of the emergency data associated with the one or more emergency alerts.

A disclosed computer-implemented system for presenting emergency data at an emergency network (emergency service provider (ESP)) workstation/computing system, may include: an emergency response application communicatively coupled to a network server with a graphical user interface (GUI) accessible by a PSAP workstation/computing device through a network, where the emergency response application is configured to: a) receive emergency data sourced from one or more databases, including a current location and an associated device identifier; b) detect an emergency alert associated with the device identifier; c) link the emergency alert to the emergency data; and d) provide a graphical user interface (GUI) with: i) an interactive map showing a geographic representation of a jurisdiction of the ESP and graphically depicting one or more emergency alerts within the jurisdiction, wherein the one or more emergency alerts includes the emergency alert associated with the device identifier; and ii) a list of one or more emergency alerts showing at least a subset of the emergency data associated with the one or more emergency alerts.

A disclosed method for presenting emergency data at an emergency network (emergency service provider (ESP)) workstation/computing system, may include: a) receiving emergency data sourced from one or more databases, including a current location and an associated device identifier; b) detecting an emergency alert associated with the device identifier; c) linking the emergency alert to the emergency data; and d) providing a graphical user interface (GUI) with: i) an interactive map showing a geographic representation of a jurisdiction of the ESP and graphically depicting one or more emergency alerts within the jurisdiction, wherein the one or more emergency alerts includes the emergency alert associated with the device identifier; and ii) a list of one or more emergency alerts showing at least a subset of the emergency data associated with the one or more emergency alerts.

A disclosed method for delivering emergency data to a public safety answering point (PSAP), may include: a) receiving available emergency data associated with a device identifier from one or more databases, including a current location; b) retrieving a geofence associated with the PSAP using the identifier of the PSAP, wherein the geofence encloses a region within a jurisdiction of the PSAP; c) determining if the current location is within the geofence associated with the PSAP; d) in response to determining that the current location is within the geofence associated with the PSAP, transmitting the emergency data to a PSAP workstation/computing device; and e) providing an emergency response application with a graphical user interface (GUI) accessible by the workstation/computing device at the PSAP, the GUI including: i) an interactive map showing a geographic representation of a jurisdiction of the ESP and graphically depicting one or more incidents within the jurisdiction; and ii) a list of one or more incidents showing at least a subset of the emergency data that is associated with the one or more incidents.

A disclosed method for delivering emergency data to a public safety answering point (PSAP), may include: a) providing an emergency response application with a graphical user interface (GUI) accessible by a computing device at a public safety answering point; b) receiving login information for a member of the PSAP from a workstation/computing device; c) generating a temporary access token authorizing the member of the PSAP to access emergency data, wherein the temporary access token is derived from credentials associated with the PSAP; d) accessing a data feed of the PSAP to identify an emergency incident and an associated device identifier; e) associating the emergency incident with an identifier of the PSAP based on the temporary access token; f) receiving emergency data associated with the device identifier from one or more databases, including a current location; and g) transmitting the emergency data to the workstation/computing device for display on the a GUI with: i) an interactive map showing a geographic representation of a jurisdiction of the ESP and graphically depicting one or more incidents within the jurisdiction; and ii) a list of one or more incidents showing at least a subset of the emergency data that is associated with the one or more incidents.

A disclosed computer-implemented system for delivering emergency data to an emergency network such as a public safety answering point (PSAP) workstation/computing system, includes: a) an emergency response application communicatively coupled to a network server with a graphical user interface (GUI) accessible by a PSAP workstation/computing device through the emergency network, wherein the emergency response application is configured to: i) receive emergency data regarding an emergency incident with a device identifier and a current location; and ii) an interactive map showing a geographic representation of a jurisdiction of the emergency network and graphically depicting one or more incidents within the jurisdiction, wherein the one or more incidents includes the emergency incident; and iii) a list of one or more incidents showing at least a subset of the emergency data associated with the one or more incidents; and b) an emergency data manager communicatively coupled to a network server and configured to: i) gather emergency data associated with the device identifier from one or more databases, including a current location; ii) retrieve a geofence associated with the PSAP using an identifier of the PSAP, wherein a geofence encloses a region within a jurisdiction of the PSAP; iii) determining if the current location is within the geofence associated with the PSAP; and iv) in response to determining that the current location is within the geofence associated with the PSAP, transmitting the emergency data to the computing device for display through the GUI.

A disclosed computer-implemented system for delivering emergency data to an emergency network such as a public safety answering point (PSAP) workstation/computing system, the system configured to: a) provide an emergency response application with a graphical user interface (GUI) accessible by a workstation/computing device at a PSAP; b) receive login information for a member of the PSAP from the computing device; c) generate temporary access token authorizing the member of the PSAP to access emergency data, wherein the temporary access token is derived from credentials associated with the PSAP; d) access a data feed of the PSAP to identify an emergency incident and an associated device identifier; e) associate the emergency incident with an identifier of the PSAP based on the temporary access token; f) receive emergency data associated with the device identifier from one or more databases, with a current location; and g) transmit the emergency data to the computing device for display on the computing device through the GUI with: i) an interactive map showing a geographic representation of a jurisdiction of the ESP and graphically depicting one or more incidents within the jurisdiction, wherein the one or more incidents includes the emergency incident associated with the device identifier; and ii) a list of one or more incidents showing at least a subset of the emergency data associated with the one or more incidents.

A disclosed non-transitory, non-volatile, computer readable storage media encoded with a computer program includes instructions executable by at least one processor, that when executed cause the processor to: a) receive available emergency data associated with a device identifier from one or more databases with a current location; b) retrieve a geofence associated with the PSAP using the identifier of the PSAP, wherein the geofence encloses a region within the jurisdiction of the PSAP; c) determine if the current location is within the geofence associated with the PSAP; d) in response to determining that the current location is within the geofence associated with the PSAP, transmit the emergency data to a PSAP computing device; and e) provide an emergency response application with a graphical user interface (GUI) accessible by the workstation/computing device at the PSAP. The GUI includes: i) an interactive map showing a geographic representation of a jurisdiction of the PSAP and graphically depicts one or more incidents within the jurisdiction, wherein the one or more incidents includes the emergency incident associated with the device identifier; and ii) a list of one or more incidents showing at least a subset of the emergency data associated with the one or more incidents.

Another disclosed method is for displaying information to emergency response providers on a spatial map. The method includes: displaying a location of an emergency on a map; displaying one or more emergency assets proximal to the location of the emergency; and displaying one or more data layers around the location of the emergency, wherein the data layers may include weather, traffic, and hazards. Emergency assets may include, but are not limited to, medical (for example ambulances, defibrillators, etc.), fire (for example, fire trucks, fire extinguishers, fire hydrants, etc.), police and safety assets, etc.

Turning now to the drawings wherein like numerals represent like components, FIG. 1 illustrates an emergency data manager 100 which is operative to communicate with various multiple Enhanced 9-1-1 (E911) or Next Generation 9-1-1 (NG911) emergency networks 170 via network connections 175. E911 and NG911 emergency networks are defined according to the National Emergency Number Association (NENA) standards which define applicable network architectures and protocols for communication between various network entities within the network architectures. An emergency network may also be referred to as an emergency service provider (ESP) and includes various public and private emergency service providers such as a public safety answering point (PSAP), a public safety services (PSS) as well as private emergency service providers. Put another way, an ESP is an organization that owns and operates an emergency network where the emergency network includes the infrastructure, network entities, communication devices and other equipment required to provide the emergency services. In FIG. 1, double arrowed lines represent operative coupling which may be implemented as backhaul connections between network entities, or as wireless connections between network entities and devices. Curved, dotted lines in FIG. 1 represent network connections or data connections over which data may be sent and received by respective devices, network entities or by combinations of devices and network entities sending data to, and receiving data from, each other, accordingly. The network connections may be Internet connections and may further include Virtual Private Network (VPN) pathways or other secure connections. The emergency data manager 100 is operatively coupled to emergency networks 170 via operative coupling 178, which may be implemented as network connections 175 through the Internet 190. The network connections 175 may include an Internet protocol (IP) connection between each of the emergency networks 170 and the emergency data manager 100 and may be connection oriented or connectionless. For example, the network connections 175 may include IP connections which may include a TCP (Transmission Control Protocol, also referred to as Transport Control Protocol) connection, a UDP (User Datagram Protocol) connection or a combination of both such as UDP over TCP, etc., or a combination of TCP and UDP connections, etc. An IP connection may further employ one or more TCP sockets or one or more WebSocket connections. The emergency networks may have backhaul connections 173 to the Internet 190 and backhaul connections 176 to national or regional emergency networks 180. The emergency data manager 100 may operate as an interface between the emergency networks 170, databases 120 and devices 160, to provide emergency data to the emergency networks 170. The emergency data manager 100 is operative to retrieve various types of emergency data such as location data, medical data, sensor data, camera data and other data, etc., determine the appropriate emergency network 170 authorized to receive specific emergency data, and provide that specific emergency data to the authorized emergency network. The emergency data manager 100 may, under some circumstances and for certain types of emergency data, store obtained emergency data in one or more databases which may be distributed databases. The emergency data manager 100 may communicate with, and retrieve and obtain data from, the various databases 120, and may also receive and store emergency data from the devices 160. The emergency data manager 100 determines the authorized emergency network using a geofence database 101 which includes boundary information for all of the emergency networks 170 and also for national or regional emergency networks 180.

The various emergency networks 170 may include various public safety answering points (PSAPs). Each emergency network may include an emergency dispatch center and employ a computer aided dispatch (CAD) system. Each emergency network 170 includes at least one workstation 140, which may be a CAD system, a call handling system or some other type of workstation, and which provides various graphical user interfaces (GUIs) on a display 141 for use by emergency network personnel. Each individual emergency network 170 may include an emergency call handling system which is operatively coupled to a PSTN (public switched telephone network) and various wireless networks 110 via appropriate backhaul connections 171.

The various emergency networks 170 are each operative to receive emergency calls 103 from a variety of devices 160 and a variety of device types. Each individual emergency network 170 may also receive emergency alerts 105 and establish emergency sessions 108 from the various devices 160 over the Internet 190. An emergency alert 105 may be sent as, for example, short message service (SMS) messages, SMS data messages, instant messages (IM), multimedia messages (MMS), email, or other formats of messages sent as Internet Protocol (IP) messages. For example, IP based messages may be sent using TCP, UDP, SIP, HTTP, or other mechanisms, etc. Emergency sessions 108 may also be established using these same, or other, IP protocols. An emergency session 108 refers to communication over an Internet connection between any the various types of devices 160 and an emergency network, where there is bi-directional communication between one of the devices 160 and a particular emergency network of the emergency networks 170. One example of an emergency session 108 is a Voice-over-IP (VoIP) call using Session Initiation Protocol (SIP). Another example is an IP call using H.323 protocol, or some other communication protocol, etc. An emergency alert 105 may be, but is not limited to, data sent from a device 160 to a given one of the emergency networks 170. Because the emergency alert 105 will contain information that identifies the specific device 160 that sent the alert, the specific emergency network that received the emergency alert 105 may be able to respond to the device 160 by sending a response or acknowledgement message, or by making a call-back if the device 160 is for example, a mobile telephone such as a smartphone 107. The information that identifies a specific device 160 is referred to herein as a "device identifier."

The various types of devices 160 that may communicate with an emergency network include, but are not limited to, desktop computers, laptop computers, tablets, mobile phones, smartphones 107, smartwatches 111 (or other health and medical tracking devices), medical bracelets 109, and various wired devices which may be Internet-of-Things (IoT) devices 113 which are operative to send and receive data from a wireless network such as, but not limited to, a $5^{th}$ generation mobile network (5G network). A medical bracelet 109 may be a type of IoT device in some instances. The medical bracelet 109 may be operative to transmit an emergency alert 105 to an emergency network. Emergency calls may also be made from landline phones connected to a PSTN and medical bracelet 109 and/or health monitoring device, such as a medical bracelet 109, may use a wireless access point connected to the PSTN to place an emergency call 103 or send emergency alert 105. Each of the devices 160 may also be operative to send data updates 106 to various databases 120. The databases 120 may contain protected data in that the data is subject to various statutorily defined protections, such as, but not limited to, HIPPA, GDPR, or other statutorily defined data protection and data privacy requirements. The databases 120 may include location databases 121, medical databases 123 and other databases 125 with various personally identifiable data related to device 160 users. The data contained in the databases 120 is referred to as "emergency data" and may be retrieved by the emergency data manager 100 via an IP connection 161.

In each emergency network 170, at least one workstation 140 includes one or more processors that are operative to execute one or more emergency services related applications such as an emergency response application 144. The workstation 140 includes a display 141 operative to display one or more graphical user interfaces (GUIs), such as GUI 142 and GUI 143, which are related to, and provided by, the emergency response application 144. The emergency response application 144 is operative to communicate with the emergency data manager 100. The emergency data manager 100 is included within an emergency data management network 102 which may include one or more servers, and one or more databases such as geofence database 101. The emergency data manager 100 may be implemented as a server having at least one processor, or may be implemented as a distributed system with multiple servers, processors, memory and databases, and may further provide cloud-based, software-as-a-service (SaaS) features and functions. The GUI 142 and GUI 143, in conjunction with the emergency response application 144, are operative to retrieve and display emergency data provided by the emergency data manager 100. The GUI 142 and GUI 143 provide communication between the workstation 140 and the emergency data manager 100. The GUIs may each be provided as a web browser interface, such as a cloud-based application interface (i.e. a software-as-a-service SaaS interface), or via a web browser plug-in, or may be associated with applications running as executable instructions, executed by one or more processors on the machine/workstation on which the GUIs are displayed, or by any other software implementation mechanism.

Emergency services personnel may receive appropriate emergency services information and view emergency data via the GUI 142, GUI 143 and other GUIs, and place dispatch calls to emergency responders who receive the dispatch calls and emergency data on various emergency responder devices 150 accordingly. Emergency responders, also referred to as emergency service providers (ESPs) may utilize a variety of emergency responder devices 150 which may include, but are not limited to, desktop computers, laptop computers, tablets, mobile phones, smartphones, radios (i.e. walkie-talkies), in-vehicle computers, etc., all of which are operative to display emergency data to the emergency responders. The devices 150 may be operative to send emergency data requests to a respective emergency network 170 and also authentication data. The devices 150 communicate with the emergency networks 170 over a combination of wireless networks 110 and proprietary wireless networks that provide wireless communications links 177. Each of the devices 150 may include a mobile emergency response application, that provides a GUI 155 and that is operative to communicate with the emergency response application 144 and the emergency data manager 100.

An emergency data request from an ESP device 150, may be sent by an appropriate one of the emergency networks 170 to the emergency data manager 100 such that the emergency data manager 100 may identify the emergency and any emergency data pertaining to the emergency stored by the emergency data manager 100 or contained within the various databases 120, and transmits the pertinent emergency data to the requesting ESP device 150. In other words, in some implementations, the emergency data manager 100 may serve as a data pipeline for ESP devices 150 through which the ESP devices 150 may request and retrieve reliable emergency data through secure pathways using defined protocols and formats. The emergency data may be, but is not limited to, accurate location data, that is critical for responding to an emergency. The emergency data manager 100 is operative to obtain emergency data from various sources including other servers, databases and devices 160.

In one example of operation, an emergency alert 105 may be triggered by a device 160 in any of various ways such as, but not limited to, device fall detection, by the user pressing a soft button or a physical button (i.e. a "panic button"), a voice command, a gesture, or autonomously based on other sensor data such as via a smoke, carbon-monoxide, burglar alarm, or some other alarm, etc. In some situations, the user may confirm the emergency or provide authorization for sending the emergency alert 105.

Emergency data, such as enhanced location data, medical data, or other data, may be sent by the device 160 to an appropriate one of the emergency networks 170 as part of the emergency alert 105, or may be sent as data updates 106 to a specific database of the various databases 120. The emergency data manager 100 may interact with the given emergency network to access and obtain the emergency data, or the emergency network may send an emergency data request to the emergency data manager 100 such that the emergency data manager 100 may search or query the various databases 120 in response to receiving an emergency alert 105. In some implementations, an emergency data request may be sent by the emergency data manager 100, over the IP connections 161, to the various databases 120 in response to an emergency alert 105 received by an emergency network.

The emergency data manager 100 or the emergency network may format stored emergency data or any received emergency data into a format that is compatible with industry standards for storing and sharing emergency data. For example, the emergency data may be formatted to be compatible with National Emergency Number Association (NENA) standards. Where emergency data is stored by the emergency data manager 100, emergency data requests may be sent to the emergency data manager 100 by an emergency network, such as via an HTTP GET request. Therefore, emergency data requests may be sent from any one of the emergency networks 170 to the emergency data manager 100. The emergency data requests may utilize Location Information Server (LIS) protocol. For emergency data related to location, the data may include, but is not limited to, device generated location data (such as device 160 GPS chipset data), location information such as Location-by-Reference, Location-by-Value, etc. from, for example a, Location Information Server (LIS) or from other sources.

Each of the emergency networks 170 may be operatively coupled, via appropriate backhaul connections 176, to one or more national or regional emergency networks 180. The national or regional networks 180 each include an emergency event application 181 which is operative to, among other things, display emergency events for a hierarchical view of emergencies being handled by one or more of the emergency networks 170.

Figure 2:
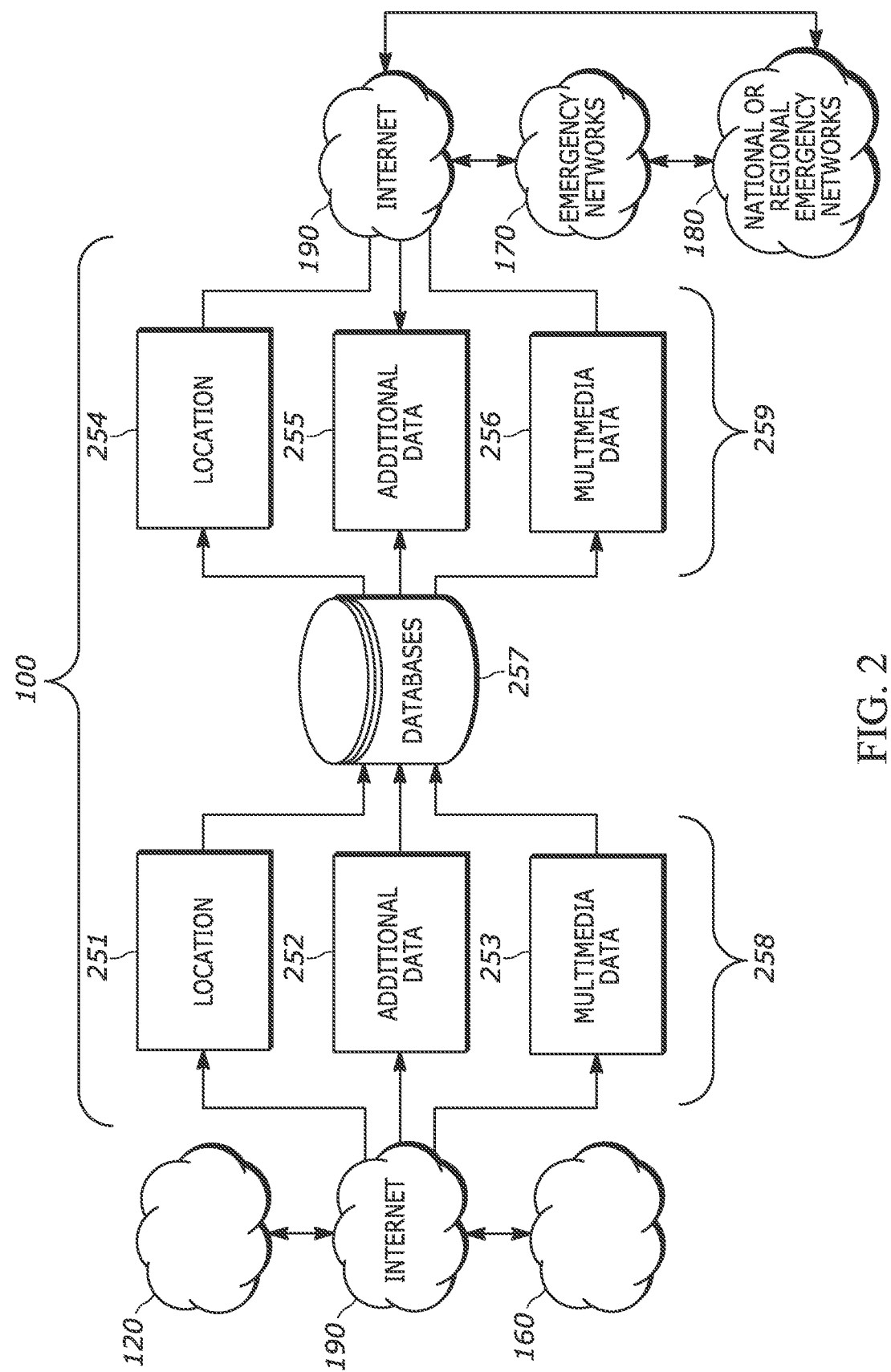
FIG. 2 is a diagram illustrating an emergency data manager.

FIG. 2 provides an example implementation of the emergency data manager 100 shown in FIG. 1. The emergency data manager 100 includes a set of data ingestion modules 258 and a set of retrieval modules 259. The set of data ingestion modules 258 are operative to communicate with the various databases 120 to obtain emergency data and may include a location ingestion module 251, an additional data ingestion module 252, and one or more multimedia ingestion modules 253. The location ingestion module 251 is an emergency location service ingestion interface which is operative to post or receive emergency locations. The location ingestion module 251 may be a REST API that is operative to receive an HTTP POST including location data when an emergency alert 105 is generated or when an emergency call 103 is received from a device 160. The location data may include a location generated concurrently or in response to the generation of the emergency alert 105, which may initiate an emergency call 103 or emergency session for requesting emergency assistance. This generated location data may be, for example, location data from a device 160 GPS chipset, such as GPS coordinates. This data may also include data from a device 160 inertial-measurement-unit (IMU). The location data may be generated before an emergency alert 105 such as, for example, when a medical bracelet IMU detects that a patient has fallen. In another example, when an emergency call 103 is made from a device 160, the location ingestion module 251 may receive a location recently generated by the device 160 GPS chipset, or by a device 160 triangulation algorithm, or other device 160 location mechanism, thereby ensuring that a location for the emergency is available as quickly as possible. The location data may include a device-based hybrid location generated by a device 160 which has sent an emergency alert 105. A GPS chipset within the device 160 may generate the location data. The location data may also include a location data generated by a second device 160 that is communicatively coupled to the device 160 that sent the emergency alert 105. For example, a wearable device such as a medical bracelet or smartwatch, that does not include location capabilities, may use the location services location from a mobile phone with which it is paired. The location ingestion module 251 may communicate with a device 160 via a mobile application installed on the device 160 or via firmware or an operating system of the device 160.

The location data generated by a device 160 prior to an emergency occurrence may be accessible by an authorized one (based on device 160 location) of the emergency networks 170 during an emergency. For example, a taxi company may have software that transmits the location of its cars or assets to the emergency data manager 100, or another server, preemptively. Thus, when an emergency arises, the location of the affected taxi can be made accessible quickly to send for help. Further, location data generated by a device 160 after an emergency has commenced may be made accessible to one of the emergency networks 170 during the on-going emergency. For example, updated location data of a hijacked taxi may be periodically transmitted to the emergency data manager 100 and made accessible to one or more of the emergency networks 170.

The additional data ingestion module 252 may be an interface for posting or receiving static or dynamic emergency profile data. Such additional data may include, but is not limited to, medical data, personal data, demographic data, and health data, which may be obtained from the various databases 120. For example, medical data may include information relating to a person's medical history, such as medications the person is currently taking, past surgeries or preexisting conditions. Personal data may include a person's name, date of birth, height, weight, occupation, addresses such as home address and work address, spoken languages, etc. Demographic data may include a person's gender, ethnicity, age, etc. Health data may include information such as a person's blood type or biometrics such as heart rate, blood pressure or temperature. Additional data may further include data received from connected devices such as vehicles, IoT devices 113, and wearable devices such as medical bracelet 109, smartwatch 111 or other devices, etc. For example, intelligent vehicle systems may generate and send data regarding a crash, such as the speed at which the vehicle was moving just before the collision, where the vehicle was struck, the number of occupants, etc. The additional data ingestion module 252 may be a REST API, for example using JSON (JavaScript Object Notation).

In another example of operation, if an emergency call 103 is made from a mobile phone, or if an emergency alert 105 is sent, the mobile phone may receive a heart rate of the person who made the emergency call from a smartwatch 111 worn by the person and communicatively coupled to the cell phone via a Wi-Fi® or Bluetooth™ connection or some other wireless connection. The mobile phone may therefore send the heart rate to the additional data ingestion module 252, along with any other additional data, in an HTTP POST. The additional data ingestion module 252 may communicate with a device 160 via a mobile application installed on the device 160 or integrated into the firmware or operating system of the device 160. Additional data may also be sent to the additional data ingestion module 252 from a network server. The additional data ingestion module 252 may be accessed by any connected platform that receives data that might be relevant in an emergency. Connected platforms, such as the various databases 120, may therefore send additional data to the additional data ingestion module 252 at any time. A website, web application, or mobile application may communicate with the additional data ingestion module 252 and may allow device 160 users to create profiles to send additional data included in the profiles to the additional data ingestion module 252 every time a profile is created or updated.

A third ingestion module, multimedia ingestion module 253, may provide an interface for posting or receiving data relevant to emergencies that is not received by the location ingestion module 251 or the additional data ingestion module 252, such as audio or video streams obtained during an emergency from a device 160 that is proximal to the emergency. In one example of operation, if an emergency alert 105 is generated by an intelligent vehicle system installed in a vehicle in response to the vehicle experiencing a collision, the emergency alert 105 is sent to one of the emergency networks 170 by the intelligent vehicle system or by another device 160 communicatively coupled to the intelligent vehicle system, such as a mobile phone coupled to the intelligent vehicle system via Bluetooth™. In response to generating the emergency alert 105, the intelligent vehicle system may additionally begin streaming audio and video from microphones and cameras installed inside or outside of the vehicle to the emergency data manager 100 through the multimedia ingestion modules 253. A mobile phone communicatively coupled to the intelligent vehicle system may additionally or alternatively stream audio or video from microphones and cameras integrated into the mobile phone to the emergency data manager 100 through the multimedia ingestion modules 253. The one or more multimedia ingestion modules 253 may be REST APIs that are accessed with an HTTP POST.

After receiving the relevant data, the set of data ingestion modules 258 can store the data in one or more databases 257. The emergency data manager 100, databases 257 may include a location database, the geofence database 101, and one or more other additional data databases. The emergency data manager 100 databases 257 are operatively coupled to, or otherwise accessible by, one of the emergency networks 170. The set of data ingestion modules 258 tags or otherwise associates the data received by the modules with an identifier of a user or specific device 160 associated with the data. For example, the set of data ingestion modules 258 may tag the data received by the data ingestion modules 258 with a user ID number, an email address, or a phone number (i.e. caller ID), a MAC address, or other device or user identification information, etc. The data ingestion modules 258 may also tag the data received by the emergency data manager 100 based on the data source using, for example, a device name or type, an application name, user name, phone number, corporate account, or etc.

An individual or group of individuals may be associated with multiple identifiers. In an example of operation, if the location ingestion module 251 receives a location generated by a phone associated with the phone number +1-555-555-5555, associated with John Doe, the additional data ingestion module 252 may also receive a heart rate from a smartwatch associated with the email address jobndoe@email.com, which is an identifier that is also associated with John Doe. In this example, the set of data ingestion modules 258 tag the location with the phone number "+1-555-555-5555," and tag the heart rate with the email address "johndoe@email.com," thereby associating both the location and the heart rate with John Doe in the emergency data manager 100 databases 257.

Ingestion data that enters the emergency data manager 100 may include various data fields and associated data entries within the data fields. The emergency data manager 100 maintains a list of expected data fields so that the data entries can be entered within a specific data field.

The emergency data manager 100 may include a set of retrieval modules 259 such as a location retrieval module 254, an additional data retrieval module 255, and one or more multimedia retrieval modules 256. The location retrieval module 254 may be an interface for retrieving location data from the emergency data manager 100 databases 257. The location retrieval module 254 may be a JSON REST API operative to receive a query or request such as, but not limited to, an HTTP GET request, from the emergency networks 170 or an ESP device 150.

The location retrieval module 254 may provide a single GET endpoint for retrieving either the latest or paginated list of locations for a specific caller ID. For example, a phone number associated with a device 160 from which a location was received may be included in a header, body, or metadata of a request sent to the location retrieval module 254. The emergency data manager 100 may then retrieve a location or set of locations from the emergency data manager 100 databases 257 and deliver the location or set of locations to the relevant authorize emergency network 170 or to an ESP device 150 associated with the authorized emergency network. The location retrieval module 254 may be a location information server (LIS), in which the LIS may further be a NG911 standards-based XML API for the retrieval of location data from the emergency data manager 100 databases 257. The location retrieval module 254 may be operative to accept HELD requests from the emergency networks 170 or from ESP devices 150 and to return location data for a specific caller ID or anonymous reference.

The set of retrieval modules 259 may also include an additional data retrieval module 255, which may be implemented as a JSON REST API for the retrieval of emergency or additional data. Additional data may include, but is not limited to, medical data, personal data, demographic data, health data or other data which may be protected data. Additional data may also include data received from connected devices 160 such as, but not limited to, vehicles, IoT devices, and wearable devices. The additional data retrieval module 255 is operative to receive a query or request, such as an HTTP GET request, from an emergency network 170 or ESP device 150. The additional data retrieval module 255 may then, in response to a request, retrieve additional data associated with a specific or particular identifier of a user or a device 160 associated with the user, such as a phone number, and return the data to the emergency network 170 or ESP device 150. The set of retrieval modules 259 further includes one or more multimedia retrieval modules 256, which function similarly to the location retrieval module 254 and additional data retrieval module 255, for the retrieval of data stored in the emergency data manager 100 databases 257 not retrieved by the location retrieval module 254 or additional data retrieval module 255.

The emergency data manager 100 determines which of the emergency networks 170 and associated ESP devices 150 have authorization to receive particular types of emergency data. For example, a given emergency network or ESP device 150 may, in certain circumstances, be granted access only to a particular subset of emergency data. For example, a police officer may only be given access to the location emergency data, while an EMT (emergency medical technician) may only be given access to an additional data emergency data. However, a given emergency network such as a national or regional emergency network 180, or associated ESP device 150, may be given differential access to the entirety of the emergency data, or to particular emergency data categories within the databases 257 based on any factor or set of factors. A management portal may be provided to determine which emergency data categories are returned from one of the emergency networks 170 to a particular emergency network or ESP device 150. Other data services corresponding to the various databases 120 may also be coordinated with respect to granting access to protected data.

Figure 3:
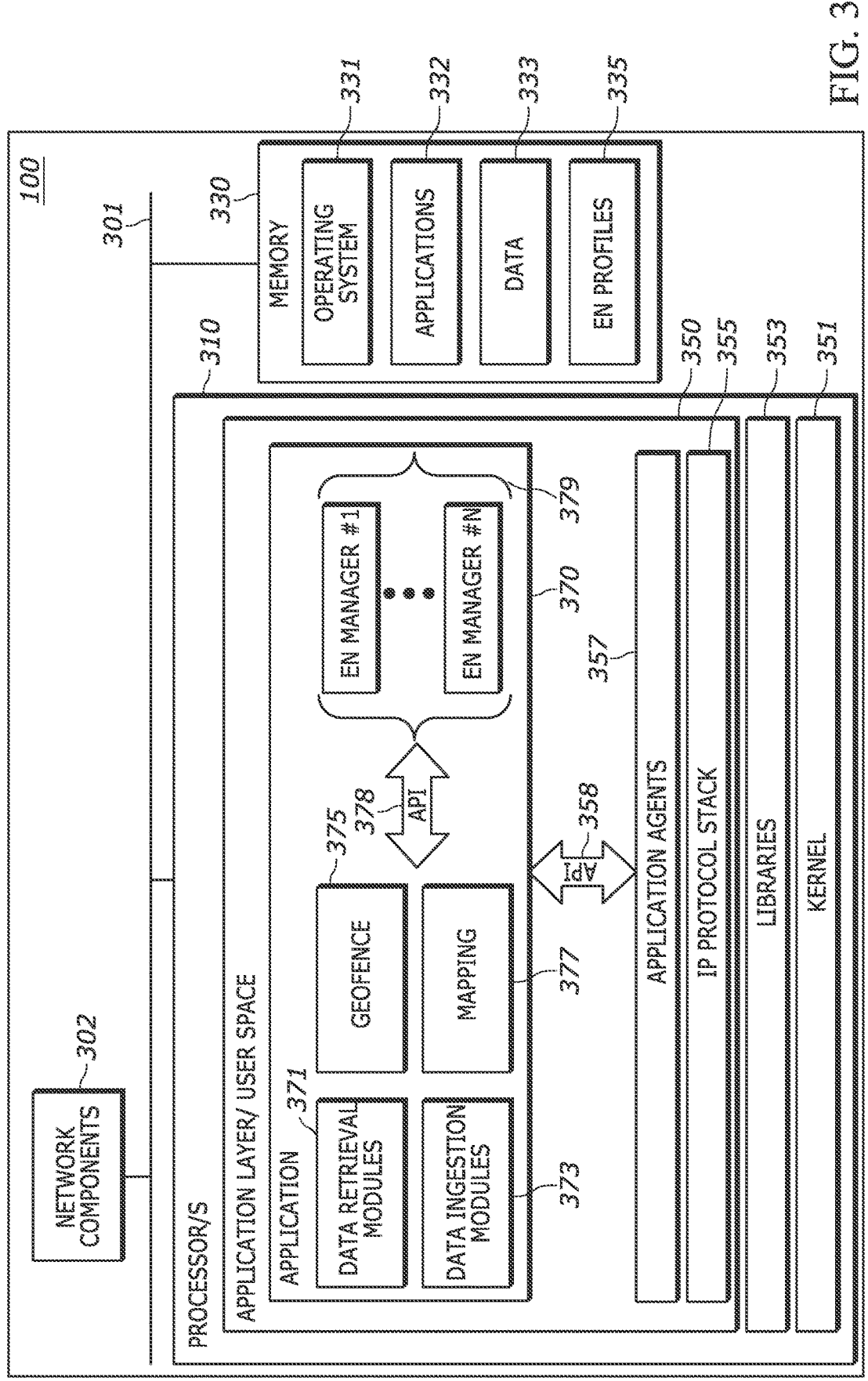
FIG. 3 is a diagram providing further details of an emergency data manager.

FIG. 3 provides an example emergency data manager 100. The emergency data manager 100 includes network components 302, at least one processor 310, and at least one non-volatile, non-transitory memory 330 in addition to RAM. The network components 302 may include one or more network transceivers for Ethernet connectivity to other network entities and an Internet connection. The memory 330 stores executable instructions and data such as executable instructions for an operating system 331 and various applications 332. The memory 330 also stores data 333 which may provide a location and geofence data cache and other data.

The processor 310 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 310 is configured and operative to fetch and execute computer-readable instructions (i.e. executable instructions) stored in the memory 330. For example, the operating system 331 executable instructions, when executed by the at least one processor 310, may provide a kernel 351, libraries 353 (i.e. application programming interfaces or "APIs"), an application layer 350 or "user space" within which the various applications are executed, and an IP protocol stack 355. The applications 332 executable instructions, when executed by the at least one processor 310, also provide data retrieval modules 371, data ingestion modules 373, a geofence module 375, a mapping module 377 and one or more emergency network managers 379. Emergency network profiles 335, stored in memory 330, may be accessed by the various modules and the emergency network managers 379 to access information needed to communicate with various emergency networks. The emergency network managers 379 communicate with the other modules of application 370 via a set of APIs 378. The processor 310 may further execute a set of application agents 357 which facilitate communication between the IP protocol stack 355 and the application 370 via various APIs 358. The application agents 357 are operative to, among other things, provide API communication between the various applications 332 and the kernel 351.

The emergency data manager 100 may be implemented as a cloud server. The term "cloud server" as used herein, refers to a server, accessible by an Internet connection, that is operative to host one or more applications that may be accessed by a computing device using a Web browser or an application resident on the computing device. The emergency data manager 100 is operative to provide a cloud-based application such as a software-as-a-service (SaaS) accessible remotely using a computer or workstation connected to the Internet and operatively coupled to the emergency data manager 100.

All of the components of the emergency data manager 100 are operatively coupled by an internal communication bus 301. As used herein, components may be "operatively coupled" when information can be sent between two such components, even though there may be one or more intermediate or intervening components between, or along the connection path. Therefore, any of the various components with the emergency data manager 100, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components of FIG. 3. A "module" as used herein may be a software component.

All of the components and modules described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), hardwired circuitry (logic circuitry), or combinations thereof. That is, any of the components or modules disclosed herein may be implemented using an ASIC, DSP, executable instructions executing on a processor, logic circuitry, or combinations thereof. In other words, the components and modules may be implemented as hardware, software or by combinations thereof. Therefore, each of the components and modules disclosed herein may be considered a type of apparatus that may be implemented and operate independently from the other components in the system.

The various embodiments also include computer readable memory that may contain executable instructions, for execution by at least one processor, that when executed, cause the at least one processor to operate in accordance with the emergency data manager 100 and other functionality herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices or electronic devices such as those that may benefit from the features and methods of operation herein described. The executable instructions may also include the various operating system environments and the kernel.

The emergency data manager 100 is operatively coupled to a geofence database 101 which stores jurisdictional boundary data for various emergency networks 170 as well as for the national or regional emergency networks 180. The emergency data manager 100 is operative to store and retrieve emergency data from the various databases 120, and may function as an interface between emergency networks, the various databases 120 and devices 160 to receive and store emergency data. The stored emergency data can be transmitted or distributed to emergency networks and emergency responder devices 150 before, during, or after emergencies.

The data retrieval modules 371, and data ingestion modules 373 operate similarly to the data retrieval and ingestion modules described with respect to FIG. 2. The emergency data manager 100 may receive emergency data from any of the devices 160 and such data may include, but is not limited to, locations, medical history, personal information, or contact information. During an emergency, the emergency data manager 100 is operative to detect the emergency and/or otherwise identify the need to provide emergency data pertaining to the emergency. In response to detecting an emergency, the emergency data manager 100 is operative to identify any emergency data pertaining to the emergency stored within the databases 120, retrieve and transmit the pertinent emergency data to the appropriate emergency network 170. The emergency data manager 100 may act as a data pipeline that automatically pushes emergency data to emergency networks that would otherwise be without access to emergency data that is critical to most effectively and efficiently respond to an emergency. Location data stored within, and/or obtained and provided by, the emergency data manager 100, enables emergency responders to arrive at the scene of an emergency faster, and the additional emergency data stored within, and/or obtained and provided by, the emergency data manager 100 enables emergency responders to be better prepared for the emergencies they face.

The emergency data manager 100 is operative to provide a cloud-based application to multiple emergency networks by establishing network connections via the IP protocol stack 355, with various emergency network entities such as a call handling workstation, CAD workstation etc. Other examples of emergency network entities include, but are not limited to, servers, desktop computers, laptops, routers, switches, etc. that are operative to send and receive data. The network connections may be transport control protocol (TCP) connections and may utilize WebSocket connections between the emergency data manager 100 and an emergency network entity. The geofence module 375 is operative to determine emergency network jurisdictional boundaries and to show the jurisdictional boundaries on a graphical user interface as a jurisdictional map view. The mapping module 377 is operative to generate the jurisdictional map view and to also post emergency data locations as location indicators on the map. For example, location indicators may show the location of incoming emergency calls that the emergency network has received, or is receiving. The emergency network managers 379 provide authentication and login capabilities for the various emergency networks and enable APIs 378 for communication between the emergency network entities and the geofence module 375 and mapping module 377.

Emergency networks and their corresponding emergency network entities are associated with a given geographic boundary. Based on the geographic boundary for a respective emergency network, a jurisdictional map view customized for the respective emergency network may be generated and provided to emergency network entities such as workstations for display. Within the jurisdictional map view for the emergency network, location indicators for emergencies occurring within its geographic boundary may be displayed. The jurisdictional map view for a given emergency network may include one or more geofences associated with the respective emergency network and surrounding areas. A jurisdictional map view for a given emergency network may also include a buffer zone as described below with respect to FIG. 17. The jurisdictional map view may include location indicators with various symbols and colors to denote different types of emergencies, data sources, status of emergency call, status of emergency response, etc. A data entry field may also be provided in the GUI 143 such that a user may input data about a location indicator. An emergency network may customize its jurisdictional map view based on its operational requirements or preferences.

In an example use case, an emergency alert may be triggered by a given device 160, for example by a user pressing a soft button, a physical button, initiating a voice command, or gesture, or autonomously based on sensor data such as from a smoke alarm. In this example use case, the user may be prompted to confirm the emergency or otherwise provide authorization for sending the emergency alert. Emergency data, such as an enhanced location and additional data regarding the user, such as the user's medical history, may then be delivered by the device 160 to the emergency data manager 100 and stored in a database. The emergency data manager 100 may format the emergency data into a format that is compatible with industry standards for storing and sharing emergency data. For example, the emergency data may be formatted to be compatible with National Emergency Number Association (NENA) standards. The emergency data manager 100 performs a push operation to push the emergency data to an emergency network entity.

Alternatively, an emergency network, such as a PSAP responding to an emergency alert, may query the emergency data manager 100 with an emergency data request which may be, for example, an HTTP GET request. The emergency data request may be in the form required by the Location Information Server (LIS) protocol. In response to the emergency data request, the emergency data manager 100 sends an appropriate response including relevant emergency data to the requesting party via an encrypted pathway. The emergency data request may be in the form of an HTTP-Enabled Location Delivery (HELD) and the response from the emergency data manager 100 may be in the form of a Presence Information Data Format Location Object (PIDF-LO) as defined by the Internet Engineering Task Force (IETF). An example PIDF-LO is shown in FIG. 6. The emergency data request includes an authorization code, also referred to as an "authorization token", in the body, header, or metadata of the request, and the emergency data manager 100 checks that the authorization code is active before providing a response to the requesting party. Authorization may be provided in the "Authorization" header of the emergency data request using HTTP Basic Authentication. For example, authorization may be a base64-encoded user name and password for an account associated with the requesting party. Emergency data requests are sent over public networks using API access keys or credentials. Transport Layer Security (TLS) may be used in the requests and responses from the emergency data manager 100 for encryption security.

Figure 4:
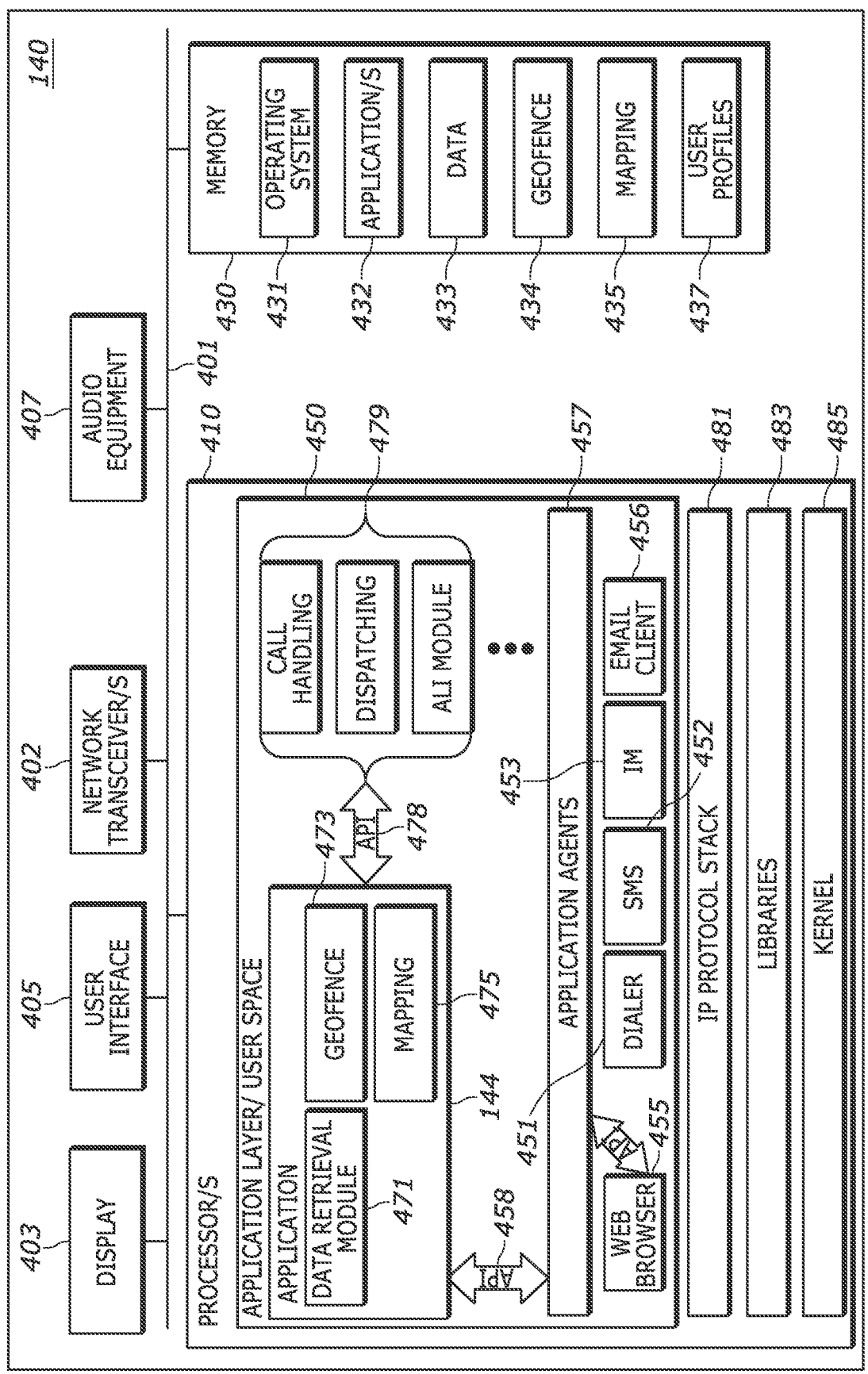
FIG. 4 is a diagram of an example emergency network workstation.

FIG. 4 provides an example emergency network workstation 140 which may be a call handling workstation, a CAD workstation, etc., which are examples of emergency network entities. An emergency network may be implemented with multiple emergency network entities of various kinds and therefore may have multiple workstations for example one or more call handling workstations, one or more CAD workstations, etc., in addition to routers, switches, hubs, access points, and other emergency network entities, etc. The example workstation 140 may include a display 403, a user interface 405, audio equipment 407, network transceiver/s 402, at least one processor 410, and at least one non-volatile, non-transitory memory 430 in addition to RAM. The network components may include one or more network transceivers for Ethernet connectivity to other workstations and devices and an Internet connection. The memory 430 stores executable instructions and data such as executable instructions for an operating system 431 and various applications 432. The memory 430 also stores data 433 which may provide data caching.

The processor 410 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 410 is configured and operative to fetch and execute computer-readable instructions (i.e. executable instructions) stored in the memory 430. For example, the applications 432 executable instructions, when executed by the at least one processor 410, may provide an operating system, a dialer application 451, a short-message-service (SMS) application 452, an instant message (IM) application 453, a web browser 455, an email client 456 and one or more IM and voice applications which may each provide IM and voice call capability separately or in combination. The operating system may include a kernel 485, libraries 483 (also referred to as "application programming interfaces" or APIs) and an application layer 450 or user space within which the various applications are executed, and an IP protocol stack 481.

The applications 432 executable instructions, when executed by the at least one processor 410, may also provide the emergency response application 144, and an associated GUI, and various emergency network applications 479 such as, a call handling application, dispatching application, ALI module and an emergency alert module. In some implementations, the emergency response application 144 may have a component that communicates with the emergency data manager 100. However, in other implementations, the Web browser 455 may provide the GUI 142 and GUI 143 enabling communication with a cloud-based application resident on the emergency data manager 100. In that case, the Web browser 455 communicates with the emergency data manager 100. In either implementation, communication is established between the workstation 140 and the emergency data manager 100 using the IP protocol stack 481 and a network connection is established which may be a TCP connection and which may include one or more WebSocket connections.

The emergency response application 144 may include geofence 434 executable instructions and mapping 435 executable instructions to implement a geofence module 473 and a mapping module 475. The data retrieval module 471 may communicate with the emergency data manager 100 to retrieve emergency data. The emergency data may be received by the workstation 140 via push operations from the emergency data manager 100 or may receive the emergency data as streaming data over a streaming connection. Application agents 457 may use APIs 458 to establish operative coupling between the emergency response application 144, the web browser 455, the IP protocol stack 481 and the various emergency network applications 479 and other applications executed by the at least one processor 410.

The geofence module 473 is for managing geofence data for the emergency network including assigning geofences to one or more responders or ESP members, etc. An ALI module provides location information, and a mapping module 475 displays information on a map on the display 403. The geofence module 473 is operative to provide an interface, such as a GUI, for an ESP user to manage and input geofences including shape files, such as GIS shape files, and other GIS data. The workstation 140 may also include a dispatch module for communication with emergency responders.

An emergency network may include one or more emergency network databases, one or more servers, and one or more workstations. The emergency network may also include a database of emergency responders, such as medical assets, police assets, fire response assets, rescue assets, safety assets, etc.

All of the components of the workstation 140 are operatively coupled by an internal communication bus 401. The display 403 is operatively coupled to the user interface 405 or may be considered a part of the user interface 405 such as in the case of a touchscreen which is both a display and a user interface in that it provides an interface to receive user input or user interactions. The user interface 405 includes a mouse and keyboard and the audio equipment 407 may include a microphone and a speaker.

The call handling module may include a call-handling application that emergency network personnel, such as PSAP personnel, may interact with to send an emergency data request to the emergency data manager 100. The response from the emergency data manager 100 is displayed at the display 403. Emergency data may include locations and additional data. Emergency data may further include one or more emergency data categories, also referred to as "data categories". The emergency data categories may include, for example: service data reference, full name, email, emergency contacts, addresses, language, occupation, phone numbers, web sites, gender, height, weight, ethnicity, profile picture, allergies, medical conditions, medications, disabilities, blood type, medical notes, birthday, and additional comments. Emergency data categories may be tagged with tags for specific types of data such as "demographics" or "medical data." For example, gender, height, weight, ethnicity, profile picture (image-url) may be tagged as demographic data. Medical data protected under HIPAA and other laws may be tagged as "HIPAA" or "private." Medical data may include information on one or more of allergies, medical conditions or illnesses, medications, disabilities, blood type, medical notes, and other medical information. Medical information protected under HIPAA are encrypted and/or anonymized. Some data are tagged as "general" or another similar tag, wherein access is not specifically restricted. User profiles 437 stored in memory 430 contain data that determines which staff members can access the workstation 140 as well as certain applications.

Subscription Model

The various emergency networks 170 or regional emergency networks 180 may subscribe to the emergency data manager 100 for a particular device identifier, and thereby receive updates for that particular device identifier. A device identifier may be, but is not limited to, a phone number, an email address, an IP address, a MAC address, or some other identifier etc. When an emergency network receives an emergency alert 105 for a phone number, the emergency data manager 100, or an emergency response application 144 resident on the emergency network workstation, will check the current location of the emergency alert 105 and run the current location through geofencing analysis. The emergency network may identify at least one geofence that encompasses the current location of the emergency. If the encompassing geofence is associated with the specific emergency network (i.e. emergency service provider (ESP) or PSAP, then the emergency network may subscribe that device identifier. The emergency alert may be then added to the alert queue or call queue at the workstation 140 display and include that emergency alert as an incident on an interactive map provided by the emergency data manager 100 in a cloud-based Web browser-based GUI, or via an emergency response application 144 GUI.

Subscribing to a device identifier provides updated emergency data without need for user queries. Thus, the relevant emergency data for an emergency is available to the emergency network workstation user without requiring any user input thereby saving precious minutes during emergency response. In addition, the credentialing system for ESPs and the geofencing analysis balances the need for quick and accurate emergency data (particularly accurate location) with the need to protect the privacy and security of user data.

Updated data may be provided periodically (e.g., every 1 minute, 5 minutes, 10 minutes, 20 minutes, etc.), or alternatively may be updated data only when there is a change, such as when the current location has changed significantly.

Initiating a subscription may involve establishing one or more connections between the ESP system and the emergency data manager 100. These connections may be TCP and may include WebSocket connections. For example, when a PSAP user (e.g., a call taker, a dispatcher, a supervisor) from the PSAP logs in to a computer terminal within the PSAP system, one or more WebSocket connection may be initiated. The WebSocket connections may be maintained for the duration of the PSAP user's log-in session.

In some non-emergency situations, there is a need to access location data, user data, emergency data or sensor data. For example, a user of an electronic device 160 may grant authorization to family members to access location data for the user. Accordingly, when a family member requests location data for a user, access is granted if there is proper authorization. As another example, a taxi operations company may request and obtain location data of one or more fleet members to keep track of its vehicles (e.g., via onboard vehicle console or terminal).

Push to Emergency Network Entity (ESP or PSAP Workstation/Computing Device)

An emergency alert 105 may be generated and sent to an emergency network by any type of device 160 without an associated emergency call 103. Thus, an emergency network workstation 140 user may see the emergency alert 105 related incident on the interactive map of the GUI 143, but not be assigned to take a call. A PSAP supervisor may review the emergency alert 105 and may determine that an emergency response is warranted. In such situations, a "push to PSAP" is initiated by sending the emergency alert 105 from the user device 160 to the emergency network. The emergency network workstation 140 user may accept the "push to PSAP" by creating an incident in CAD. This "push to PSAP" capability can be critical because there are currently limited pathways into the PSAP in some jurisdictions. That is, some jurisdictions can currently only accept emergency calls or texts. Using the push-to-PSAP feature, users and user devices can get access to emergency response through alternate pathways.

Geofence Determinations

When one or more emergencies are determined to be within the jurisdictional boundaries (i.e. within a geofence) of an emergency network, the emergency data manager 100 may determine whether one or more emergency network users are ready to accept pushed emergency data.

Portions of emergency data (e.g. emergency alerts located within a jurisdictional boundary of an emergency network) are determined by the emergency data manager 100 to be associated with a given emergency network jurisdictional boundary if an emergency call or emergency alert was originated by a device 160 located within the respective emergency network's jurisdictional boundary. The jurisdictional boundary is defined by one or more geofences. For example, location data of an emergency alert may be filtered to find locations within the geofence of an emergency network. That is, the location data within obtained emergency data may be filtered for locations that are within the jurisdictional boundary defined by one or more geofences for a respective emergency network. If there is no match, the location data of the emergency alert will be filtered for locations within the geofence of another emergency network. After there is a match, the emergency alert is associated with that emergency network and the process is halted. An emergency alert may be associated with one emergency network. Once a portion of obtained emergency data is determined to be associated with a given emergency network, it is likewise associated with emergency network entities, such as workstations, of the given network emergency network, and emergency data is then pushed or streamed to one or more network entities of the corresponding emergency network.

In some situations, an emergency alert may be matched with two or more emergency networks. For example, one matches may be to a primary agency (e.g., a PSAP) and one or more secondary agencies (e.g., a regional agency). In some implementations, a regional jurisdictional map view may be provided to regional emergency network, where the regional map view includes one or more jurisdictional boundaries of one or more emergency network. After there is a match, the emergency alert is checked against additional geofences that are available (e.g., additional geofences within a geofence database).

The emergency data manager 100 may establish and maintain one or more persistent connections (e.g., WebSocket, TCP/IP connections, REST, HTTP polling, HTTP streaming, SSE connection, HTTP/2 server push, web hooks, etc.) for various network entities of the emergency network such as a workstation 140. In some cases, there may be only one persistent connection associated with a user at the emergency network. In other cases, there may be multiple persistent connections with several users at the emergency network logged-in to various workstations. The emergency data associated with an emergency incident may be pushed to one or more persistent connections. The emergency data manager 100 is operative to probe the nature and quality of the persistent connection with the appropriate emergency network. For example, the emergency data manager 100 may check whether the persistent connection is active or inactive or whether the user has been inactive for a set period of time. The emergency data manager 100 may also check the quality of the connection such as the processing speed, time delay, etc.

A member of an emergency network, for example a PSAP staff member, may log into the emergency response application at an emergency network workstation 140. The emergency response application may be provided as a cloud-based software application GUI 143 which may be accessed using the web browser 455. The PSAP staff member may submit login information through the GUI 143 of the emergency response application. When the staff member logs in to the emergency response application by submitting their login information, the emergency data manager 100 then determines an emergency network account ID associated with the staff member's account and establishes a persistent communication link with the workstation 140, automatically subscribing the workstation 140 to the account ID for the duration of the login session. If the emergency data manager 100 receives an emergency alert 105 including a location (e.g., when a panic button is pressed, or an emergency call is made from a device 160 that sends an emergency alert 105 to the emergency data manager 100 including a location generated by the device 160 and a device identifier), the emergency data manager 100 retrieves geofences from the geofence database 101, and determines if the location falls within any of the geofences which correspond to emergency network jurisdictional boundaries. In response to determining that the location falls within a jurisdictional boundary as defined by a geofence associated with the emergency network, and with the staff member's account ID, the emergency data manager 100 associates the location with the account ID, and determines if there are any active persistent communication links between the emergency data manager 100 and any workstations/computing devices subscribed to the emergency network account ID. For example, if a workstation 140 is subscribed to the account ID and actively linked to the emergency data manager 100 through the persistent communication link, the emergency data manager 100 automatically pushes the emergency alert 105 or emergency data associated with the emergency alert 105 to the workstation 140 for display within the emergency response application GUI 143. Emergency alerts 105 or emergency data associated with an emergency alert 105 that has been pushed to an emergency network are displayed within a GUI 143 which may include a jurisdictional map view.

In response to determining that the location of a device 160 falls within the jurisdictional boundary defined by a geofence associated with the specific emergency network and identifying at least one persistent communication link between the workstation 140 (by way of the web browser 455) and the emergency data manager 100, the emergency data manager 100 transmits the location and identifier of the device 160 to the workstation 140 for display within the GUI 143. For example, two different workstations may be associated with a first emergency network and a third workstation may be associated with a second emergency network. When staff members of the two emergency networks log in to the emergency response application provided by the emergency data manager 100, each of the three workstations have a separate persistent communication link. In this example, each of the three workstations will be automatically subscribed by the emergency data manager 100 to the appropriate emergency network account IDs. Assuming each of the two emergency networks have jurisdictional boundaries defined by separate geofences that do not overlap, the respective geofences will have been tagged by the emergency data manager 100 with the respective emergency network account IDs during the registration process for the emergency response application.

In an example of operation, an emergency call 103 may be made by a device 160, which causes the device 160 to generate a first emergency alert 105 including a first location of the device 160 and transmit the first emergency alert 105 to the emergency data manager 100. When the emergency data manager 100 receives the first emergency alert 105, it determines that the first location of the device 160 falls within one of the geofences stored in the geofence database 101 associated with a jurisdictional boundary for PSAP A. In response, the emergency data manager 100 tags the first location with the emergency network account ID associated with PSAP A and the associated jurisdictional boundary defined by the geofence. The emergency data manager 100 then determines if there are any active persistent communication links between the emergency data manager 100 and any emergency network consoles subscribed to emergency network account ID for PSAP A and automatically pushes the first emergency alert 105 to those emergency network workstations. If more than one workstation at PSAP A is logged in, the emergency data manager 100 will push the first emergency alert 105 to all emergency network workstations of PSAP A for display within the GUI 143 in a jurisdictional map view. Any other workstations logged in that are not associated with PSAP A and it's corresponding jurisdictional boundary will not receive the emergency alert 105.

If the device 160 that generated the first emergency alert 105 has changed locations, and a subsequent emergency call is made thereby generating a second emergency alert 105 including a second location, again the emergency data manager 100 will, in response to receiving the second emergency alert 105, determine whether the device 160 is located within a jurisdictional boundary defined by a geofence stored in the geofence database 101. For example, the emergency data manager 100 may determine that the device 160 is now located within a second jurisdictional boundary defined by a second geofence associated with PSAP B. The emergency data manager 100 will therefore tag the second location within the emergency network account associated with PSAP B and geofence B, and will push the second emergency alert 105 to any workstations logged in for PSAP B.

Using the subscription model, the emergency data manager 100 can push emergency data to appropriate emergency networks without receiving an emergency data request or query. As a result, the emergency data manager 100 can use a jurisdictional map view within the emergency response application GUI 143 to display emergency alerts and emergency data associated with emergency alerts to appropriate emergency networks as the emergency alerts are received by the emergency data manager 100 in real-time. Using the subscription system to push emergency data from the emergency data manager 100 to emergency networks provides numerous advantages. For example, the GUI 143 allows members of an emergency network to see and be aware of all emergencies in their jurisdiction whether or not they are handling or responding to a particular emergency and whether or not an emergency call actually gets connected to the emergency network (e.g., a call that doesn't connect, a dropped call). Additionally, even if a member of the emergency network is not immediately able to respond to an emergency alert, they are still able to see where the emergency is located and when the emergency alert was received.

Various emergency responses may be initiated when an emergency call 103 is dropped, such as for example sending a message to the user, calling back the number, or sending patrols to the location, etc. The emergency response may be automated, such as, dispatch of surveillance drones to the emergency location. The emergency response may be initiated by an emergency network user after reviewing the emergency data.

Electronic Devices

Figure 5:
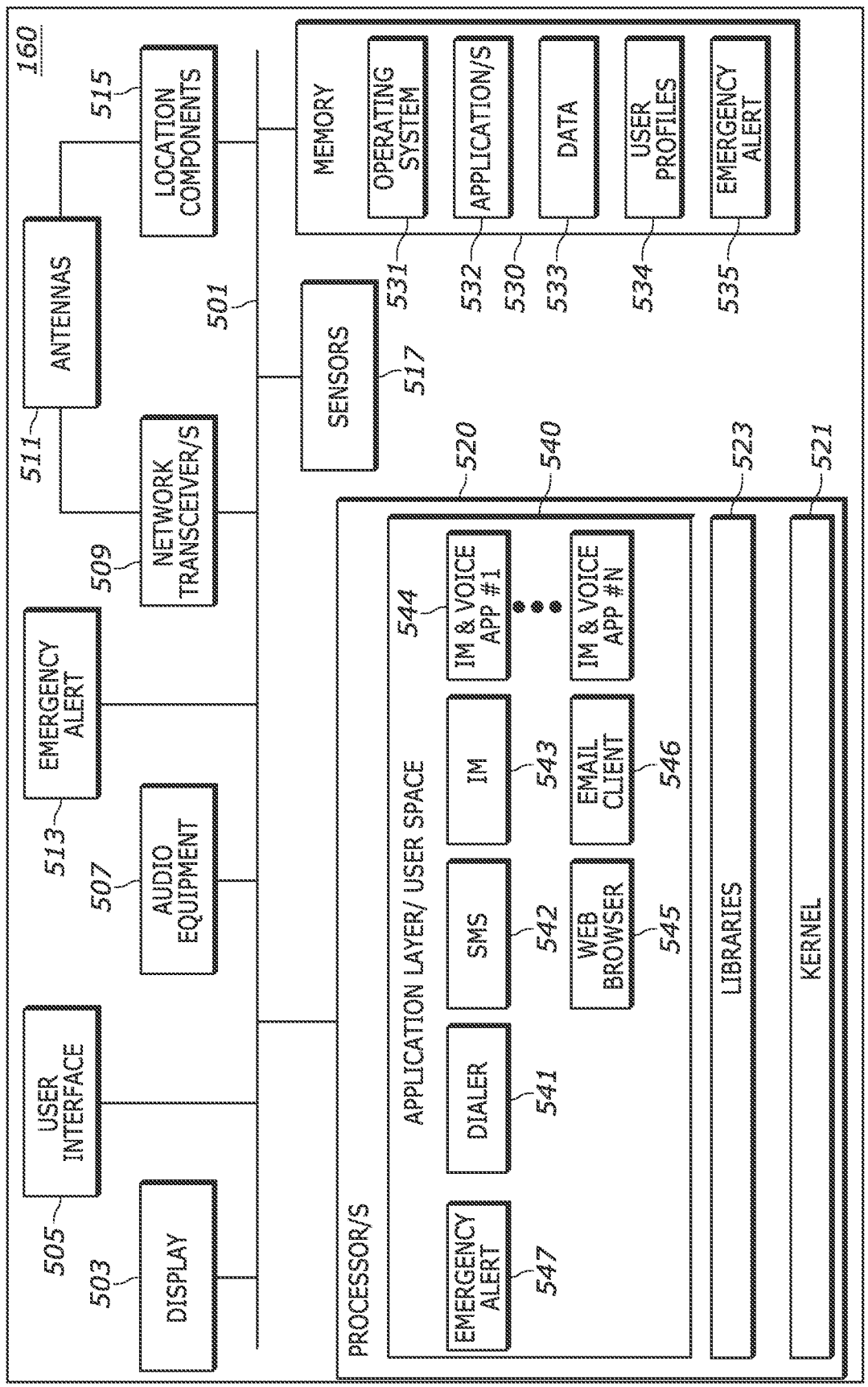
FIG. 5 is a diagram of an example electronic device which may be a device used to place an emergency call, etc. or may be an emergency responder device.

FIG. 5 provides an example device 160 which may be used as an emergency caller device 160 or as a responder device 150. It is to be understood that FIG. 5 is an example only, and that a given emergency caller device 160 or a given responder device 150 may have more components, less components, or different components than shown, depending on the specific function and type of device. Further, depending on the type of device, there may be hardware only, hardware and firmware, hardware and software, etc. and may therefore be implemented in various ways not limited by the components shown in the FIG. 5 example. The example device 160 may be, but is not limited to: a mobile or cellular phone such as a smartphone; a wearable device such as a medical information bracelet, a fitness tracker or a smartwatch; a computer, laptop, or tablet; a vehicle console; an Internet of Things (IoT) device, such as a home assistant (e.g., a connected speaker) or a connected sensor such as a connected smoke and carbon monoxide alarm, a burglar alarm, etc.; or a walkie-talkie or two-way radio; etc. The example device 160 may include a display 503, a user interface 505, audio equipment 507, network transceiver/s 509, antennas 511, location components 515, sensors 517, at least one processor 520, and at least one non-volatile, non-transitory memory 530 in addition to RAM. Network components may include one or more wireless network transceivers for wireless communication such as for cellular communication, Wi-Fi™, Bluetooth™, etc. The memory 530 stores executable instructions and data such as executable instructions for an operating system 531, various applications 532 and an emergency alert application 535 in some implementations. The memory 530 also stores data 533 which may provide a location data cache and a user data cache. The device 160 may, in the case of mobile telephones, include a SIM card or other removable, replaceable memory components in addition to memory 530. The location data cache be used to store locations generated by the one or more location components 515 which may include a GPS chipset, triangulation processing, or other location determination technology, etc. User profiles 534 stored in memory 530 may contain information related to specific devices user configuration preferences, data sharing permissions, etc.

The processor 520 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 520 is configured and operative to fetch and execute computer-readable instructions (i.e. executable instructions) stored in the memory 530. For example, the applications 532 executable instructions, when executed by the at least one processor 520, may provide, a dialer application 541, a short-message-service (SMS) application 542, an instant message (IM) application 543, a web browser 545, an email client 546 and one or more IM and voice applications 544 which may each provide IM and voice call capability separately or in combination. The IM and voice applications 544 are referred to as "over-the-top" applications because the operate within the application layer of a mobile operating system. The operating system 531 executable instructions, when executed by the at least one processor 520, may provide a kernel 521, libraries 523 (also referred to as "application programming interfaces" or APIs) and an application layer 540 or user space within which the various applications are executed.

All of the components of the device 160 are operatively coupled by an internal communication bus 501. The display 503 is operatively coupled to the user interface 505 or may be considered a part of the user interface 505 such as in the case of a touchscreen which is both a display and a user interface in that it provides an interface to receive user input or user interactions. In some devices, the display 503 may not include a touchscreen, but may include one or more lights, indicators, lighted buttons, or combinations of these. The user interface 505 may also include physical buttons such as an on/off button or volume buttons, and the audio equipment 507 may include a microphone and a speaker.

The example device 160 may also include various accessories that allow for additional functionality. Such accessories (not shown) may include one or more of the following: a microphone, a camera, speaker, a fingerprint scanner/reader, health or environmental sensors, a USB or micro-USB port, a headphone jack, a card reader, a SIM card slot, or any combination thereof. The one or more sensors may include, but are not limited to: a gyroscope, and an accelerometer which may be incorporated into an Inertial Measurement Unit (IMU); a thermometer; a heart rate sensor; a barometer; or a hematology analyzer, or some other type of biometric sensor.

An emergency alert component 513 may be an ASIC or may be implement as, or in conjunction with, an emergency alert application 547 where the emergency alert application 535 executable instructions are stored in memory 530 and executed by the processor 520. The emergency alert component 513 may be configured and operative to record user data, such as a name, address, or medical data of a user associated with the device 160. The emergency alert component 513 may also detect an emergency using features of the device 160 for example, when a user places an emergency call on a device that has phone call capabilities. The emergency alert component 513 may also work in conjunction with "fall detection" such as in a medical bracelet which uses the sensors 517, such as an IMU (inertial-measurement-unit), to detect if the wearer of the bracelet has fallen and to initiate an emergency call or emergency alert accordingly. The emergency alert component 513 may also work in conjunction with sensors 517 such as biometric sensors to detect for example, a cardiac event or some other critical health or safety event and to initiate an emergency call or emergency alert accordingly.

A device 160 user may initiate an emergency alert 105 by interacting with the user interface 505, or the emergency may be detected by sensors 517. In response to detecting an emergency alert or a request for assistance, such as a via native dial 9-1-1 call via the dialer application 541 (which is the phone's native dialer), which may be generated or sent by the device 160, the emergency alert component 513 may send a notification to the emergency network. The notification may be sent as an HTTP post containing information regarding the emergency request for assistance. The notification may include a location (e.g., a device-based hybrid location) generated by or for the electronic device. In response to detecting an emergency request generated or sent by the device, the emergency alert component 513 may send user data to the emergency network.

Regarding emergency responder devices 150, responder devices 150 may include a mapping application for displaying an interactive map of incidents. Responder devices are designed to display incidents within authoritative, administrative or assigned jurisdiction of the specific responder. The credentials of the responders may be matched to one or more geofences and incidents with current location within the geofences are displayed. Responder devices may display incidents based on a proximity radius on the interactive map. For example, a proximity radius may be within 10 meters to 5 kms, between 50 meters to 1000 meters, for example 500 meters. As the responder moves towards an area, new incidents within the proximity radius may be "unlocked" and viewed.

Access to Emergency Data

After an emergency network user (e.g., a PSAP administrator or PSAP staff member) successfully logs into the emergency response application and a temporary access token is generated for the user, the user can use an emergency response application via the emergency network workstation to display data from the emergency data manager 100 via, for example, a query process or a WebSocket subscription. Depending on various types of integration, the emergency data may be provided to the emergency network user in various ways. The call-taker can prompt the emergency response application to generate a request for emergency data by submitting an identifier of the electronic device (i.e., a device identifier), such as the phone number of the electronic device, IMEI number, SIM number, name of the user, account ID, user ID, etc. The emergency response application can automatically retrieve the device identifier from a call-handing application installed on the workstation and automatically generate an emergency data request without requiring input from the call-taker. The device identifier may be communicated from the call-handling application to the emergency response application through a WebSocket connection. The WebSocket may couple to the emergency response application at the emergency data manager 100. The emergency response application may also be integrated into the call-handling application installed in a PSAP workstation, and may automatically be provided with location data and additional data within a GUI of the call-handling application.

The emergency data manager 100 in FIG. 3 includes a geofence module 375 that is operative to protect potentially sensitive emergency data using geospatial analysis. As described above with respect to FIG. 2, the emergency data manager 100 includes data ingestion modules 373 and data retrieval modules 371. The set of data ingestion modules 373 are operative to receive emergency data or other information that can be useful in responding to an emergency, from a variety of data sources such as various databases 120, multiple types of devices 160, etc. For example, a smartphone 107 may send emergency data to the emergency data manager 100 in the form of an HTTP POST API call in response to a user of the smartphone 107 initiating a 911 emergency call 103. When emergency data (e.g., an emergency location or additional emergency data) is sent from a device 160 to the emergency data manager 100, the emergency data is first processed by the geofence module 375 before being received by the set of data ingestion modules 373. Similarly, when an emergency data request is sent from a requesting party, such as from an emergency response application 144 or from a responder device 150, the emergency data request is processed by the geofence module 375 before being received by the set of data retrieval modules 371 for display on a GUI 143 of the requesting emergency network workstation 140.

Emergency Response Application

As discussed above, a requesting emergency network such as a PSAP may initiate a query or request for emergency data using an emergency response application, which in turn generates the query and transmits the query to the emergency data manager 100. The emergency data manager 100 includes an emergency network manager 379 for each emergency network to which it is connected. The emergency data manager 100 has emergency network profiles 335 which may include credentials for authorizing logins and data acquisitions by the emergency networks. Emergency network users interact with the emergency response application using the GUI 143 which may be accessed using the web browser 455. Alternatively, the workstation 140 may include a desktop application version as emergency response application 144 which is operative to provide secure communication with the emergency data manager 100.

Thus, the GUI 143 may be a webpage accessible through a web browser, or the GUI 143 may be is accessed through a desktop application such as emergency response application 144. The GUI 143 may include one or more pages each with their own plurality of interactive elements, such as, but not limited to, entry fields, soft buttons, sliders, maps, images, and videos. The interactive elements of the GUI 143 may be configured to perform various operations. As an example, a soft button (e.g., a "next" button) instructs the GUI 143 to navigate from one page to another. Another soft button (e.g., a "submit" button) instructs the GUI 143 to navigate from one page to another while concurrently instructing the application to store or process information submitted by a user into an entry field elsewhere within the GUI 143.

An example of the GUI 143 is shown in FIG. 8. Emergency data send to the GUI 143 by the emergency data manager 100 may include additional data or information displayed in the GUI 143. Additional information can include, but is not limited to: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. The emergency response application GUI 143 displays additional information included in the emergency data associated with a device identifier as depicted by FIG. 8. A user can access the page displaying the additional information by selecting an additional information button or tab within the GUI 143.

In FIG. 8, the GUI 143 displays emergency data returned from the emergency data manager 100 within discrete categories of emergency data categories in separate data fields. For example, the GUI 143 may include a location field 801, a demographics field 807, a contact Information field 809, an addresses field 811, and a medical information field 813. The "Demographics," "Contact Information," and "Addresses" groups of emergency data categories (as described above) are displayed sequentially under a "Personal Information" (as described above) section of the GUI. A Medical Information field 813 is displayed below the Personal Information section. The GUI 143 may include one or more tabs to filter emergency data categories. For example, as depicted in FIG. 8, GUI 143 can include a "Caller Information" tab 803, and a menu 805 including a "Location" tab, a "Caller-Provided Locations" tab, a "Devices" tab, and a "Directions" tab. A "Directions" tab can be selected within the GUI 143 to render a map displaying directions from a PSAP to a location of an emergency situation. The map is capable of providing real-time or near real-time traffic updates.

Figure 9:
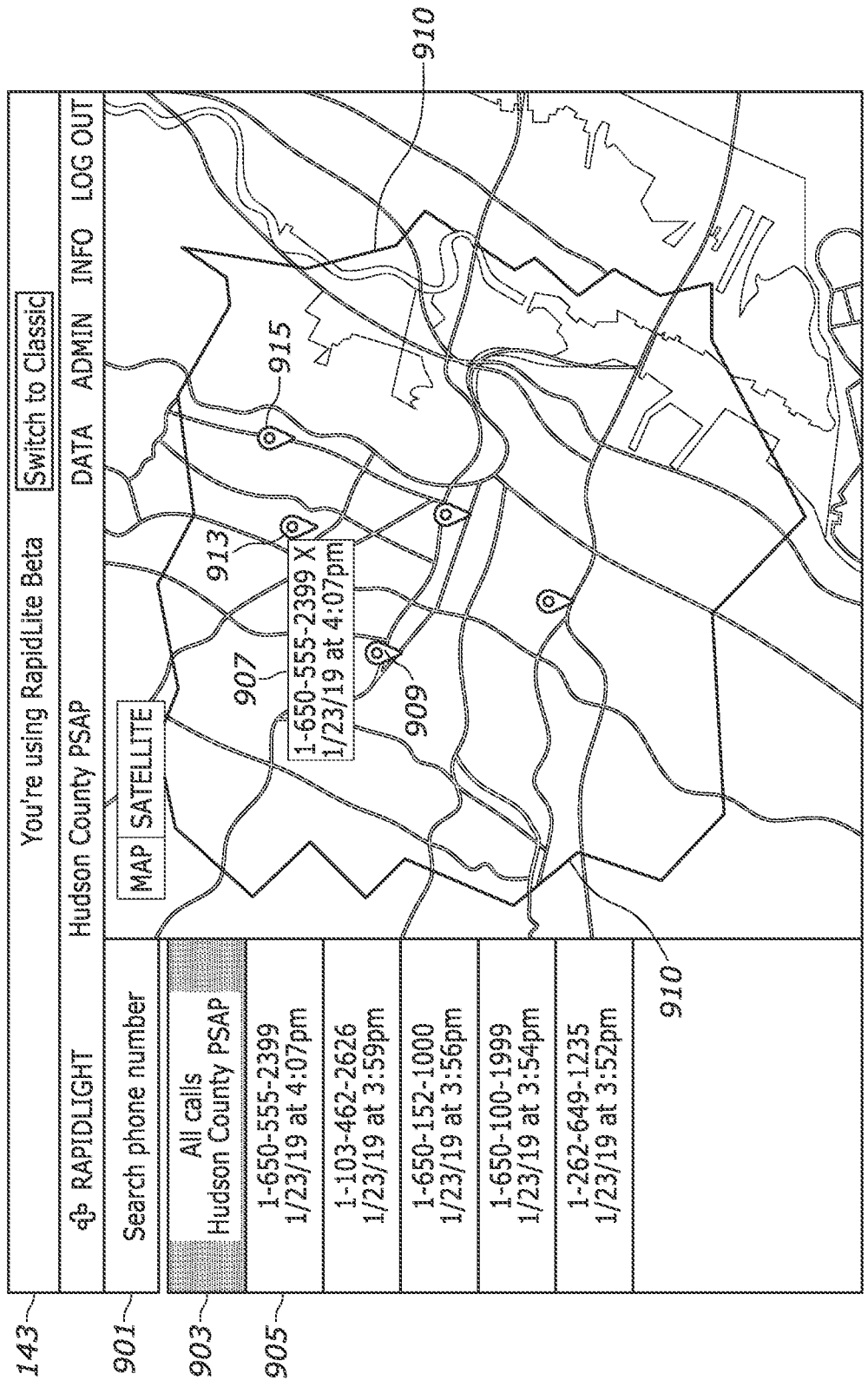
FIG. 9 is an example of an emergency response application graphical user interface.

FIG. 9 depicts a GUI 143 provided by the emergency response application and including a jurisdictional map view. The page shown provides interactive elements that allow a user to generate an emergency data request using, for example, data entry field 901 through which a user can submit a device identifier, such as by typing or pasting the device identifier into the entry field 901. After submitting a device identifier through the entry field 901, the user can prompt the emergency response application to generate and send an emergency data request by selecting a search button. In response to a user submitting a device identifier into the entry field 901 and selecting the search button, the emergency response application generates an emergency data request including the device identifier and a temporary access token to the emergency data manager 100.

After receiving an emergency data request including a device identifier, the emergency data manager 100 retrieves or gathers emergency data associated with the device identifier from one or more databases which may include one or more locations, and a current location. Location indicators are provided on the GUI 143 to show the various locations. For example, the current location indicator 915 shows the current location of the caller, and historic location indicator 909 and historic location indicator 913 show past locations as the caller has traveled. By moving the cursor over a historic location indicator 909, emergency data 907 is displayed in an overlay showing time, date, and the phone number (i.e. device identifier) of the caller's device. A call queue 905 is also displayed and a use may select any call from the call queue 905 to display further information. The field 903 shows that calls in the call queue 905 are for a specific jurisdictional boundary 910 which corresponds to a geofence and which is also displayed on the GUI 143. The emergency data 907 textual description of a current or historical location may include an indoor location, an amount of time elapsed since the current or historical location was received, and an amount of time elapsed since the current or historical location was generated.

Figure 10:
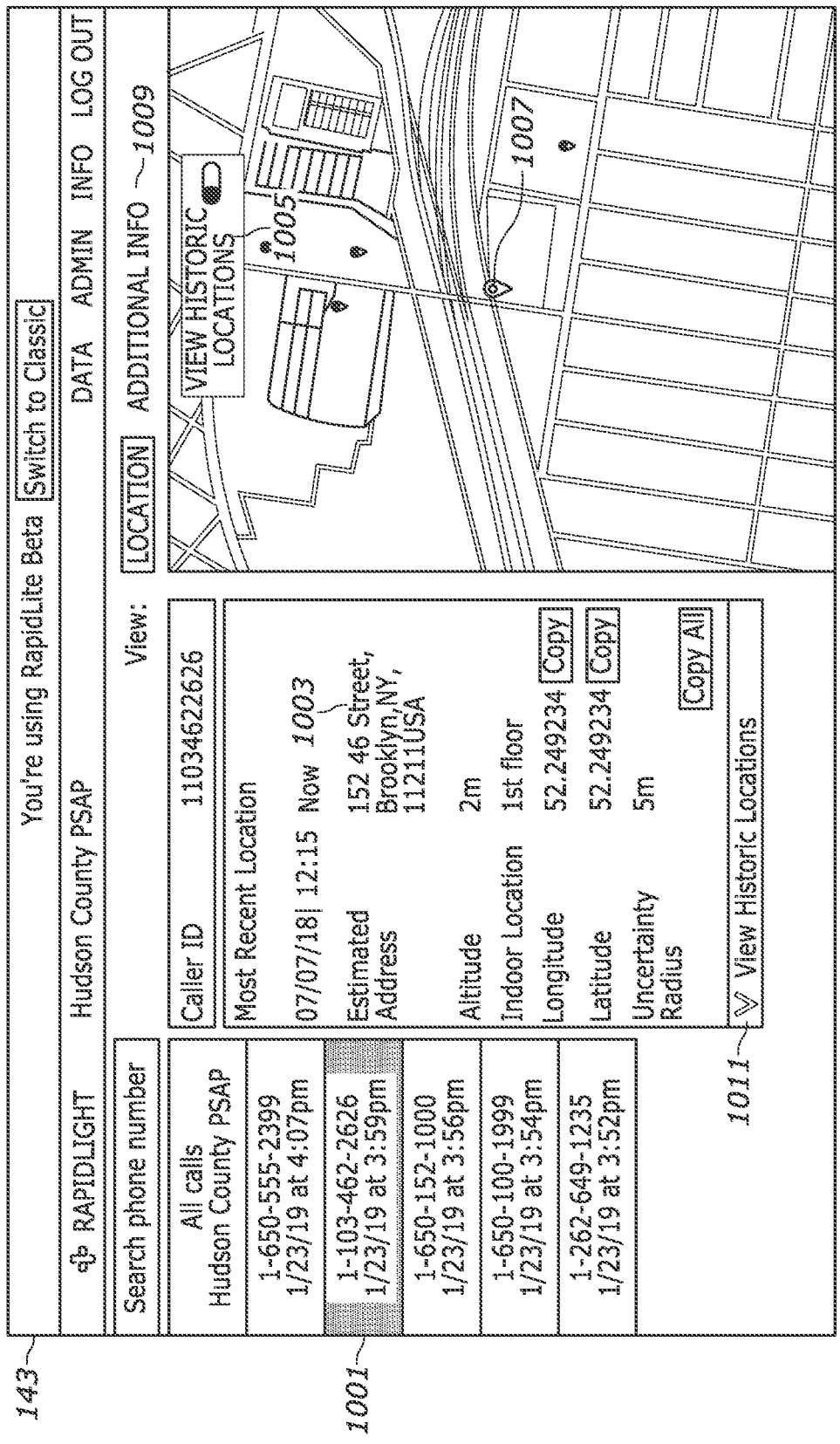
FIG. 10 is an example of an emergency response application graphical user interface.
Figure 11:
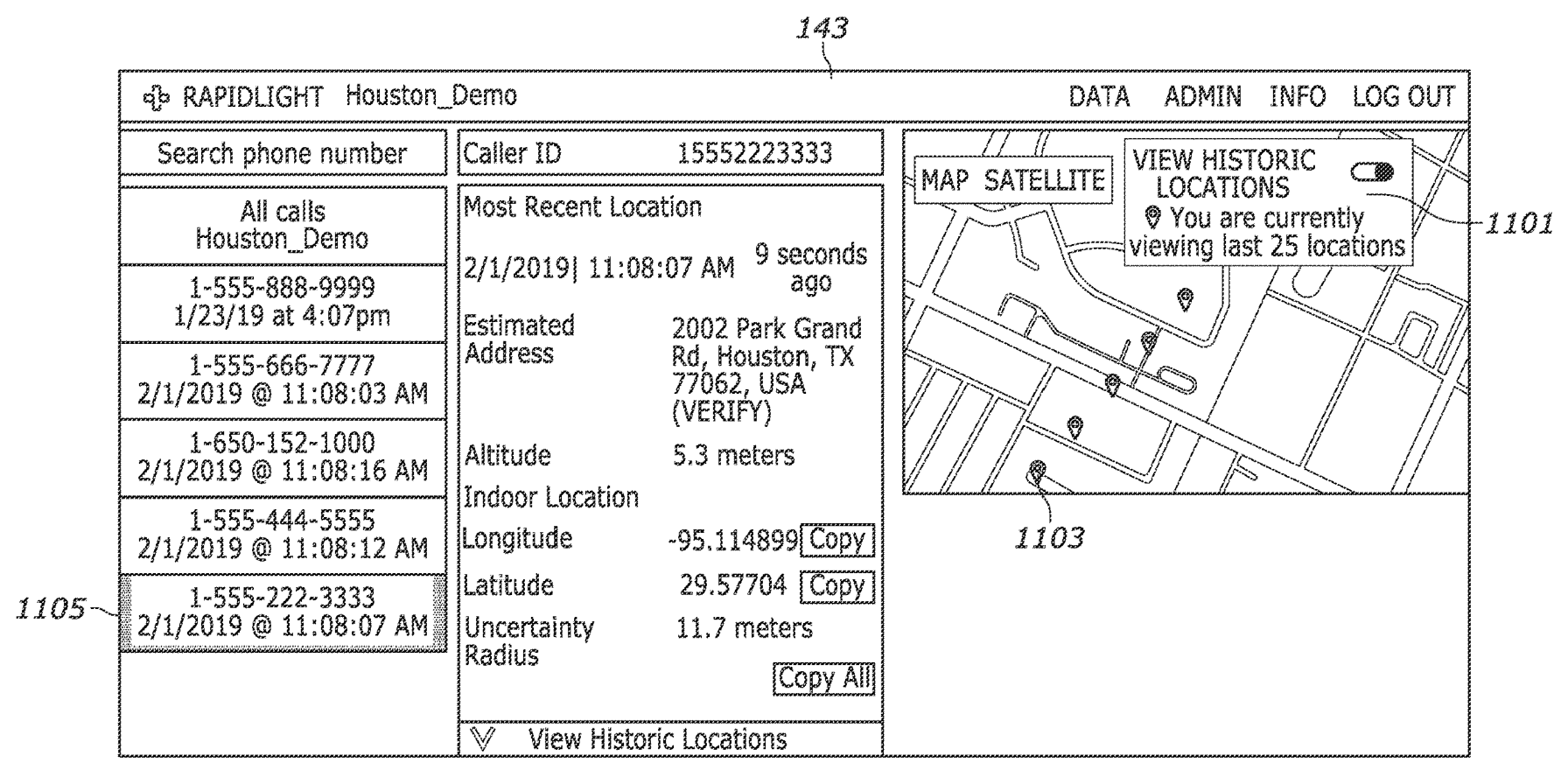

FIG. 10 illustrates a GUI 143 view after selection of a device identifier 1001 in the call queue to enter the single caller view. The single caller view enlarges or moves the user's map to detail the environment around the selected single caller location 1007. In the FIG. 10 example, call 1001 has been selected, resulting in the single caller view that shows the single caller location 1007. Enhanced location data 1003 and additional data 1009 may be available in the single caller view. The single caller view enables the viewing of past location data through the use of a historic locations toggle button 1005 or historic locations menu 1011. FIG. 10 also illustrates the use of a past location data feature. Toggling the historic locations button 1005 allows the user to view the past locations, of a particular device identifier in the call queue. Date and time may be displayed when the user selects or moves a cursor over a past location indicator. Past location indicators and the current location indicators may be displayed. Past location indicators are automatically denoted or visibly distinct from current location indicators. For example, past location indicators may be denoted as shades of color, wherein more distant location indicators may be lighter shades, while the current location indicator may be the darkest shade of the color, or a different color. FIG. 11 provides an example GUI 143 view where the use has selected to view historic locations using the historic locations toggle button 1101 for a device identifier associated with the selected call 1105 in the call queue. Based on the selection to view historic locations, the GUI 143 displays the last twenty-five historic locations marked by historic location indicators 1103.

Figure 12:
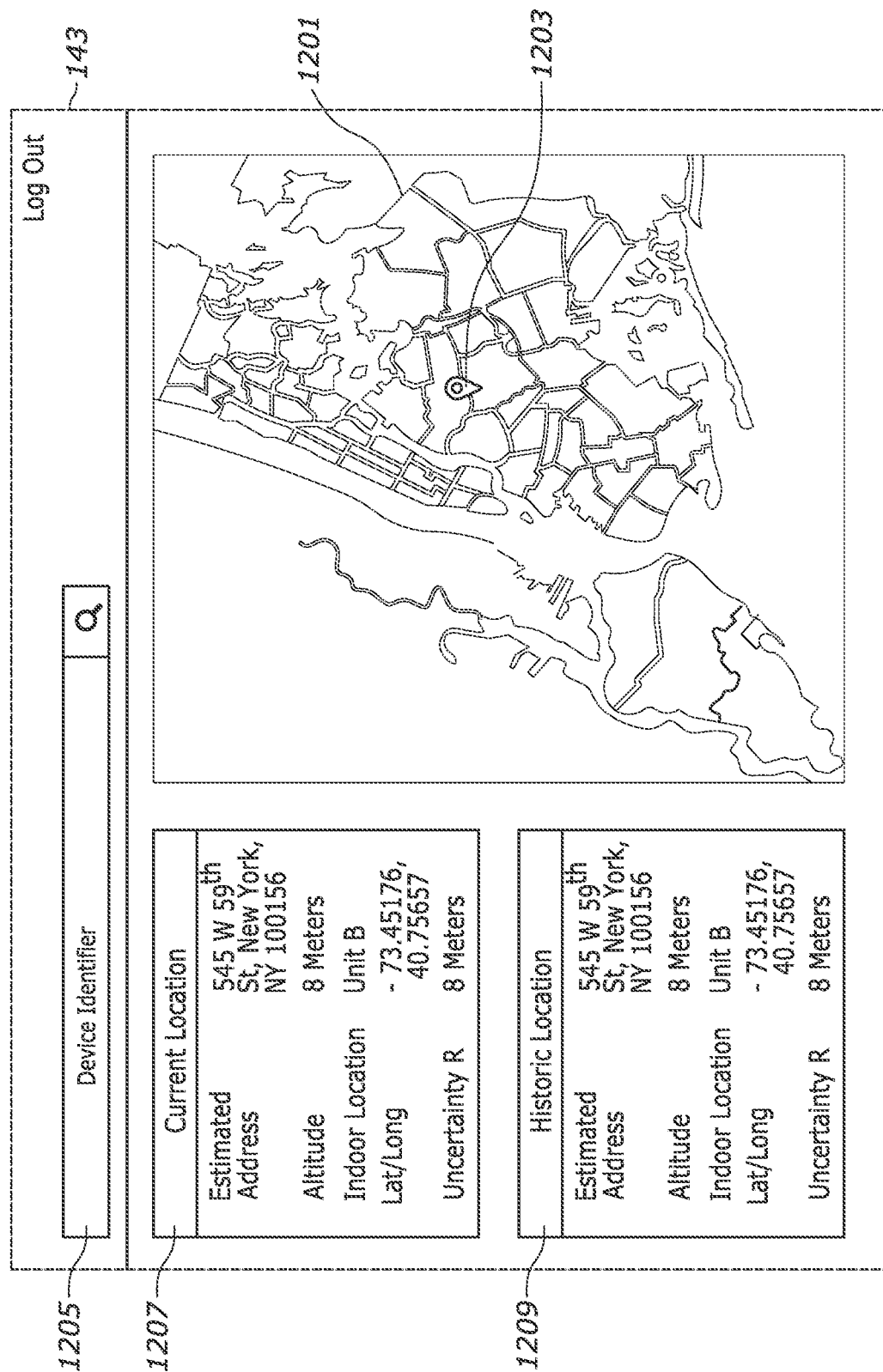
FIG. 12 is an example of a jurisdictional view map shown on an emergency response application graphical user interface.

FIG. 12 shows a zoomed out jurisdictional map view of the GUI 143. A device identifier may be entered in the search field 1205 or a call may be selected from the call queue. A current location field 1207 provides emergency data for the current location and a historic location field 1209 provides emergency data for past locations. A jurisdictional boundary 1201 is displayed that corresponds to a geofence for the specific emergency network and a location indicator 1203 shows the current location associated with the jurisdictional boundary and the device identifier.

Figure 13:
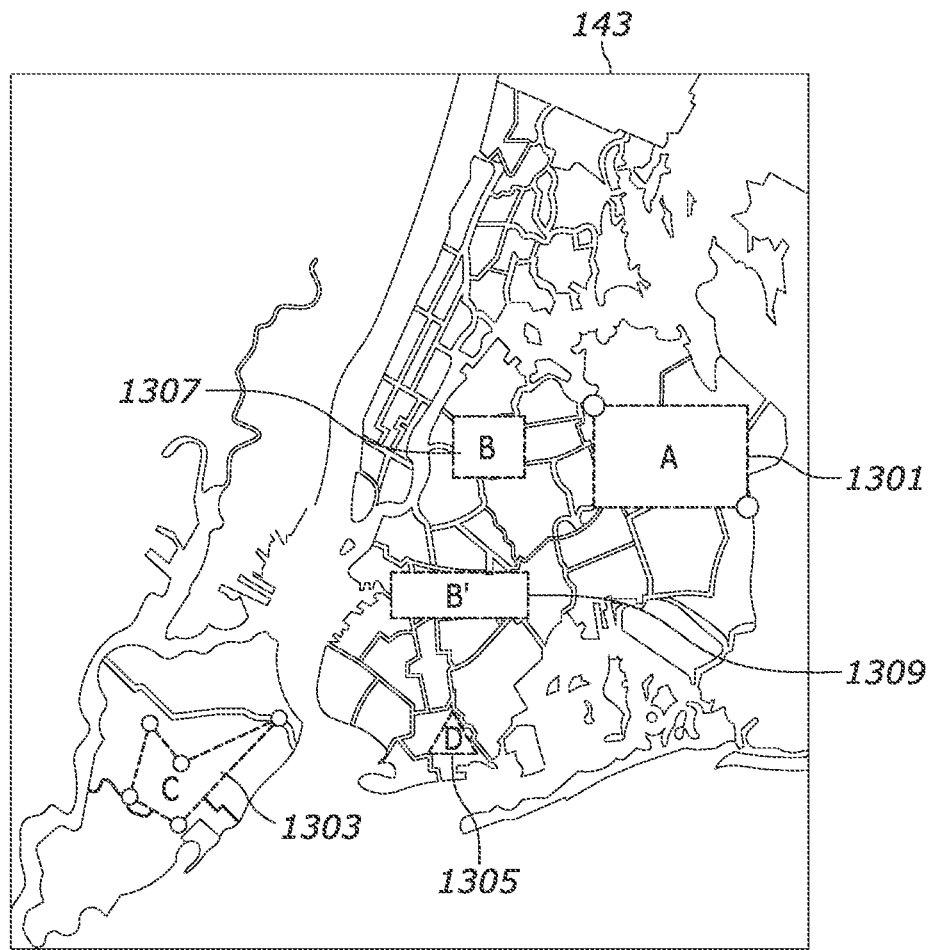
FIG. 13 is an example emergency response application graphical user interface that provides a jurisdictional map view in which multiple jurisdictional boundaries are displayed as polygonal geofenced regions.

FIG. 13 illustrates non-limiting examples of geofence approximations that can be submitted as jurisdictional boundaries or an "authoritative jurisdiction" for an emergency network such as a PSAP. One or more geofences enclose the geofenced region which is under the authoritative jurisdiction of a PSAP. These jurisdictional boundaries can be displayed in the GUI 143 by a national or regional emergency network 180 that has subordinate jurisdictions. In some cases, a geofenced region may be a complex polygon, and is optionally approximated using an appropriate simpler shape. For example, a rectangle (A) 1301, two disjointed rectangles, rectangle B 1307 and rectangle B' 1309, a complex polygon C 1303 with several sides, and a triangle D 1305, may each represent different jurisdictional boundaries which are geofenced regions defined by one or more geofences.

An administrator of an emergency network, such as a PSAP, may submit the complex jurisdictional boundaries as one or more approximate geofences by specifying points. For example, the PSAP administrator can submit geofenced region A 1301 by specifying two points—the north-west corner and the south-east corner using a drawing tool provided by the GUI 143 of the emergency response application. In this example, the two points of the geofenced region are set using two latitude-longitude coordinates. In another example, the multiple-sided polygon C 1303 may be submitted by specifying the five corners. A PSAP administrator may approximate a geofence for a PSAP by drawing one or more polygons using a drawing tool provided by the GUI 143 of the emergency response application. A geofence is generated using a series of points that are connected, for example by entering three longitude-latitude points on a map to form a triangular geofence.

Approximating a complex geofenced region has several advantages. The geofences are simple and the calculations can be quicker and less cumbersome for applications where exact calculations are not needed. A PSAP administrator can submit a GIS file (e.g., a shapefile) that represents the actual authoritative jurisdiction of the PSAP, which may then be provisioned in the geofence database 101. It is appreciated that a GIS file defining the authoritative jurisdiction may be saved in one or more industry-acceptable formats such as a shapefile, a GeoJSON file, KML file, etc. The GIS file includes one or more features such as points, lines, polygons, density, and other shapes. A GeoJSON is open standard GIS file representing geographical features and non-spatial attributes based on JavaScript Object Notation. Features can include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). The shapefile is a file with extension .SHP in ESRI file format where SHP is the feature geometry, SHX is the shape index position and DBF is the attribute data.

The geofence database 101 may be implemented in various ways. One or more databases are searchable using a PSAP identifier, credentials, or other information. An emergency location is searched through several geofences in the geofence database. In some cases, the geofenced region is shrunk for ease of storage and to simplify calculations.

Figure 14:
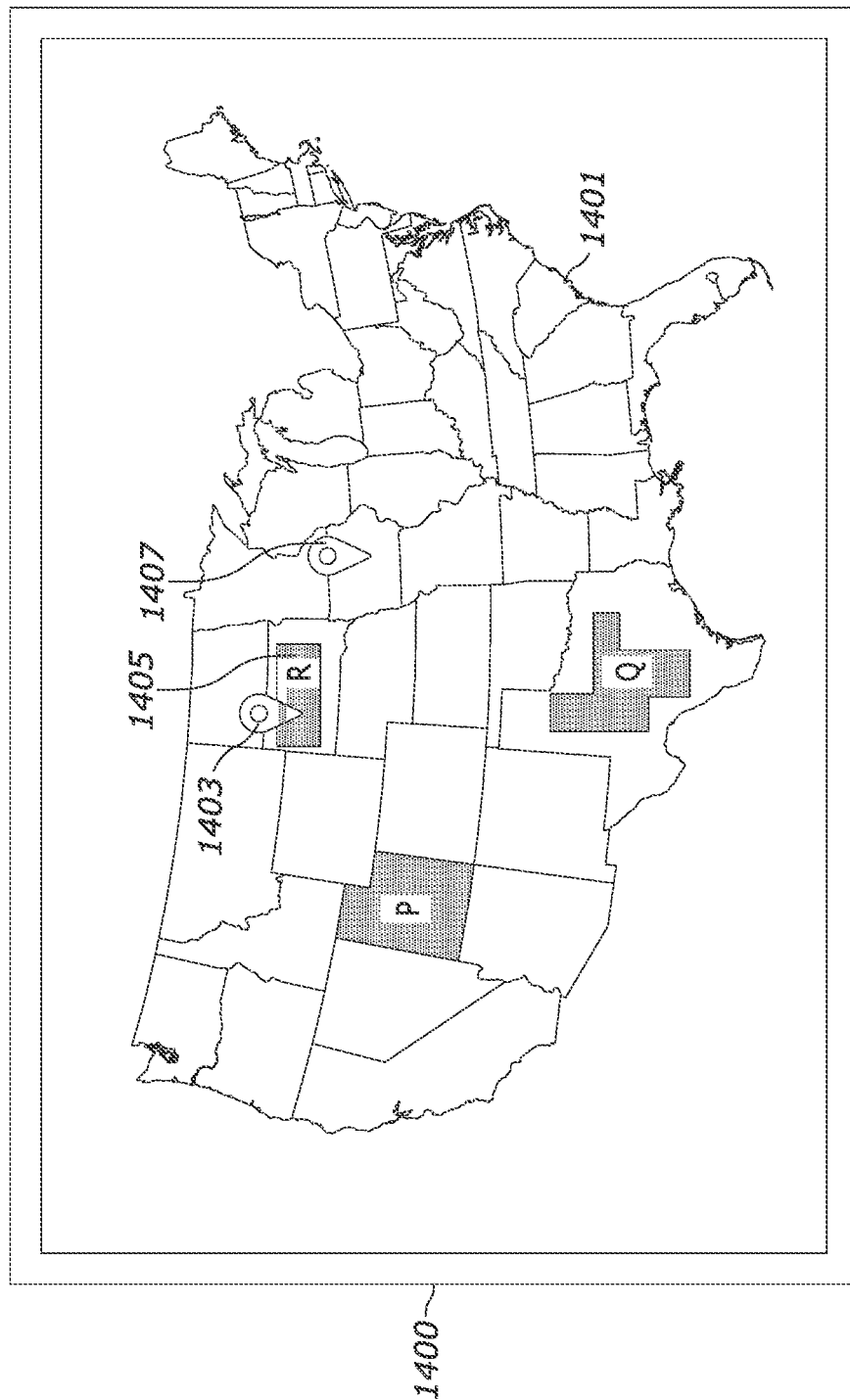
FIG. 14 is an example emergency response application graphical user interface that provides a jurisdictional map view for a national emergency network that shows subordinate emergency networks boundaries.

FIG. 14 illustrates examples of geofenced regions defined by one or more geofences within the United States and which may be displayed on a GUI 1400 for a national emergency network. In this case, an overall jurisdictional boundary 1401 may be the entire United States. As shown, subordinate jurisdictions defined by geofenced regions (e.g., an authoritative jurisdiction) may cover an entire state (P), a complex shape within a state (Q), and a simple (rectangle) shape (R) 1405. Location indicator 1403 may be related to a specific device identifier within the jurisdictional boundary R 1405. However, on a location indicator 1407 may be related to a cluster of related events and not related to a single device identifier. In other words, national and regional jurisdiction views, as well as for individual emergency networks, may also display location indicators for clusters of related emergencies. These cluster location indicators are visually distinguishable from single device identifier location indicators by, for example, different, size, shape, color, or shading etc.

Geofences may be defined on a grid mesh including equal-sized rectangles or grids, for example, on the entire United States. In such scenarios, the grid-lines are used as geofences to define geofenced region comprising each grid. Such grid-geofences may be used as other geofences for filtering, reporting and monitoring emergency data. On an emergency network jurisdictional map view for a specific emergency network, the emergency data manager 100 obtains emergency data and determines portions of the emergency data that correspond to emergencies occurring within the respective emergency network's geographic boundaries which are defined by geofences. The network entities of that emergency network can therefore display the corresponding jurisdictional map view with location indicators for emergencies occurring within the respective jurisdictional boundary. On a jurisdictional map view that provides a regional view, such as of the entire United States, location indicators may indicate emergencies, or clusters of emergencies, occurring within the jurisdictional boundaries of multiple different emergency networks.

Additionally, the GUI 143 may also provide for sharing of emergency data between emergency networks and enables the viewing of emergencies occurring within neighboring jurisdictional boundaries. To determine the appropriate emergency network for sharing emergency data, the authoritative jurisdiction, as defined by one or more geofences, of an emergency network (e.g. primary agency) has to be evaluated. In case of irregularities (e.g. overlaps, islands, or other irregular features), steps may be taken to check with respective agency, geographical boundaries (national and international borders, county lines, rivers, hills, etc.), or other authority. Call routing data may be analyzed to see which emergency network is answering the emergency call.

Raw geofences may be pre-processed to generate processed geofences using a variety of techniques. For removing irregularities, a geofence may be processed to resolve overlaps, remove islands and projections, smooth boundaries, modifying the file format or size, etc. Geographical features (rivers, hills, etc.), administrative features (national borders, county/state lines, etc.) can be compared to geofence boundaries. The geofence boundaries can be processed to match with geographical and administrative features.

The geofence boundaries are processed to match with geofence boundaries of adjacent emergency networks, or overseeing emergency networks. For example, a regional emergency network (i.e., a secondary agency) may include one or more primary agencies (e.g., PSAPs). If the geofence boundary of the regional emergency network is known, the geofence boundary of the constituent primary agencies can be matched to remove inconsistencies.

In some cases, there may be overlap between geofence of two or more adjacent emergency networks. The emergency data may be shared with the two or more emergency networks to err on the side of making mission critical information to all entities that may be involved in the emergency response. Sometimes, the two or more emergency networks are primary agencies (e.g. PSAPs) and the emergency data has to be shared with one appropriate emergency network. To determine the appropriate emergency networks for sharing emergency data, the authoritative jurisdiction (defined by one or more geofences) of the overlapping emergency networks must be checked with the respective agency, geographical boundaries (national and international borders, county lines, rivers, hills, etc.), sample routing data, etc. In contrast, if the overlapping emergency networks include one or more secondary emergency networks, the overlap may be retained and emergency data may be shared with one or more emergency networks (e.g. one primary agency and two secondary agencies).

Referring to FIG. 15, two adjacent geofence are shown; a first geofence 1507 representing a first jurisdictional boundary and a second geofence 1509 representing a second jurisdictional boundary, for two respective primary agencies (e.g. PSAPs). When the raw polygonal geofence 1507 is projected on the map, there is an overlap 1501 and a sliver 1503 that appears. To process geofence 1507 to remove overlaps, the overlap 1501 and sliver 1503 may be removed and the western boundary of geofence 1507 will be aligned with the eastern boundary of geofence 1509.

A buffer zone (e.g., +10 km) is added to one or both of the geofences such that query results within the buffer zone are also returned or such that portions of emergency data may be determined, by the emergency data manager 100, to correspond to emergencies occurring within each respective emergency network's geographic jurisdictional boundary as well as an expanded boundary defined by a buffer zone. That is, a buffer zone defines an expanded boundary that is larger than an emergency network's geographic boundary as defined by a geofence. Put another way, the "buffer zone" defines an "expanded polygonal geofence" for a particular emergency network. In many cases, emergency networks have discretion and incentive to respond to emergencies that are proximal to their authoritative jurisdiction. A specific network entity of an emergency network may therefore display a jurisdictional map view that includes a buffer zone that defines an expanded boundary for its specific emergency network. As an example, a geofence that is a circular area with a radius of 10 km would have an area of 100 π or ~314 km2, whereas the same area with a 10 km buffer around its circumference would have yield a combined radius of 20 km and a combined area of 400 π or ~1256 km2. The buffer is from 0.5 km to 5 km, from 0.5 km to 10 km, from 0.5 km to 15 km, from 0.5 km to 20 km, from 0.5 km to 25 km, or from 0.5 km to 30 km. The buffer is from 1 km to 5 km, from 1 km to 10 km, from 1 km to 15 km, from 1 km to 20 km, or from 1 km to 30 km. The buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. The buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

Geofences can be used by emergency networks and by the emergency data manager 100 for reporting results for internal metrics and monitoring the system. For example, the number of emergency data requests, locations provided, "no location found" etc., can be obtained for one or more geofences associated with a PSAP. Using single or combined geofences, the emergency data can be obtained on county-wide, city-wide, postal code, course grid (rectangle overlay), state-wide, or country-wide basis. Ingress and egress counters (e.g., percent of emergency sessions where the location data was received, but not queried) and other similar metrics can be calculated and analyzed to identify problems and spikes. Different geofences are used for retrieval and for reporting.

A given incident may be determined to fall within a two or more geofences. Emergency data for the incident is pushed to each PSAP having a geofence that the incident falls within. Emergency data for the incident is pushed to a subset of PSAPs having a geofence that encloses the incident. The location data of an individual device identifier is not pushed to more than one PSAP at one time. In situations where a device identifier egresses a geofence in which communication began and ingresses into a neighboring geofence, the location data is pushed to the neighboring PSAP with jurisdiction over the ingressed geofence. When a device identifier egresses or ingresses a geofence, the location indicator is preserved with a notation regard the time of egress or ingress. The location indicator is preserved for a configured time or manually removed.

Returning briefly to FIG. 3, the emergency data manager 100 applies the geofence module 375 to the data retrieval modules 371 and data ingestion modules 373. Emergency data obtained from a device 160 can be provided to an emergency network such as a PSAP. The geofence module 375 may perform upstream filtering to restrict sending of data from devices 160 to an emergency network from geographical areas that are not covered by the emergency network's jurisdictional boundaries as defined by one or more geofences in the geofence database 101. The geofence module 375 may restrict the data ingestion modules 373 from obtaining any emergency data that could result in accidental breaches of privacy. The data ingestion modules 373 of the emergency data manager 100 therefore drops location payloads that do fall within the geographical region covered by the jurisdictional boundaries of emergency networks that the emergency data manager 100 services.

The emergency data manager 100 may include or access databases for storing emergency data. For example, the data retrieval modules 371 may obtain emergency data relating to one or more emergency incidents from a database to send to a PSAP. The emergency data is sent to the PSAP automatically without requiring a request for the data from the PSAP. The geofence module 375 is applied at the data retrieval modules 371 for retrieved emergency data to protect against abuse and limit the scope of security breaches in cases where credentials have been compromised. One or more geofences are associated with one or more credentials associated with an emergency network agency or organization. The credentials associated with an emergency network agency or organization confers authorization to access data such as emergency data from the emergency data manager 100. Specific authorization to access data may be granted individually to members of a PSAP through tokens derived from the credentials for that PSAP.

When the data retrieval modules 371 check the coordinates of current location data (within retrieved emergency data) associated with a device identifier with the geofence or geofences associated with the credentials in an emergency data request. If the current location is within the geofence region, then the current location is returned to the emergency response application and displayed within the GUI 143. If not, the data retrieval modules 371 will return a "not found" message (as opposed to the retrieved location is outside the geofence) to protect privacy.

Figure 16:
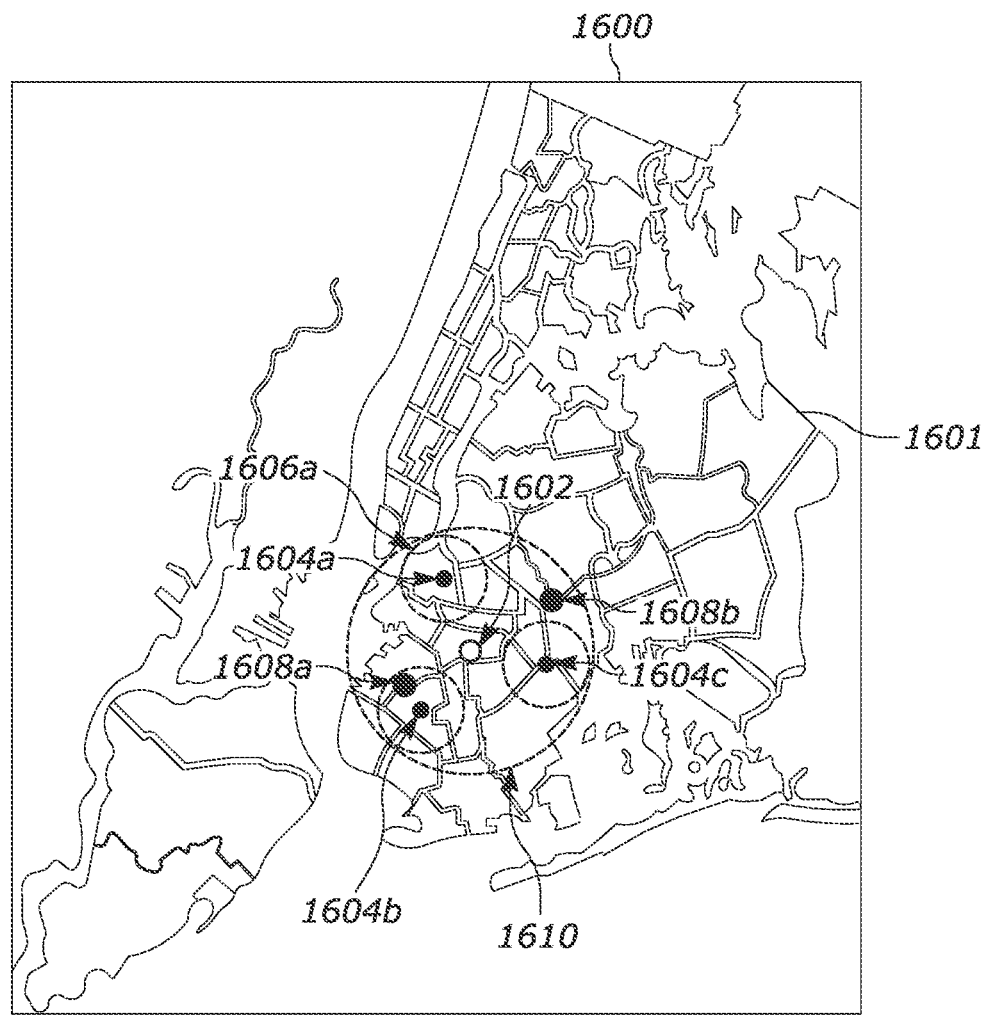
FIG. 16 is an example emergency response application graphical user interface that provides a regional jurisdictional map view in which multiple jurisdictional boundaries for subordinate emergency networks are displayed.

FIG. 16 depicts an emergency dispatch center routing and dispatching in City A in a map view 1600. City A may be serviced by an emergency service provider (e.g., a PSAP), which may have authoritative jurisdiction over a geofence and a jurisdictional boundary 1601. City A may be serviced by an emergency network (e.g., a hospital) with an administrative jurisdiction over a geofence. City A may be serviced by an emergency network (e.g., a crisis management center) with an assigned jurisdiction over a geofence.

As shown, a PSAP 1602 may have an authoritative jurisdictional boundary 1610 defined by a circular geofence. In an operational example, if an emergency alert with a location is received, the emergency alert may be determined to be in the jurisdiction of PSAP 1602 because the device sending the emergency alert is located with the jurisdictional boundary 1610. The location associated with the emergency alert may be searched within one or more geofences to determine a geofence that encompasses the location. Once the PSAP 1602 is identified, the PSAP 1602 is subscribed to the device identifier associated with the emergency alert (e.g., a phone number).

A buffer region may be defined around the boundary of the geofence and the locations falling within the buffer region can be treated as locations falling within the geofence. The buffer region may be 1 meter to 10 km, or between 200 meters to 5 km, preferably 2 km. Although FIG. 13 shows circular geofences (also referred to as proximity jurisdictions), it is understood that geofences may of any regular shape (e.g., square, rectangle, polygon) or irregular shapes. For emergency response, an emergency service provider (public or private entities) may be given jurisdictional authority to a certain geographical region or jurisdiction (also referred to as "authoritative jurisdiction"). However, in many cases, an emergency network may have an area of administration not based on authority, but based on various factors such as capacity, resources, funding requirements, or practical limitations (also referred to as an "administration jurisdiction"). In some cases, an area or region is assigned to an emergency network or responder for planning and resource allocation, although the emergency network or responder may respond to emergencies outside the area (e.g., a police beat) (also referred to as an "assigned jurisdiction"). For example, the geofences 1606 may define assigned jurisdiction of police officers 1604a, 1604b and 1604c within the authoritative jurisdiction 1610 of a PSAP 1602 which is operated by a police station.

In another example, authoritative jurisdictions, administrative jurisdictions and assigned jurisdiction may be treated differently. For example, the smaller circular geofences may define assigned jurisdictions 1606 of emergency responders 1604a, 1604b and 1604c (e.g., police patrols) within a larger authoritative jurisdiction 1610 of police department PSAP 1602. When an emergency alert with a location is received, the emergency data manager 100 may allow emergency responders (e.g., a police patrol in 1604a) access to emergency data even if it does not fall within its assigned jurisdiction 1606a, but within the larger authoritative region 1610. Here, current location 1608a and current location 1608b are depicted as a circle including the location accuracy radius.

A current location may fall within the geofence of only one emergency network (e.g., PSAP). However, an emergency location may fall within geofences of more than one emergency network or within buffer regions. For example, an emergency alert with current location 1608a falls within two geofences—the larger geofence 1610 and the subset geofence (sub-geofence) 1606b. The emergency data manager 100 provides a subscription to both the emergency network PSAP 1602 (e.g., a police department) and the emergency network 1604b (e.g., a police patrol) and makes the emergency data available to both emergency networks. Providing access to emergency data is advantageous when the emergency network 1604 has an assigned jurisdiction (sub-geofence) within the authoritative jurisdiction of the larger geofence. The emergency data manager 100 may choose the appropriate emergency network to provide subscription to. For example, the emergency data manager 100 may send the subscription to the authoritative emergency network (e.g., the police department) and allow the emergency network to manage resources and assign the incident to appropriate emergency network for the emergency response (e.g., a different police patrol 1604a when police patrol 1604b is occupied).

Additionally, different types of responders may have different or overlapping jurisdictional boundaries and therefore different or overlapping geofences. For example, police may have a different geofence than a fire department, state troopers may have a different geofence than local police, etc. Emergency alerts may be associated with an emergency type by the emergency data manager 100, such as, but not limited to, medical, fire, police, etc. The emergency data manager 100 may therefore subscribe the emergency network (i.e. medical, fire, police, etc.) based on the associated emergency type and a geofence corresponding to the jurisdictional boundary of a corresponding emergency network. In other words, for a fire emergency, the fire department emergency network, if different from police but having an overlapping geofence, only the fire department emergency network would be subscribed to the emergency data and the police emergency network would not be subscribed to the data.

The jurisdictional map view that may be displayed on the GUI 143 of an emergency network workstation 140 may also, in addition to displaying a location of an emergency on the map, display other useful information using data layers or data overlays that can be configured to be shown on the display as needed. For example, the GUI 143 may be configured to display the locations of one or more emergency assets proximal to the location of the emergency. One or more data layers (i.e. data overlays) may also be displayed around the location of the emergency, such as but not limited to, data overlays showing weather, traffic, and hazards. Displayed emergency assets may include, but are not limited to, medical (for example ambulances, defibrillators, etc.), fire (for example, fire trucks, fire extinguishers, fire hydrants, etc.), police and safety assets, etc.

Displayed safety assets may include, but are not limited to, police, private security personnel, fire extinguishers, fire hydrants, chemical showers, etc., responders such as EMTs, paramedics, etc., and volunteers (fire marshals, etc.). The GUI 143 may be configured to display geographical data layers, or overlays, including "police assets", "fire response assets", "safety assets", "vehicle rescue assets", "pet rescue assets", "water rescue assets" or other data overlays, etc.

In other words, the jurisdictional map view may be configured to display data layers useful for gaining situational awareness about an emergency and response. For example, the location of nearby safety assets such as a tow truck, medical assets such as a hospital, an urgent care center, etc. and fire assets like the fire station can be displayed. Various other types of data layers including, but not limited to, weather (e.g. a storm system), traffic (e.g. gridlock and congestion) and safety hazards (e.g. icy bridge) can also be displayed on a map proximal to an emergency location. In another example, a data layer with weather conditions may be displayed when there are emergencies related to flooding in an area. Medical assets such as urgent care units may be displayed during a medical emergency. Thus, the GUI 143 may be configured to display relevant data layers based on type of emergency, severity of the emergency, type of response, etc.

The emergency response application GUI 143 is also customizable and configurable in other ways. For example, the GUI 143 may be configured to display information relevant to the individual authority, or to restrict information from being accessed by an individual authority. For example, the GUI 143 available to a PSAP administrator may display options to access sensor data, traffic data, video data and historical and live location data while a GUI 155 used by a first responder may display live location data, personal medical data, and traffic data. The individual features of the GUI 143 are customizable, such that a user can enable or disable functionalities and/or data streams. For example, a user may enable or disable a historic location overlay. In another example a user may enable or disable personal medical information associated with the device identifier. The individual features of GUI 143 may be able to be arranged by the user according to the user's preferences. Features of the GUI 143 are made available based on a user's proximity to an emergency. For example, a first responder may gain access to a medical data associated with a device identifier when the first responder is 5000, 2000, 1000, or 500 meters or less from the emergency. The GUI includes a functionality to enable and disable a WebSocket connections that, when enabled, automatically push device identifier data (e.g., phone number, IP address) to the emergency response application.

As mentioned above, the emergency response application may be a cloud-based application accessed via webpage that can be accessed through an Internet or web browser. The emergency response application can thus be quickly and easily integrated into the systems used by public safety services, such as public safety answering points (PSAPs), because accessing and using emergency response application 144 requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. The emergency data manager 100 is capable of receiving accurate locations (as well as additional emergency data) from electronic devices 160 such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the emergency data manager 100 to those capable of providing emergency assistance as quickly and easily as possible.

In providing the emergency response application to emergency networks such as PSAPs (and the potentially sensitive emergency data obtained and stored within the emergency data manager 100, by extension) in the most accessible way possible, it is advantageous to provide rigorous security precautions and functions specifically created and suited for the emergency response application. If a PSAP desires to access the emergency data stored within the emergency data manager 100, an administrator of the PSAP (hereinafter, "PSAP administrator" or "PSAP admin") can navigate to the emergency response application using a URL in a standard web browser. The PSAP administrator can then use interactive elements of the GUI 143 to request access to the emergency data manager 100 using the emergency response application. Upon selecting to request access to the emergency response application, the emergency response application prompts the PSAP administrator to submit information about the PSAP through the GUI 143.

Figure 17:
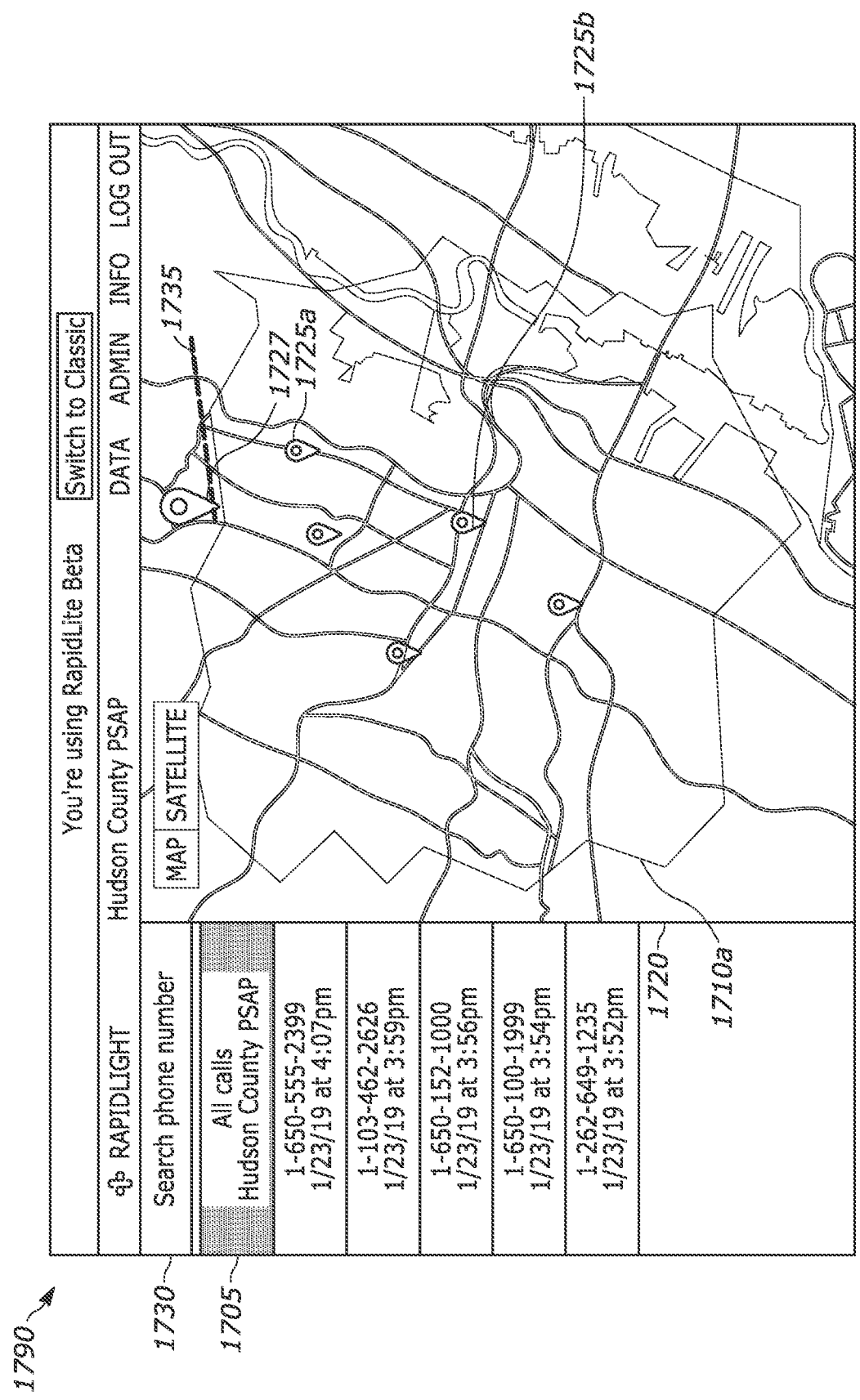
FIG. 17 is an example emergency response application graphical user interface.

FIG. 17 is another example GUI 143 showing a jurisdictional map view 1790 which includes a map 1720 showing a jurisdictional boundary 1710*a*, and a call queue 1705. In the example jurisdictional map view 1790, an emergency network such as a PSAP can view two or more ongoing or recently received emergency calls within one or more geofenced jurisdictions. The locations from which each of the emergency calls or emergency alerts received in the call queue 1705 as shown on the map 1720 using location indicators. The jurisdictional map view 1790 includes an alert queue or call queue 1705 that is populated by device identifiers (e.g., phone numbers, IP addresses) and the location of each emergency or device in use. The map 1720 may also show location indicators for emergencies occurring outside of the jurisdictional boundary 1710*a*, but within a buffer zone. In the example of FIG. 17, the dotted line indicates a buffer zone boundary 1735 that is some arbitrary distance away from a complex polygon border that defines the jurisdictional boundary 1710*a*. The location indicator 1727 shows an emergency call or emergency alert received originated from a device located with the defined buffer zone. Buffer zone distances may be defined by the jurisdictional authority (i.e. an ESP) operating the given emergency network and may be based on agreements with neighboring jurisdictional authorities or based on other criteria.

The call queue 1705 may be displayed or ordered in any manner for clarity and efficiency. The alert queue (e.g., call queue 1705) is ordered sequentially based on the time that the alert was received. The alert queue is prioritized based on type of emergency, severity of the emergency or other appropriate factors. The emergency network user is required to respond to emergency alerts in the alert queue sequentially. The emergency network user may select any emergency alert in the queue in any order.

The call queue 1705 is populated by device identifiers that correspond to emergency locations, and may display a call start time associated with each device identifier, a call end time associated with each device identifier, and a call date associated with each device identifier. The information displayed for the device identifier is in the user's time zone or in the caller's time zone. The call queue 1705 may be ordered with respect to the start time of the call. The terminated calls may be automatically removed from the call queue 1705 or may be removed by the user. For example, the terminated calls may be removed from the call queue 1705 after a variable delay, or if the user does not manually remove the terminated call. The delay may be set at any arbitrary time interval, for example, from seconds to minutes to hour intervals. The call queue includes a search box 1730 that allows the user to quickly find device identifiers within the current call queue 1705 or for terminated calls. A user can also review the history of a device identifier with respect to previous emergency calls.

Each location indicator may be customizable by the user. The shape and/or color of each location indicator is customizable. The shape and color of the location indicator is denoted in the call queue. The user is enabled to annotate text next to or within a text box associated with a particular location indicator. The user is enabled to annotate text next to or below each device identifier within the call queue. For example, a user may customize three ongoing emergency location indicators by changing the indicators to a "yellow star", and the associated device identifiers in the call queue are automatically denoted with a "yellow star" adjacent to the device identifier.

Each location indicator may be automatically updated or changed to reflect response status of secondary response agencies, such as the fire department or police department, or to reflect response status at a PSAP. For example, the location indicator may be flashing to indicate that no user at the PSAP has attended to the incoming call. In another example, the location indicator may automatically change color to indicate that a first responder has been dispatched to the emergency location. In another example, a location indicator may automatically change to reflect that an emergency call is no longer active, or the caller has egressed the jurisdictional geofence of the PSAP. The user is enabled to display device identifier data (e.g., phone numbers) adjacent to the map indicator. The user is enabled to toggle on and off map indicator customization preferences.

The jurisdictional map view may allow an emergency network user (e.g., a PSAP call taker) to mark one or more incidents as "Cancel", "Duplicate", "Push to CAD", etc. For example, a PSAP call taker can cancel inadvertent calls (e.g., butt dials), prank calls, and other non-emergency calls. For example, a fire that is being reported in two incidents 1725*a* and 1725*b* may be reporting the same fire. The emergency network user (e.g., PSAP call taker, supervisor, emergency responder) may mark one of these incidents as a duplicate. The emergency network user may link the two incidents 1725*a* and 1725*b* as related. The emergency network user may also consolidate the two incidents into one incident. By allowing identification of redundant emergency alerts, the jurisdictional map view improves efficiency and efficacy of the emergency response. In addition, a PSAP call taker may initiate a CAD incident based on an emergency alert in the alert queue. For example, an emergency alert may have been triggered by smoke alarms in a home and there may not be an associated emergency call. By creating a CAD incident, the PSAP call taker could initiate dispatch and emergency response for to the home. A PSAP call taker may characterize an emergency within the GUI 143 by indicating an emergency type, emergency severity, priority, dispatch notes, response status, etc.

The user initiates the emergency response application to find the jurisdictional map view of the PSAP geofence. The jurisdictional map view is populated with previous and ongoing calls being attended to by the PSAP. Upon initiation of the emergency response application, the jurisdictional map view may not be populated with previous and on-going calls, but becomes populated with each incoming call following the initiation of the emergency response application. When a call is added to the call queue, a corresponding location indicator may be added. When a call is removed from the call queue, the corresponding location indicator may be removed. Wherein the user hovers or selects the location indicator, the device identifier (e.g., phone number) may be displayed adjacent to the location indicator. Selection of a device identifier in the call queue, will cause a corresponding location indicator to be displayed. Multiple device identifiers can be selected in the call queue to display information adjacent to the corresponding location indicator. When a device is a mobile device and relocating in real time, the device's location may be updated in the emergency response application GUI in real time. The emergency response application GUI displays the location of all device identifiers in the call queue, and tracks the location of each emergency or device in real time simultaneously.

The jurisdictional map view 1790 may also display one or more data overlays. A data overlay may include an additional source of information. Examples of such information sources include IoT sensors (e.g., temperature sensor, camera/video camera), first responder devices (e.g., police vehicle console), wearable sensors (e.g., heart monitor), third party databases, and other relevant sources. The emergency management view is configured to be customizable to show one or more data overlays (or none) based on user configured settings. The jurisdictional map view displays the location of available emergency services within a variable proximity to one or more callers, or within the jurisdictional boundaries, as defined by a geofence, of one or more callers. The jurisdictional map view displays the location of one or more first responders. The location of a first responder that is assigned to and/or actively responding to an emergency incident may be displayed in real-time. An estimated time to arrival and/or distance to arrival may also be displayed (e.g., calculated using the shortest or fastest path between the first responder and the incident location). The PSAP is enabled to coordinate the dispatch of emergency responders to emergency callers, so as to reduce response times and improve the allocation of resources. The emergency response application is updated in response to the dispatch of a first responder to an emergency location. The emergency response application is updated manually or automatically.

The jurisdictional map view may display one or more sensors within a variable proximity to one or more callers (e.g., as determined using emergency data based on the locations of the callers or associated emergency incidents). The one or more sensors may include, but are not limited to, physiological sensors, environmental sensors, etc. that are operative to sense environmental and health/physiological parameters. Environmental parameters may include, but are not limited to, light, motion, temperature, pressure, humidity, vibration, magnetic field, sound, smoke, carbon monoxide, radiation, hazardous chemicals, acid, base, reactive compounds, volatile organic compounds, and smog. Health parameters may include, but are not limited to, heart rate, pulse, electric signals from the heart, blood oxygen levels, blood pressure, blood sugar level, and other health parameters. A sensor may be an Internet of Things (IoT) device such as a home thermostat, vehicle console, a pacemaker implant, etc. As used herein, IoT refers to the ever-growing network of physical devices, buildings, vehicles, and other objects that feature an IP address for Internet network connectivity for exchanging data. In many cases, IoT devices are embedded with electronics, software, sensors, network connectivity, or a combination thereof. IoT devices may feature an IP address for internet connectivity. In addition to an IP address, an IoT device is optionally associated with a MAC address or an SSID. It is understood that, IoT devices are connected with one or more other devices through Bluetooth®, Wi-Fi, or other wired and/or wireless technologies which allow for transfer of data.

An IoT device may also be in a network of sensors. As an example, IoT networks, wireless sensor networks (WSN) or wireless sensor and actuator networks (WSAN) monitor environmental parameters such as temperature, pressure, sound, etc., using a network of sensors or devices. When one sensor or device detects a sensed value outside of the identified range indicating a likely emergency, it will pass the data to other devices in the network. The sensor network is a Wi-Fi, WiMAX, or LTE MESH network. The sensor or IoT devices form nodes in the sensor network. The sensor network includes a central node for controlling the network. The sensor network has a distributed architecture to reduce the impact of a failed node.

The jurisdictional view is used improve the coordination of first responder resources during large scale emergencies such as natural disasters, industrial accidents, and acts of terror. The user of the emergency response application is enabled to access a single caller view from the jurisdictional awareness view. The single caller view is accessed by the user selecting a location indicator or a device identifier on the call queue.

Figure 18:
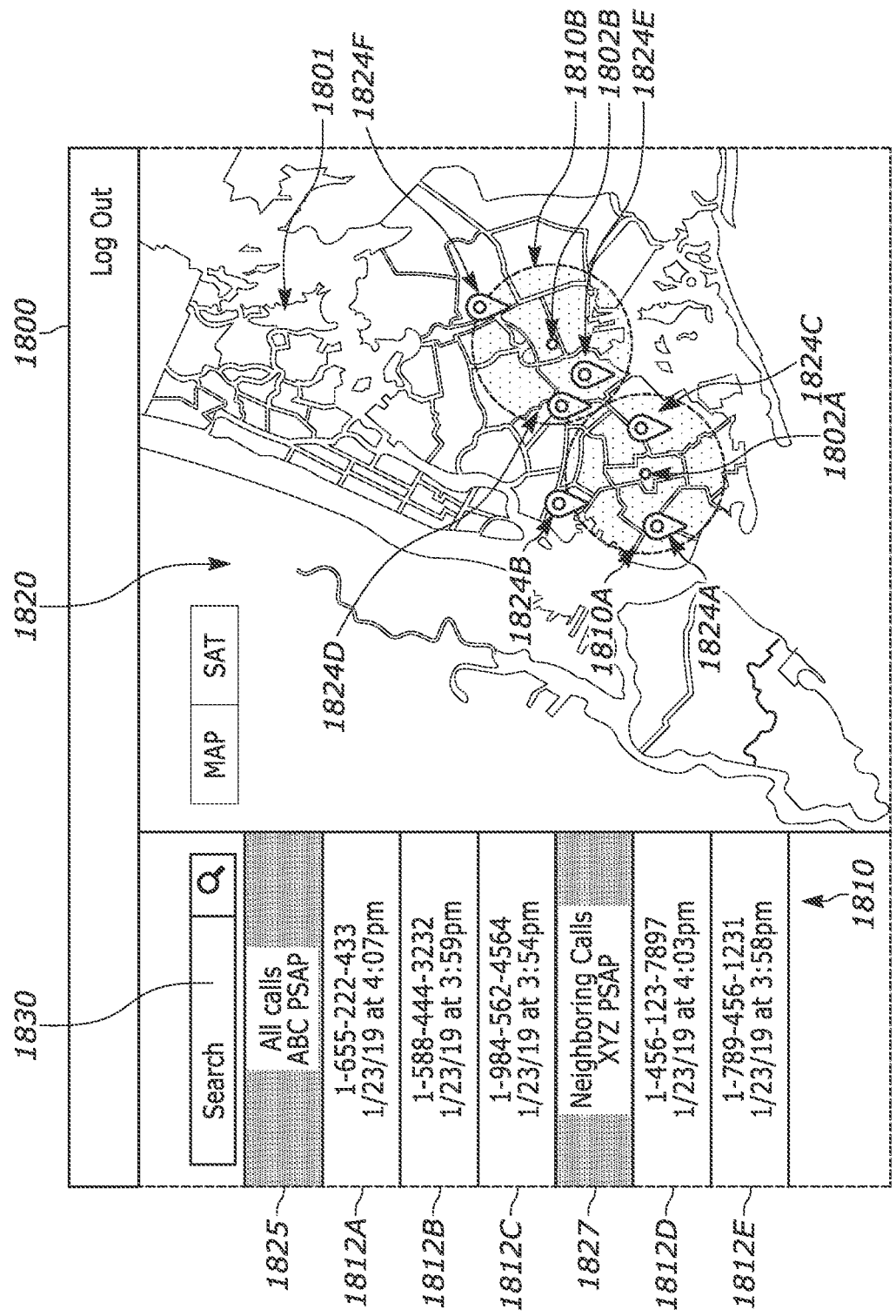
FIG. 18 is an example emergency response application graphical user interface that provides a jurisdictional map view for an emergency network that shows adjacent emergency networks boundaries.

FIG. 18 provides another example of a GUI 1800 showing a jurisdictional map view for a jurisdictional boundary 1801. The GUI 1800 provides an example of a view into adjacent jurisdictions and buffer regions. In the example illustrated by FIG. 18, an emergency network can facilitate the transmission of emergency data from to another emergency network. The emergency network GUI 1800 includes a list of incidents, i.e. call queue 1810 corresponding to emergency alerts received by an emergency network. A map 1820 displays emergency locations via location indicators corresponding to alerts on the list of alerts shown in call queue 1810. In this example, the emergency response application may be being accessed by a public safety answering point (PSAP A) with a jurisdictional boundary defined by polygonal geofence 1810A. As depicted, emergency data for all the emergency alerts within the geofences 1810A (incident 1802A, 1824A, 1824B, 1824C, etc.) are displayed. In addition, an emergency alert 1827 that falls outside the geofence 1810A is also depicted as it falls within the buffer boundary 1835 (+10 km) or within expanded polygonal geofence region. As such, emergency data for the emergency alert 1827 is not pushed through the WebSocket connection to the emergency network GUI 1800, but the alert 1827 is available via emergency network query using the search field 1830.

As depicted in FIG. 18, the emergency network display 1800 includes the call queue 1810 corresponding to emergency calls received by an emergency network and map 1820 that displays emergency locations 1824 corresponding to incidents 1812 (1812A through 1812E) on the list of incidents. In this example, the emergency response application GUI 1800 is being accessed and used by a public safety answering point (PSAP A) at emergency network location 1802A, which has an emergency network geofence 1810A. PSAP A has received three emergency calls, represented by incidents 1812A, 1812B, and 1812C. PSAP A has received emergency locations for each of the three emergency calls, emergency locations 1824A, 1824B, and 1824C, respectively. In this example, PSAP A is neighbored by a second public safety answering point (PSAP B) at emergency network location 1802B, which has an emergency network geofence 1810B. PSAP B has also received three emergency calls and an emergency location for reach of the three emergency calls, emergency locations 1824D, 1824E, and 1824F. In this example, both PSAP A and PSAP B have integrated with the emergency network such that both emergency networks transmit an emergency communication including a user identifier (e.g., a phone number) and an emergency location for each emergency call that the emergency networks receive. The emergency network can then share relevant emergency data from one of the emergency networks to the other. In this example, the emergency network has determined that emergency locations 1824D and 1824E (received in separate emergency communications from PSAP B) are within a threshold distance (e.g., one mile, five miles, ten miles, etc.) of PSAP A's associated geofence, emergency network geofence 1810A. In response to making this determination, the emergency network can transmit emergency data regarding the two emergencies represented by emergency location 1824D and 1824E (e.g., associated user identifiers and the time at which the respective emergency calls were received) to PSAP A and display the emergency data within the emergency response application 1890. In this example, emergency data regarding the emergencies represented by emergency location 1824D and 1824E are displayed within the list of incidents in call queue 1810 under "Neighboring Calls" 1827. The emergency network may share any and all relevant emergency data between emergency networks, including, but not limited to, user identifiers, emergency location, emergency day and time, emergency type, contact info, demographic data, and medical data. The user of the emergency response application can disable the jurisdictional awareness view by selecting a location indicator or a device identifier on the call queue 1810. The user of the emergency response application can disable the jurisdictional awareness view by way of a toggle button or a menu selection.

Authentication, Credentials & Roles

To ensure the security, privacy and integrity of the data provided to the emergency network, proper authentication may be required at various steps. In addition, differential access may be provided to different users using various methods of access controls. The authorization process may require the emergency network member or user of the enhanced data display to verify their identity through the use of credentials such as log-in password, config file (e.g., a configuration created in a third-party system), etc. The emergency network member provides fingerprint, voice command, etc. to log-in, which can be verified.

Various types of credentials may be utilized as a part of the authentication process. Credentials may be generated, stored, verified and validated by the emergency network. For example, the credentials may be generated, but must be verified (e.g., phone verification) before use. The credentials are valid for a specific duration of time (e.g., 1 minute, 5 minutes, 1 hour, 24 hours). Some examples of credentials that may be used are access keys, admin credentials, time-limited tokens, etc. Credentials may be transmitted through secure pathways (e.g., using encryption).

Access controls may allow differential access to emergency data depending on user consent and/or requesting party. For example, geofencing check allows the system to give access to data from within the jurisdiction of the emergency network (and buffer region, where applicable). In addition, sensitive data such as medical or location data may be restricted to individuals with a specific level of authorization (e.g., emergency network users with specific training, or supervisory roles). Thus, medical data may be restricted when a call taker answers the call, where additional data can be overwhelming and unnecessary if it is not a medical emergency. On the other hand, medical data may be accessed by an emergency responder with medical training. The user profiles 437 stored in memory 430 of an emergency network entity such as example workstation 140 may contain the staff member access credentials and restrictions for one or more staff member users.

Credentials may be used in a two-step authentication process. For example, the authentication may require: (i) a log-in and password for the emergency network member to log-in the emergency network system and (ii) a time-limited token to be generated based on an authentication request. A role (as described above) may be combined with to create a three-step authentication process. For example, an administrator of the emergency network could have designated roles for various emergency network members and selected specific data categories to be made accessible for each role.

In contrast to system-generated credentials which must be created, stored and managed in specific ways, roles can be assigned by the admin to each member of the emergency network. For example, roles can include admin, agent, call taker, supervisor, manager, etc. In contrast to credentials, roles do not need to be verified by system as they are usually admin-defined. In addition, the admin can update the role of an emergency network member to accurately reflect changes in jobs, positions and responsibilities. In this way, the use of the roles allows the admin to customize the management portal to reflect the organizations under their supervision. An emergency network member may have multiple admin-defined roles.

The authentication of the data request may be through the use of a credential, which is included in the data request (e.g., in the header of the request). When the emergency data manager 100 receives the request, the credential (e.g., a token) is verified to ensure that it is valid and has not expired. The data request may also include an identifier for the admin-defined role for the emergency network member. The emergency network member or user may be subscribed to the emergency data received within the emergency network jurisdiction. In this way, the credential system ensures that emergency data that is relevant for the emergency network member is accessible and updates are available quickly and efficiently.

Due to the diversity of emergency network members (e.g., call dispatcher, PSAP manager, police, paramedic) and the need for accurate and relevant data, there are specific challenges for emergency response. Although system-defined credentials may also be used to restrict access to emergency data, admin-defined roles were incorporated to allow the customization needed for different emergency network members. In this way, the present system allows for both secure authentication and significant customizations for managing access to emergency data for various members of the organization.

Credential Management System & User Database

As previously discussed, it is advantageous to provide rigorous security precautions and functions specifically created and suited for the emergency response application in which the emergency response application is accessible as a webpage through standard web browsers. As mentioned above, the emergency response application may include a user database and is communicatively coupled to a credential management system. The user database and the credential management system may function cooperatively to secure the emergency response application and the emergency data stored within the emergency data manager 100. Unlike the emergency response application, which can be accessed through public networks and servers, the credential management system can be securely connected to the emergency data manager 100 through private networks and servers. In this sense, the credential management system can serve as a protective barrier between the emergency response application and the emergency data manager 100, as described below.

When an emergency network administrator (e.g., a PSAP administrator) requests access to the emergency response application on behalf of a PSAP, an organization (also referred to as an "org") is created for the PSAP within the credential management system. Concurrently, an organization identifier (also referred to as an "org ID") is created for the organization (e.g., the PSAP) within the credential management system. When the request is granted, a long-lived credential (hereinafter, "credential") is created for the PSAP within the credential management system. The credential may never expire, or may expire after an extended period of time, such as a year. Multiple credentials may be created for a single organization. As an example, in the event that a credential is compromised, the credential is deactivated, and a new credential is created for the organization. Alternatively, multiple credentials are created for a single organization, and the credential management system periodically cycles through the credentials by activating one and deactivating the others to provide an additional layer of security.

Whenever an account is created within the emergency response application, the account may be stored within the user database and populated with information regarding the account, such as a name of the PSAP member for which the account was created, an email address, and the name of the PSAP. A temporary password may be created for and stored with the account in the user database. Concurrently with storing the account within the user database, an account node is created within the credential management system and a system ID is generated for the account node. The emergency response application then stores the system ID in the account stored within the user database. In this way, the system ID serves as a link between an account stored within the user database and a correlated account node stored within the credential management system. The emergency response application then requests information regarding an account node stored within the credential management system using the system ID associated with the account node, as described below. Organizations, organization IDs, users, and system IDs, and credentials may be stored within a credential management system database. The credential management system may be a software module included in the emergency network. The credential management system may be a credential management service. As an example, an API management service, such as Apigee, is used as a credential management system.

Login Flow

Once a request for access to the emergency response application from a PSAP administrator has been approved, the PSAP administrator and any account created by the PSAP administrator may be able to log into the emergency response application and request emergency data from the emergency data manager 100 through the emergency response application. To log into the emergency response application, any account holder (e.g., registered user) can navigate to a login page within the GUI 143 of the emergency response application, and submit the email address and password associated with their account (e.g., "login information"). If the login information is correct, the emergency response application can grant the account holder access to the emergency response application and display the dashboard within the GUI 143. Alternate information may be used as login information. For example, login information may include a username, employee ID, or other suitable identifying information for an account holder.

The emergency response application or emergency network may maintain an authorized list (also referred to as a "whitelist") of internet protocol addresses (hereinafter, "IP addresses"). In that case, only login attempts from IP addresses listed on the whitelist are granted access to the emergency response application. When a PSAP administrator requests access to the emergency response application and the request is approved, as described above, the IP address from which the PSAP administrator submitted the request may be automatically added to the whitelist. The whitelisted IP address from which the PSAP administrator submitted the request may be associated with the PSAP administrator within the PSAP administrator's account stored in the user database. Each additional account created by a PSAP administrator (e.g., another PSAP admin account or a PSAP staff account) may be associated by default with the whitelisted IP address from which the PSAP administrator submitted the request to access the emergency response application within the user database.

When a user (e.g., a PSAP admin or PSAP staff member) attempts to log into the emergency response application by submitting the email address and password for their account, the emergency response application may identify the IP address of the computing device from which the user is attempting to login and cross-references the IP address with the whitelist of IP addresses. If the IP address is found on the whitelist of IP addresses, in addition to the email address and password being correct, the emergency response application can grant the user access to the emergency response application. However, if the IP address is not found on the whitelist of IP addresses, the emergency response application can deny the user access to the emergency response application. In addition to denying the user access to the emergency response application, the emergency response application may disable or deactivate the account with which the user attempted to login. When a user attempts to log into the emergency response application by submitting the email address and password for their account, the emergency response application identifies the IP address of the computing device from which the user is attempting to login and cross-references the IP address with one or more IP addresses listed with the account. If the IP address is found within the one or more IP addresses listed with the account, in addition to the email address and password being correct, the emergency response application can grant the user access to the emergency response application. However, if the IP address is not found within the one or more IP addresses listed with the account, the emergency response application can deny the user access to the emergency response application and/or disable or deactivate the account with which the user attempted to login.

If an account is disabled or deactivated by the emergency response application in response to receiving a login attempt from an unrecognized IP address (e.g., an IP address that is not found within the whitelist of IP addresses or an IP address that is not found within one or more IP addresses listed with the account), the account must be reactivated by the emergency response application but the account can be used to access the emergency response application. After disabling or deactivating an account, the emergency response application presents options for requesting an access (or reactivation) code through the GUI 143. The access code can be used to reactivate the disabled account. For example, the emergency response application presents an option to request an access code by receiving a phone call (e.g., an interactive voice response (IVR) call) to a non-emergency number associated with the PSAP associated with the disabled account. As such the GUI 143 can present an entry field through which the non-emergency number can be submitted. After receiving a non-emergency number and confirming that the submitted non-emergency number is indeed associated with the proper PSAP, the emergency response application or emergency network can deliver an IVR call to the non-emergency number of the associated PSAP and playback an access code through the IVR call. This method ensures and confirms that whoever is attempting to log into the emergency response application from the unrecognized IP address is truly affiliated with the associated PSAP, because to receive the access they must be physically present at the PSAP or receive the access code from another person who is physically present at the PSAP. The IVR call may be delivered using voice over internet protocol (VoIP). Once the access code is submitted to the emergency response application (e.g., through an entry field), the emergency response application can reactivate the disabled account. After reactivating the disabled account, the emergency response application can add the formerly unrecognized IP address to the whitelist of IP addresses. After reactivating the disabled account, the emergency response application can associate the formerly unrecognized IP address with the account within the user database.

The emergency response application can present an option to request an access code by delivering an email containing the access code to a PSAP administrator associated with the disabled account. As such, the GUI 143 can present an entry field through which a PSAP name can be submitted. After receiving a PSAP name through the entry field, the emergency response application can identify a PSAP administrator associated with the PSAP name within the user database and retrieve an email address of the PSAP administrator from the PSAP administrator's account. If the emergency response application is unable to identify a PSAP administrator associated with the PSAP name within the user database, the emergency response application can display an error message within the GUI 143. If the emergency response application is able to identify to a PSAP administrator associated with the PSAP name within the user database, the emergency response application can then deliver an email containing an access code to the PSAP administrator's email address. This method similarly ensures and confirms that whoever is attempting to log into the emergency response application from the unrecognized IP address is truly affiliated with the associated PSAP, because they must receive the access code from the PSAP administrator, who has been previously verified. As described above, the access code can then be used to reactivate the disabled account. The email sent to the email address of the PSAP administrator additionally or alternatively includes a confirmation link that is selectable by the recipient of the email (e.g., the PSAP administrator) to automatically reactivate the disabled account. Once the account has been reactivated, the emergency response application can grant the account holder access to the emergency response application and display the dashboard within the GUI 143 and the user can use the emergency response application to request emergency data from the emergency data manager 100.

Emergency Data Retrieval

A user may log into the emergency response application and uses the emergency response application to access emergency data pushed from the emergency data manager 100. A user must log into the emergency response application using an authorized and/or active account, as described above, to access the emergency response application. When a user successfully logs into the emergency response application, such as by navigating to the emergency response application within a web browser and submitting their login information through the GUI 143, the emergency response application retrieves the system ID associated with the user's account and sends an account information request including the system ID to the credential management system. In response to receiving the account information request from the emergency response application, the credential management system can identify an account node correlated with the account and return information regarding the account node to the emergency response application. The information regarding the account node includes the org ID associated with the organization to which the account node is linked. An example of an account node is shown in FIG. 7.

After receiving the information regarding the account node (such as the example account node information illustrated in FIG. 7) from the credential management system, the emergency response application then sends a temporary access token request including the org ID to the credential management system. In response to receiving the temporary access token request, the credential management system can identify a credential associated with the organization to which the org ID refers and generate a temporary access token based on the credential. After receiving the information regarding the account node from the credential management system, the emergency response application sends a credential request including the org ID to the credential management system. In response to receiving the credential request, the credential management system can identify a credential associated with the organization to which the org ID refers and return the credential to the emergency response application. As such, the emergency response application can then send a temporary access token request including the credential to the credential management system, which can in turn generate the temporary access token based on the credential and return the temporary access token to the emergency response application. The emergency response application sends the temporary access token request to the credential management system only after the user navigates to the dashboard.

The credential management system generates the temporary access token by deriving the temporary access token from the credential. The temporary access token expires after a predetermined duration of time, such as 24 or 48 hours. The temporary access token expires when the user logs out of the emergency response application. The temporary access token is a short-lived access token created under the OAuth 2.0 authorization protocol. After generating the temporary access token, the credential management system can then return the temporary access token to the emergency response application. The temporary access token is generated automatically upon the successful login of a user without requiring input from the user. The user must manually request that the temporary access token be generated, such as by selecting a generate access token button after the successful login of the user. However, a temporary access token may be generated in any other way.

After a user (e.g., a PSAP administrator or PSAP staff member) successfully logs into the emergency response application and a temporary access token is generated for the user, the user can use the emergency response application to visualize data provided by the emergency data manager 100 on a GUI such as an interactive map with one or more data overlays. A call-taker (e.g., a PSAP staff member) at a PSAP successfully logs into the emergency response application by navigating to the emergency response application and submitting their login information through the GUI 143. When an emergency call is made from an electronic device to the PSAP, the call-taker answers the emergency call and begins to respond to the emergency. The call-taker can then prompt the emergency response application to visualize the emergency data (which can correspond to an identifier of the electronic device, such as the phone number of the electronic device). For example, the call-taker can submit the device identifier by copying and pasting the device identifier or typing the device identifier into an entry field and selecting a search button. The emergency response application automatically retrieves the device identifier from a call-handling application installed at the PSAP, and the call-taker can prompt the emergency response application to obtain emergency data by selecting an emergency data button, such as the search button. The emergency response application can automatically retrieve the device identifier from a call-handing application installed at the PSAP and automatically generate an emergency data request without requiring input from the call-taker. The device identifier is communicated from the call-handling application to the emergency response application through a WebSocket. The WebSocket is coupled to the emergency response application. The emergency response application is integrated into the call-handling application installed at the PSAP, and automatically provides location data and additional data to the call-handling application installed at the PSAP.

The emergency response application receives emergency data corresponding to the device identifier and/or the temporary access token. After the emergency response application obtains authorization to receive emergency data from the emergency data manager 100 via the credential management system. The credential management system can identify the appropriate organization using the temporary access token and communicate with the emergency data manager 100 to authorize the emergency response application to access emergency data (e.g., receiving automatically pushed emergency data from the emergency data manager 100). Although the emergency response application can communicate with the credential management system over a public network, the org ID is not sent over a public network because the org ID is only sent from the credential management system to the emergency data manager 100, and the credential management system communicates with the emergency data manager 100 over an encrypted or private network. This method provides critical security provisions to the publicly available emergency response application. In order to access emergency data stored within the emergency data manager 100, a requesting party must provide both a valid and matching org ID and temporary access token. The interplay between the emergency response application and the credential management system described above limits the possibility of an unauthorized party acquiring both a valid and matching org ID and temporary access token.

The emergency data request is an HTTP GET request, as described above. The emergency data request includes an address of an emergency network server and the device identifier in the URL of the emergency data request in the form of https://[emergency network Server]?[Alert_ID] (e.g., https://api.rapidsos.com?caller_id={0}, wherein [emergency network_Server] (emergency network Server)=api.rapidsos.com and [Alert_ID] (device identifier)=caller_id={0}). The device identifier is an 11-digit phone number (also referred to as a CPN) (e.g., caller_id=72743767911, wherein 72743767911 is the 11-digit phone number). The emergency data request is an HTTP request that includes the following parameters or information in the headers or metadata of the request: Authorization—temporary access token; and X-RapidSOS-Role—the account type assigned to the requesting account.

When processing authorization to access emergency data for the emergency response application, the emergency network or emergency data manager 100 verifies the temporary access token and account type of the application or its associated organization. As described herein, the emergency data manager 100 receives emergency data from one or more third party data sources. After retrieving the emergency data associated with a particular device identifier and/or emergency identifier, the emergency data manager 100 pushes the associated emergency data to the emergency response application, which can in turn display the emergency data associated with the device identifier through the GUI provided by the emergency response application. The emergency data associated with the device identifier includes one or more locations (e.g., enhanced locations). The emergency data associated with the device identifier includes a current location. The current location is received by the emergency data manager 100 by the electronic device to which the device identifier refers. The current location is received by the emergency data manager 100 from a second electronic device associated with the electronic device. The current location is received from a second electronic device communicatively coupled to the electronic device. The emergency data associated with the device identifier includes one or more historical locations. Before returning emergency data associated with a device identifier to the emergency response application, the emergency data manager 100 or emergency network determines if a current location included in the emergency data is within one or more geofences associated with the PSAP (and/or at least one adjacent PSAP or other emergency network) of the requesting user, as described below. The emergency data manager 100 only provides the emergency data associated with the device identifier if the current location included in the emergency data is determined to be within the geofence associated with the PSAP of the requesting user. A geofence is associated with the PSAP if it defines a location or area that falls within the jurisdiction of the PSAP.

Emergency Data Geofencing

As mentioned above with respect to FIG. 3, a geofence module is applied to the emergency data manager 100 to protect potentially sensitive emergency data using geofences. Generally, a geofence is a virtual perimeter for a real-world geographic area. For example, a geofence perimeter may define a boundary for a relatively small geographic area such as a city block, or may define a relatively large geographic boundary such as for an entire country.

A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an emergency network. In many cases, the emergency network is a public entity such as a public safety answering points ("PSAP), a PSS (e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats.

An emergency network may be a private call center. For example, an emergency network may be a university police or corporate police. There may be different types of emergency networks (e.g., primary agencies, secondary agencies, public safety agencies, private agencies, etc.). Primary agencies may have authoritative responsibility to respond to emergencies within its geofence, while secondary agencies may be assigned to respond to emergencies by primary agencies. For example, the primary agency is a PSAP, while a secondary agency is a local medical service provider. In another example, the primary agency is a PSAP, while a secondary agency is a regional authority, where the jurisdiction of the secondary agency may overlap with the jurisdiction of the PSAP.

Geofences can be defined in various ways. For example, a geofence may include one or more of the following: a county boundary, a state boundary, a collection of postal/zip codes, a collection of cell sectors, simple shapes, complex polygons, or other shapes or areas. Geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. The systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the emergency data manager 100 to detect anomalies/spikes and reduce the risk of security breaches.

Digital Processing Device

The platforms, media, methods and applications described herein include a digital processing device, a processor, or use of the same. The digital processing device may include one or more hardware central processing units (CPU) that carry out the device's functions. The digital processing device further may include an operating system configured to perform executable instructions. The digital processing device is optionally connected a computer network. The digital processing device may be optionally connected to the Internet such that it accesses the World Wide Web. The digital processing device may be optionally connected to a cloud computing infrastructure. The digital processing dice may be optionally connected to an intranet and may be optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

The digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, Free-BSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. The operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, Ubuntu® and Palm® WebOS®.

The device includes a storage and/or memory device. The storage and/or memory device is one or more physical apparatuses used to store data or programs on a temporary or permanent basis. The device is volatile memory and requires power to maintain stored information. The device is non-volatile memory and retains stored information when the digital processing device is not powered. The non-volatile memory may include flash memory. The non-volatile memory may include dynamic random-access memory (DRAM). The non-volatile memory may include ferroelectric random-access memory (FRAM). The non-volatile memory may include phase-change random access memory (PRAM). The non-volatile memory may include magneto resistive random-access memory (MRAM). The device may be a storage device including, by way of non-limiting examples, CD-ROMs, DVDs, flash memory devices, magnetic disk drives, magnetic tapes drives, optical disk drives, and cloud computing-based storage. The storage and/or memory device may be a combination of devices such as those disclosed herein.

The digital processing device includes a display to send visual information to a subject. The display is a cathode ray tube (CRT). The display is a liquid crystal display (LCD). The display may be a thin film transistor liquid crystal display (TFT-LCD). The display is an organic light emitting diode (OLED) display. An OLED display may be a passive-matrix OLED (PMOLED) or active-matrix OLED (AMOLED) display. The display is a plasma display. The display is E-paper or E ink. The display may be a video projector. The display may be a combination of devices such as those disclosed herein.

The digital processing device may include an input device to receive information from a subject. The input device may be a keyboard. The input device is a pointing device including, by way of non-limiting examples, a mouse, trackball, track pad, joystick, game controller, or stylus. The input device is a touch screen or a multi-touch screen. The input device may be a microphone to capture voice or other sound input. The input device may be a video camera or other sensor to capture motion or visual input. The input device may be a Kinect, Leap Motion, or the like. The input device may be a combination of devices such as those disclosed herein.

Non-Transitory, Non-Volatile, Computer Readable Storage Medium

The platforms, media, methods and applications described herein include one or more non-transitory, non-volatile, computer readable storage media encoded with a program including instructions executable by the operating system of an optionally networked digital processing device. A computer readable storage medium may be a tangible component of a digital processing device. A computer readable storage medium may be optionally removable from a digital processing device. A computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

The platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. A computer program may include one sequence of instructions. A computer program may include a plurality of sequences of instructions. A computer program is provided from one location. A computer program may be provided from a plurality of locations. IA computer program may include one or more software modules. A computer program may include, in part or in whole, one or more web applications, one or more mobile applications, one or more stand-alone applications, one or more web browser plug-ins, extensions, add-ins, or add-ons, or combinations thereof Web Application A computer program includes a web application. In light of the disclosure provided herein, those of skill in the art will recognize that a web application, may utilize one or more software frameworks and one or more database systems. A web application may be created upon a software framework such as Microsoft® .NET or Ruby on Rails (RoR). A web application utilizes one or more database systems including, by way of non-limiting examples, relational, non-relational, object oriented, associative, and XML database systems. Suitable relational database systems may include, by way of non-limiting examples, Microsoft® SQL Server, mySQL™, and Oracle®. Those of skill in the art will also recognize that a web application may be written in one or more versions of one or more languages. A web application may be written in one or more markup languages, presentation definition languages, client-side scripting languages, server-side coding languages, database query languages, or combinations thereof. A web application is written to some extent in a markup language such as Hypertext Markup Language (HTML), Extensible Hypertext Markup Language (XHTML), or eXtensible Markup Language (XML). A web application is written to some extent in a presentation definition language such as Cascading Style Sheets (CSS). A web application is written to some extent in a client-side scripting language such as Asynchronous Javascript and XML (AJAX), Flash® Actionscript, Javascript, or Silverlight®. A web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. A web application is written to some extent in a database query language such as Structured Query Language (SQL). A web application integrates enterprise server products such as IBM® Lotus Domino®. A web application includes a media player element. A media player element may utilize one or more of many suitable multimedia technologies including, by way of non-limiting examples, Adobe® Flash®, HTML 5, Apple® QuickTime®, Microsoft® Silverlight®, Java™, and Unity®.

Mobile Application

A computer program includes a mobile application provided to a mobile digital processing device. The mobile application is provided to a mobile digital processing device at the time it is manufactured. The mobile application may be provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK. Other cloud and IoT development platforms that may be used for, but not limited to, Ubuntu® include, but are not limited to, GCC, CLANG, Go, Python, Ruby, Node.js, Deb, snap, charm, etc.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

A computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™ Visual Basic, and VB .NET, or combinations thereof. Compilation is often performed, at least in part, to create an executable program. A computer program includes one or more executable complied applications.

Software Modules

The platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. A software module may include a file, a section of code, a programming object, a programming structure, or combinations thereof. A software module may include a plurality of files, a plurality of sections of code, a plurality of programming objects, a plurality of programming structures, or combinations thereof. The one or more software modules may include, by way of non-limiting examples, a web application, a mobile application, and a standalone application. Software modules may be in one computer program or application or may be in more than one computer program or application. Software modules may be hosted on one machine or may be hosted on more than one machine in a distributed architecture. Software modules may be hosted on cloud computing platforms. Software modules may be hosted on one or more machines in one location, or may be hosted on one or more machines in more than one location.

Databases

The platforms, systems, media, and methods disclosed herein include one or more databases, or use of the same. In view of the disclosure provided herein, those of skill in the art will recognize that many databases are suitable for storage and retrieval of barcode, route, parcel, subject, or network information. Suitable databases may include, but are not limited to, by way of non-limiting examples, relational databases, non-relational databases, object-oriented databases, object databases, entity-relationship model databases, associative databases, and XML databases. A database is internet-based. A database may be web-based, cloud computing-based, or database based on one or more local computer storage devices.

Web Browser Plug-in

The computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. The toolbar may include one or more web browser extensions, add-ins, or add-ons. The toolbar may include one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. The web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art. As used in this specification and the appended claims, the singular forms "a," "an," and "the" include plural references unless otherwise stated. Any reference to "or" herein is not an exclusive disjunction and is, in other words, intended to refer to a "non-exclusive or" that encompasses "and/or" unless otherwise stated.

As used herein, "emergency data sources" refers to devices that internally generate data such as, but not limited to, hybrid location data, sensor data, etc.; sensors such as but not limited to IoT sensors, fire alarms, carbon monoxide detectors, etc. without limitation; multimedia sources including cameras; databases (including, but not limited to, medical databases, locations databases, law enforcement databases, etc.)

As used herein, "emergency network entity" refers to a hardware apparatus used to access or implement an emergency network such as, but not limited to, workstations, servers, routers, switches, laptops, desktop computers, etc.

As used herein "jurisdictional boundary" refers to a geographic area defined by one or more geofences within which a given emergency network provides emergency services.

As used herein "jurisdictional map view" refers to a map displayed on a GUI showing a "jurisdictional boundary" of at least one emergency network.

As used herein "emergency data" is "associated" with an emergency network when it correlates to a "jurisdictional boundary" by having with been generated by a device originating an emergency call or emergency alert from a location within the jurisdictional boundary, or by way of being related to an emergency occurring within the "jurisdictional boundary" for example, a camera feed showing a building that is on fire is emergency data associated with an emergency network that serves the geographic area in which the building is located, etc. When emergency data is associated with an emergency network it is also associated with any emergency network entity such as a workstation operating within that emergency network.

A "complex polygon" refers to the standard geometric definition of a complex polygon and where the complex polygon may be represented on a two-dimensional map by way of lines having vertices and, in some cases, intersecting lines.

As used herein, the "device identifier" refers to information allowing identification of the device or a user of the device, such as for example, a phone number associated with a user of a producing device. A "device identifier" may include but is not limited to, a phone number, email address, physical address, coordinates, IMEI number, IMSI, TMSI, IP address, BSSID, SSID or MAC address.

As used herein, an "emergency alert" refers to a communication relating to an emergency or non-emergency situation. An emergency alert is an emergency request for assistance (e.g., the request is associated with an emergency situation). An emergency alert is a phone call. An emergency alert may include an emergency indication. An emergency indication may be selected from one or more of the group consisting of traffic accident, police emergency, medical emergency, and fire emergency. An emergency alert is associated with a non-emergency situation (e.g., request for a tow truck after car breaks down). An emergency alert is associated with a device sending the alert. An emergency alert may be associated with a device not sending the alert (e.g., a proxy request on behalf of a second device and/or a member device in a group of devices). As used herein, an emergency alert is "associated" with a device or user when the emergency alert relates to an emergency or non-emergency situation involving the device or user. An emergency alert may include data associated with a device (or user thereof). An emergency alert may include data associated with an electronic device sending the alert or another device. For example, an emergency alert may include data associated with a device, wherein the data set may include current and/or past location data. In another example, the data set may include current and/or past health data associated with the user of an electronic device. An emergency alert may be sent and/or received separately from data associated with a device. An emergency alert may be associated with an ESP after making a geofencing determination.

As used herein, an emergency service provider (ESP) refers to an agency or institution that provides safety, security, or medical services. An ESP can be a public safety service which refers to a local, state, or federal government agency or institution that is responsible for providing safety, security, or medical services to members of the public. Examples of ESPs that are public safety services include fire departments, police departments, and hospitals. Public safety services additionally include public safety answering points (PSAPs).

An ESP can also be a private safety service, which refers to a private agency or institution that is responsible for providing safety, security, or medical services to clients. Examples of ESPs that are private safety services include private call centers, security companies, and private police, such as university or corporate campus police. Various ESPs may have geofences that overlap and therefore, even though multiple ESPs may cover identical or overlapping geographic area, a specific ESP may be selected based on the type of emergency. Additionally, an ESP may be selected based on various other factors such as the severity of emergency, proximity to public lands (e.g., state or national highways, military installments), proximity to private areas (e.g., a corporate campus, university campus), and other factors.

There may be different types of ESPs (e.g., primary agencies, secondary agencies, public safety agencies, private agencies, etc.). Primary agencies may have authoritative responsibility to respond to emergencies within its geofence, while secondary agencies do not have primary authority to respond to emergencies with the primary agencies geofence. In some cases, the secondary agency may be assigned to respond to emergencies by primary agencies. As an illustrative example, a primary agency may be a PSAP, while a secondary agency may be a local medical service provider. In another example, a primary agency may be a PSAP, while a secondary agency may be a regional authority, where the jurisdiction of the secondary agency may overlap with the jurisdiction of the PSAP.

An ESP may operate a PSAP. A PSAP refers to a call center responsible for answering calls to an emergency telephone number for police, firefighting, and ambulance services. Trained telephone operators (also referred to as call-takers) are also usually responsible for dispatching these emergency services. The Federal Communications Commission (FCC) of the United States government maintains a PSAP registry. The registry lists PSAPs by an FCC assigned identification number, PSAP Name, State, County, City, and provides information on any type of record change and the reason for updating the record. The FCC updates the registry periodically as it receives additional information. The ESP identifier or PSAP identifier may include the FCC identification of the agency.

As used herein, a "emergency authority" refers entities or organizations that have been given authority by the government to service emergency calls (911, 112 or other emergency numbers) within a specific area (the "authoritative region"). These emergency authorities operate emergency networks. Non-limiting examples of emergency authorities that operate emergency networks include various types of ESPs such as emergency command centers and PSAPs.

"User data" refers to general information associated with a user of a device, such as, but not limited to: user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof.

As used herein, "emergency data" refers to data pertaining to an on-going or historical emergency. The emergency data may be generated at the time of the emergency, or before the emergency occurs, and may be made accessible when the emergency occurs. Emergency data may include, but is not limited to, location data, particularly the current location of the emergency which may often times be based on the location of the user device from which an emergency call was made, or that sent an emergency alert. Because of privacy and security concerns, emergency data must be stored, accessed, transmitted using security and privacy measures. Emergency data may include, but is not limited to, at least one of user data, sensor data, health data, etc.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, a device may obtain sensor data from various sensors (e.g., heart rate from the heart rate monitor or distance traveled from the pedometer). In some instances, sensor data may be relevant to an emergency situation (e.g., heart rate during a cardiac emergency event). Sensors and/or sensor devices may include, but are not limited to, an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof. Sensor data may include, but is not limited to, information obtained from any of the preceding sensors. One or more sensors may be physically separate from a user device. One or more sensors may authorize the user device to obtain sensor data. One or more sensors may provide or send sensor data to the user device autonomously. A user device and one or more sensors that may belong to the same group of devices, where member devices are authorized to share data. A user device may include one or more sensors (e.g., user device is a wearable device having a sensor or sensing component).

Figure 19:
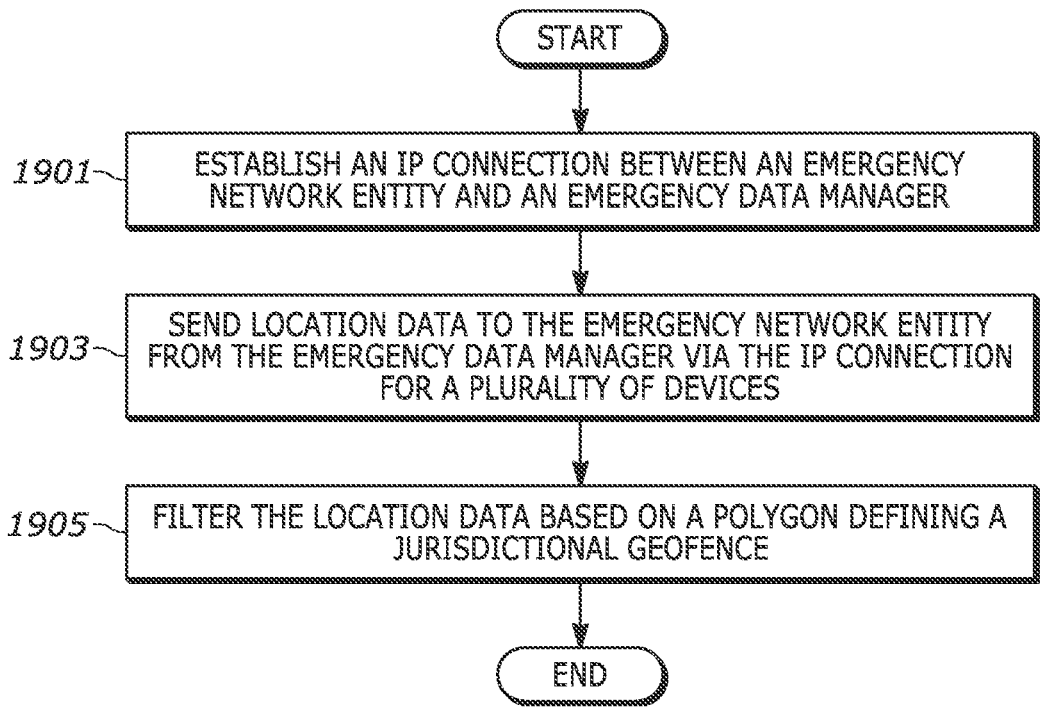
FIG. 19 is a flowchart of a method of operation.

FIG. 19 is a flowchart illustrating the method of operation. The method of operation begins, and in operation block 1901 an IP connection is established between an emergency network entity, such as a workstation, and an emergency data manager 100. The IP connection may include WebSocket connections and may create a subscription between the emergency service provider and the emergency data manager 100 such that emergency data from various devices is pushed or streamed to the emergency service provider as emergency alerts or emergency sessions are initiated from the various devices to the emergency service provider.

In operation block 1903, the emergency data manager 100 begins to send, by push operations or by data streaming, location data and other emergency data to the emergency service provider using the IP connection. In operation block 1905, the emergency data manager 100 filters the data based on determining that the location of any device sending emergency data is located within a polygon that defines the jurisdictional boundary as defined by one or more geofences for the specific emergency network. The method of operation then terminates as shown.

Figure 20:
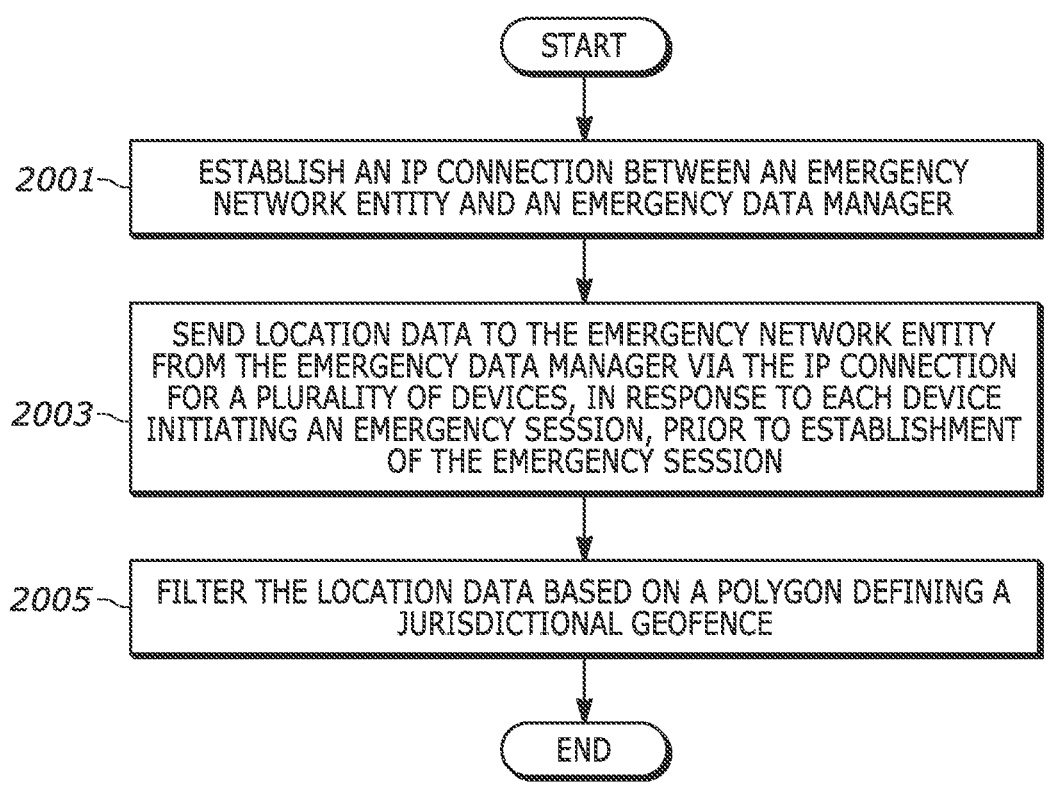
FIG. 20 is a flowchart of a method of operation.

FIG. 20 is a flowchart of another method of operation. The method of operation begins, and in operation block 2001 an IP connection, which may include WebSocket connections, is established between an emergency network entity, such as a workstation, and an emergency data manager 100. In operation block 2003, the emergency data manager 100 begins to send location data, via push operations or data streaming, to the emergency network entity for a plurality of devices in response to each device initiating an emergency session and prior to establishment the emergency session between the emergency service provider and the emergency data manager 100. In other words, there is a delay that occurs during establishment of an emergency session such as a phone call placed from a mobile telephone to an emergency service provider. However, the emergency data manager 100 may receive location data and emergency data from a mobile telephone or other device during an interval or delay during which the emergency session is being established. Therefore, the emergency service provider may have access to emergency data concerning an emergency prior to receiving a 911 phone call or prior to establishment of some other type of emergency session. In operation block 2005, the emergency data manager 100 filters the location data as well as other emergency data to the emergency service provider based on a jurisdictional boundary which may be a polygon defining a jurisdictional geofence that defines the emergency response area for which the emergency service provider is authorized. The method of operation then terminates as shown.

Figure 21:
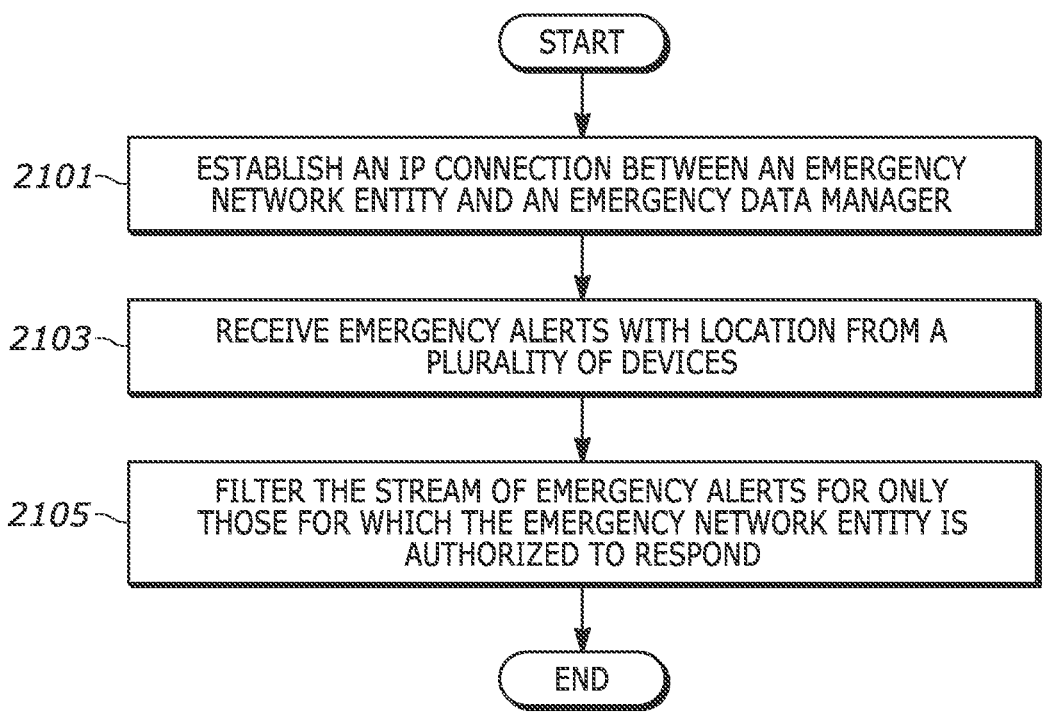
FIG. 21 is a flowchart of a method of operation.

FIG. 21 is a flowchart illustrating another method of operation. The method of operation begins, and in operation block 2101, an IP connection, which may include WebSocket connections, is established between an emergency network entity and an emergency data manager 100. In operation block 2103, the emergency services provider receives an emergency alerts with location from a plurality of devices. In operation block 2105, the emergency data manager 100 filters the stream of emergency alerts for only those for which the emergency service provider is authorized to respond. The method of operation then terminates as shown.

Figure 22:
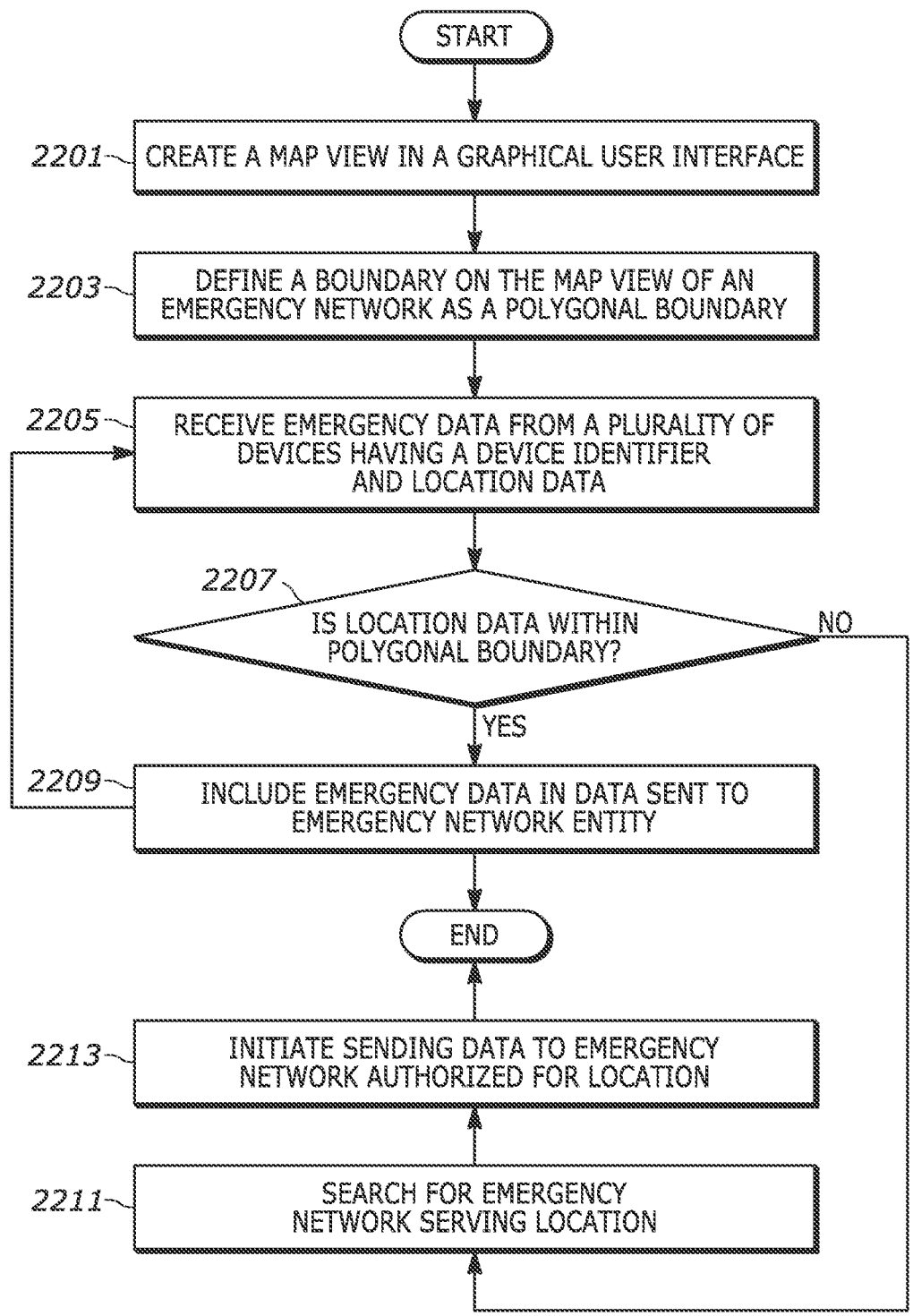
FIG. 22 is a flowchart of a method of operation.

FIG. 22 is a flowchart illustrating another method of operation. The method of operation begins, and in operation block 2201 an emergency data manager creates a jurisdictional map view in a graphical user interface of an emergency response application. In operation block 2203, a polygonal boundary is defined within the jurisdictional map view where the polygonal boundary is the jurisdictional authority area of the associated emergency service provider. In operation block 2205, emergency data is received from a plurality of devices for each device sends a device identifier and location data, as well as possibly other emergency data. In decision block 2207, the emergency data manager checks to determine whether the any specific received emergency data is associated with location data such that the device sending the emergency data is located within the polygonal boundary. If not, then in operation block 2211 the emergency data manager will search for an emergency service provider at the location, and in operation block 2213 will initiate streaming data for a located authorized emergency service provider at the location of the device. The method of operation then terminates as shown. If in decision block 2207, the location data is determined to be within the polygonal boundary for the emergency service provider, then the method of operation proceeds to operation block 2209. In operation block 2209, the emergency data is included in the streaming data sent to the emergency service provider. The method of operation then terminates as shown.

Figure 23:
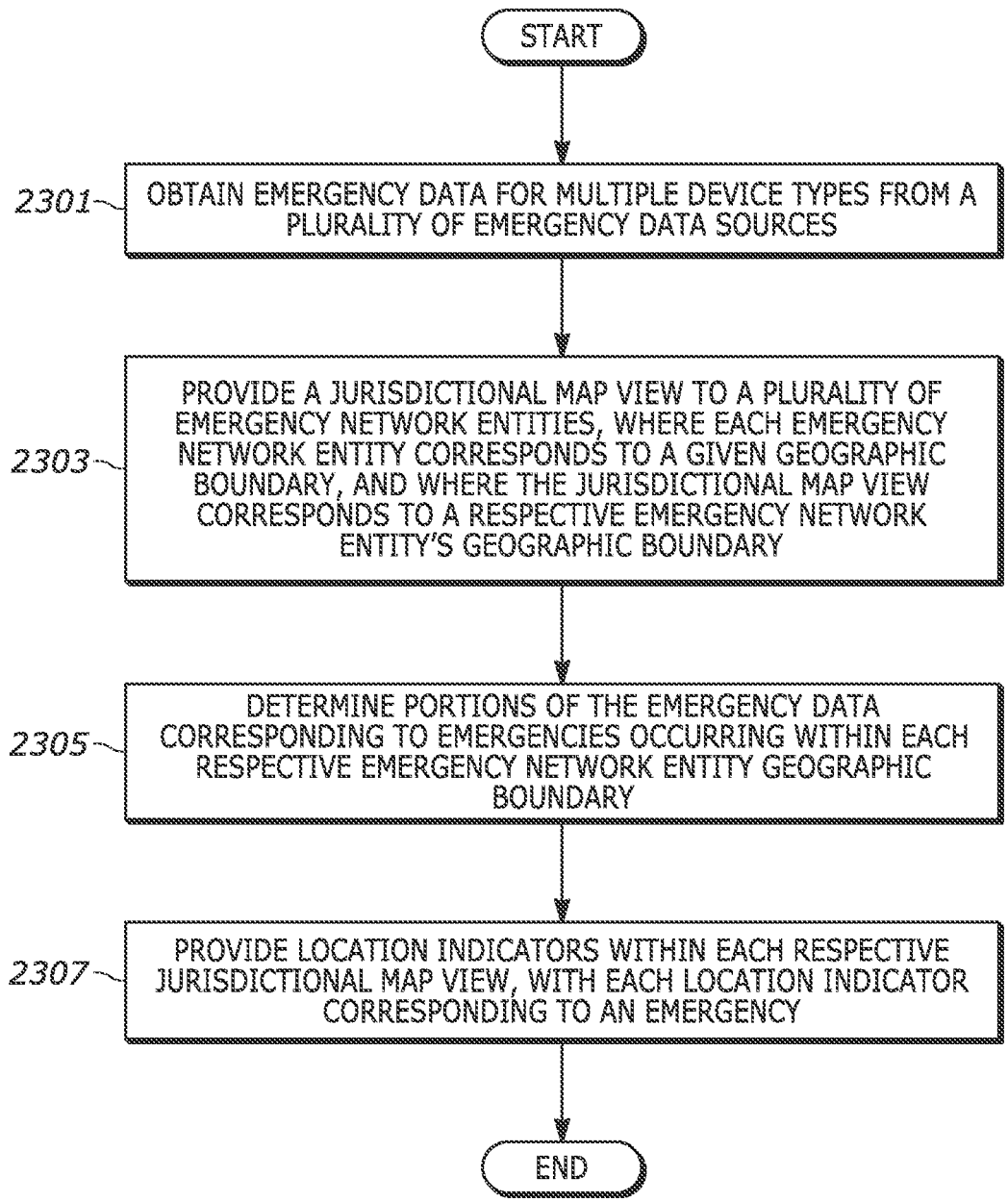
FIG. 23 is a flowchart of a method of operation.

FIG. 23 is a flowchart illustrating another method of operation. The method of operation begins, and in operation block 2301 an emergency data manager obtains emergency data for multiple device types from a plurality of emergency data sources. In operation block 2303, the emergency data manager provides a jurisdictional map view to a plurality of emergency network entities, where each emergency network entity corresponds to a given geographic boundary, and where the jurisdictional map view corresponds to a respective emergency network entity's geographic boundary. In operation block 2305, the emergency data manager determines portions of the emergency data corresponding to emergencies occurring within each respective emergency network entity geographic boundary. In operation block 2307, the emergency data manager provides location indicators within each respective jurisdictional map view, with each location indicators corresponding to an emergency. The method of operation then terminates as shown.

Figure 24:
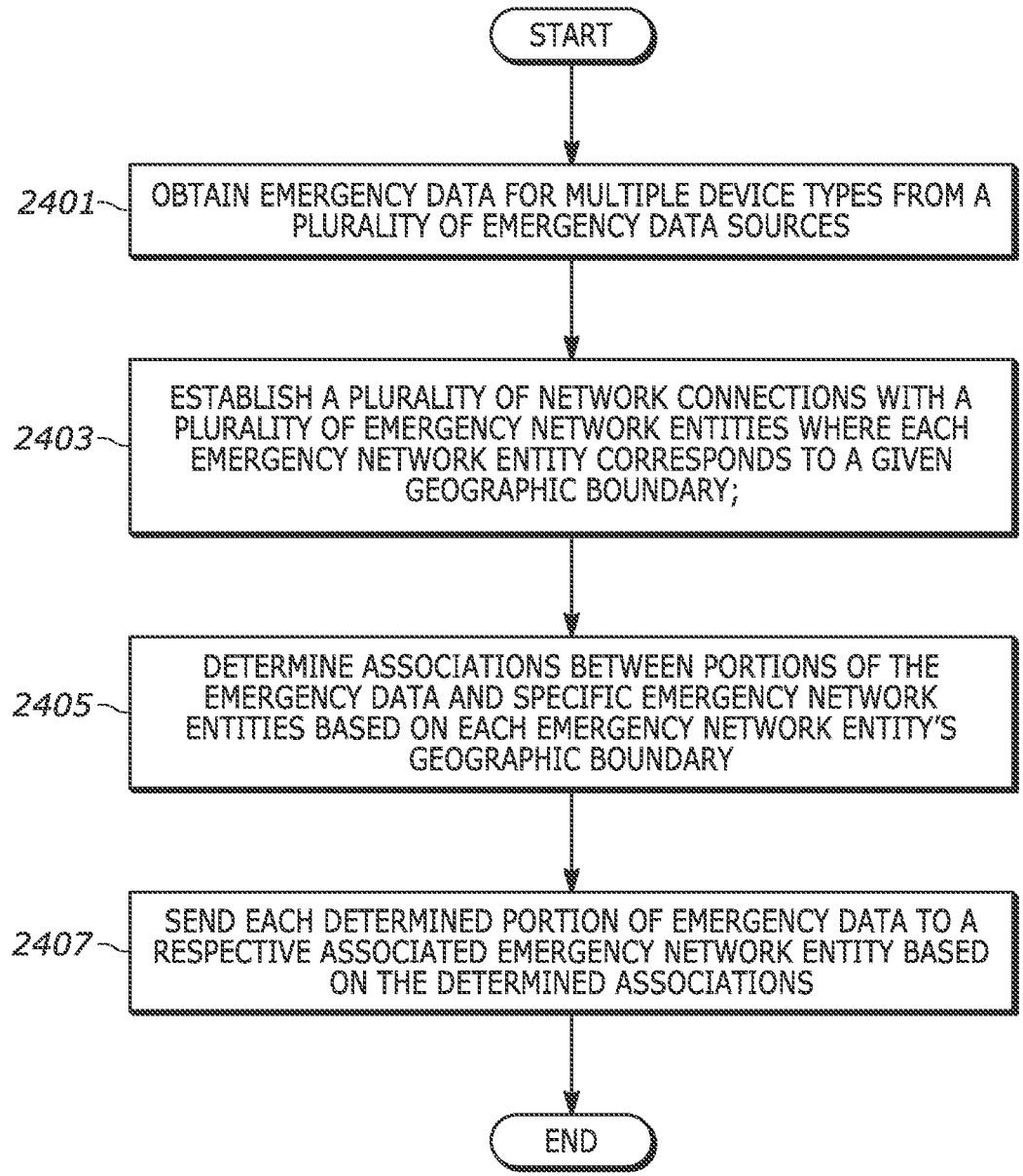
FIG. 24 is a flowchart of a method of operation.

FIG. 24 is a flowchart illustrating another method of operation. The method of operation begins, and in operation block 2401 an emergency data manager obtains emergency data for multiple device types from a plurality of emergency data sources. In operation block 2403, the emergency data manager establishes a plurality of network connections with a plurality of emergency network entities, where each emergency network entity corresponds to a given geographic boundary. In operation block 2405, the emergency data manager determines associations between portions of the emergency data and specific emergency network entities based on each emergency network entity's geographic boundary. In operation block 2407, the emergency data manager sends each determined portion of emergency data to a respective associated emergency network entity based on the determined associations. The method of operation then terminates as shown.

Various jurisdictional authorities may be represented by complex polygonal boundaries which may be displayed on a graphical user interface of an emergency services application. Emergency response logic, which may be implemented as hardware, firmware, software code, or by any combination thereof, or which may be implemented as the emergency services application, or which may be supplemental to and interacting with an emergency services application, is operative to determine complex polygonal boundaries for a plurality of emergency service providers. For example, a national system which may be displayed on the national map, may display various complex polygonal boundaries for governmental or private emergency service providers and may show the overlap of the various complex polygonal boundaries.

Additionally, some emergency service providers may exist within the boundaries of other emergency service providers. For example, a private emergency service provider may have a complex polygonal boundary within another complex polygonal boundary for a governmental emergency service provider. A graphical user interface may display a map view showing all of these relationships between the complex polygonal boundaries of the various emergency service provider jurisdictions. Additionally, the emergency service logic is operative to make decisions as to where emergency data incoming to an emergency data manager 100, should be routed based on a hierarchy or other criteria and using the complex polygonal boundaries of the various emergency service provider jurisdictions. For example, an emergency occurring in a private area such as a corporate campus or university may be routed initially to a private emergency service provider authorized to handle such emergencies within their specific polygonal boundary. However, the emergency service logic may determine that the nature of the emergency is such that a governmental emergency service provider should handle the emergency rather than the private emergency service provider. In that case, emergency data may be routed initially to the governmental provider to facilitate timely handling of the emergency. In addition, the private emergency service provider may also be notified that the emergency is occurring and that the governmental emergency service provider having jurisdiction over the location has been contacted. As one would understand, many different options may exist for how specific emergency service providers are notified regarding emergencies occurring within their jurisdictional authority defined by the polygonal boundary specific to their emergency handling area.

Operational Examples and Use Cases

The following operational examples are representative of various use cases that may be implemented using the various apparatuses, systems and methods disclosed herein.

Example 1—Jurisdiction View

"Just-in-Time," a hypothetical emergency response company, aids ESPs (e.g. public safety answering points, or "PSAPs") by gathering emergency data from a variety of sources and delivering the data directly to the public safety services. Traditionally, PSAPs are only technologically capable of receiving telephone calls (e.g., 9-1-1 emergency calls) with no additional data. Thus, when an emergency all is made to a PSAP from a mobile phone, with a dynamic and uncertain location, PSAP operators or call-takers must speak directly to the caller to determine the person's location. Unfortunately, many people involved in emergency situations are unable to articulate their location or may not even know—and even if they do, the time spent articulating their location to the PSAP operator can often be the difference between life and death. Similarly, PSAP operators are forced to respond to emergencies with little or no information about the persons involved (e.g., health data or medical histories) or context of the emergencies (e.g., type of emergency, audio/video of the surroundings, etc.). Just-in-Time understands how critical it is to quickly and accurately provide locations and situational/contextual information during emergencies to public safety services.

To aid ESPs, Just-in-Time maintains and provides an emergency data manager 100 (hereinafter, "emergency data manager 100") that receives and stores data and information from a plurality of sources, such as mobile phones and mobile applications, internet of things (IoT) devices, intelligent vehicles systems, and other electronic devices. During an emergency, the emergency data manager 100 can gather information stored within the emergency data manager 100 regarding the emergency and deliver the information to ESPs. In order to provide access to the information stored within the emergency data manager 100 to ESPs as quickly and easily as possible, Just-in-Time develops and provides an emergency response application (also referred to as jurisdiction view).

The administrator of a ESP in Georgia, Joe, learns of the helpful and potentially life-saving information stored within Just-in-Time's emergency data manager 100—such as accurate emergency locations and medical histories (hereinafter, "emergency data")—and that is automatically pushed to registered ESPs (which has authoritative jurisdiction to respond to emergencies). Accordingly, Joe registers his ESP and a set of credentials are created and activated. Joe also, uploads a shapefile containing a polygonal geofence of the authoritative jurisdiction of the ESP. The polygonal geofence is processed by determining and removing overlaps with adjacent geofences and saved as a processed GeoJSON file in a geofencing database.

Once registered, Joe then creates Nick-of-Time accounts for any number of other members of the ESP-1 to use to access the Nick-of-Time emergency response application. For example, Joe creates an account for one of the Georgia ESP call-takers, Jane. Just-in-Time then sends Jane an email including a temporary password for her to use to access the Nick-of-Time emergency response application. When Jane attempts to log into the Nick-of-Time emergency response application, in addition to checking the credentials, the Nick-of-Time emergency response application checks the IP address that Jane's login attempt was received from, and determines that the IP address is different from the IP address Joe used to register the ESP (e.g., Jane attempted to log in from a different computer within the ESP). In response, Jane's login attempt is blocked and her account is disabled. The Nick-of-Time emergency response application presents Jane with two options for requesting an access code to reactivate her account: a phone call to the ESP's non-emergency telephone number that will audibly relay the access code; or an email sent to Joe. This security method ensures that Jane is legitimately associated with the Georgia ESP, as she must either be physically present at the PSAP, receive the access code from someone who is physically present at the ESP, or receive the access code from Joe, who has been previously vetted.

Since Jane is physically present at the ESP, she chooses to receive the phone call and records the access code that is dictated by the call. She submits the access code into the Nick-of-Time emergency response application, which reactivates her account and adds her IP address to a list of authorized IP addresses. The Nick-of-Time emergency response application then presents a jurisdiction view on a computer display to Jane through the Nick-of-Time emergency response application GUI, where Jane can view a master list and/or an interactive map showing one or more ongoing and recent incidents within the jurisdiction. Jane soon receives an emergency call from a man named Eric, whose phone number is (555) 444-6666. Upon making the emergency call, Eric's smartphone automatically sends a current location (determined using the phone's hybrid location rather than just cell tower triangulation) to a third-party database, which then relays the information to the emergency data manager 100.

In addition, the emergency data manager 100 searches its records for additional information including Eric's home and work addresses, Eric's medical history, and a phone number for Eric's mother, who is listed as Eric's emergency contact. The emergency data manager 100 then uses the identifier of the Georgia ESP to retrieve the processed geofence. The emergency data manager 100 then determines whether or not Eric's current location is within the geofence. For security purposes, the emergency data manager 100 does not return emergency data to requesting parties if a current location included in the emergency data is not within a geofence associated with the requesting party. However, the emergency data manager 100 determines that Eric's current location is within the geofence provided by Joe. The emergency data manager 100 also accesses the ALI feed or CAD spill of the PSAP to locate the phone identifier corresponding to the current location for Eric's phone. Once the location has been successfully matched to the phone identifier, the emergency data manager 100 automatically pushes all of the emergency data associated with Eric's phone number to Jane to be visualized using the jurisdiction view. The jurisdiction view displays a graphical representation of Eric's current location within a map view on the GUI along with a textual description of Eric's current location (e.g., latitude and longitude) within a text box. The emergency data is already available when Jane accesses the jurisdiction view, and Jane immediately dispatches emergency help to Eric's current location.

To access the emergency data, Jane opens the jurisdiction view on the GUI which shows the interactive map. Medical data may be excluded depending on Jane's authorization to view medical information. In this example use case, Jane has received basic EMT training and is authorized to view medical data.

The graphical representation of Eric's current location is user selectable and configured to provide any additional information upon selection. Moreover, the map view is operative to show one or more data overlays visualizing additional sources of information. In this example use case, Jane has modified the settings to display the IoT sensor overlay showing sensors within a 200-meter radius of a current incident's location. Accordingly, IoT sensors within the 200-meter proximity to Eric's current location are graphically shown as an IoT sensor overlay on the interactive map. Eric communicates to Jane that the emergency is for a fire in his apartment building. Jane selects the emergency alert from the IoT sensor and marks it as a "duplicate." Jane selects a traffic camera at an intersection close to Eric's location and accesses the data feed to assess the fire. She also selects IoT temperature sensors located near Eric's location to access temperature readings. Jane then relays the information to the first responder (fire department) that has been assigned to respond to the emergency incident.

Example 2—No Emergency Call

John, a resident of southwest side of City A, which falls within the jurisdiction of an Emergency Dispatch Center, i.e. ESP-1, is driving north on Highway 49. On the way, an ice storm hits and John's car skids, goes through a barrier into a ditch. John is injured and cannot locate his phone.

Fortunately, John's car is equipped with telematics with motion sensors to detect collision by a vehicular computer. The vehicular computer has a communication system, which may be a cellular connection, a satellite connection or other wireless connection, etc., through which the alarm signal reaches a central monitoring station.

The location of the car from a built-in GPS chip was also sent to the central monitoring system. The location of the car appears to be with the jurisdictional boundary of ESP-1. A service request was sent to ESP-1, which is a primary agency with a polygonal geofence A.

The dispatchers at ESP-1 are monitoring the jurisdictional view of the ESP-1 when an alert appears with the account phone number for John. By 9:15 PM, all dispatch lines are busy responding to calls from various residents in the area including reports of patchy cellular phone coverage. From the jurisdictional display, the ESP-1 manager proactively calls John's number to see if he is an emergency. When the phone rings, John finds that the phone has fallen under the seat. He picks up the phone and confirms that he needs emergency assistance. The location of the car is available in jurisdictional view of the ESP-1, when the ESP manager clicks on the alert. First responders and a toy truck are dispatched to the exact location and John is rescued.

Example 3—ESP Update

Jane, an IT professional, is driving back home from work. On the way, she passes through the authoritative jurisdiction of two ESPs—ESP-1 (with geofence A) and ESP-2 (with geofence B). As she is about to leave geofence A, Jane sees a vehicle on fire. Jane calls 911, which routes her call to ESP-2 as she is now in geofence B. When the call taker, Susan picks up the call, she realizes that the location of the emergency might be in the jurisdiction of ESP-1 or within the buffer region. Susan zooms in and finds that the location is within geofence A. Susan chooses an option to "share data with ESP-1" and transfers the call to ESP-1.

Example 4—Small Geofence

XYZ school has taken security measures, which includes an App that the school principal and other officials have installed on their mobile phones through which an emergency notification procedure can be initiated. The location of the school including the playing fields are represented by a rectangular geofence. Two corners (latitude/longitude) are specified and saved in a GIS file.

When an emergency call is made by a student within the school, an emergency notification is received by the emergency network. The emergency network checks the location of the emergency and determines that it is within the XYZ school premises. The notification procedure for XYZ school is initiated and automated SMS notification messages are sent to specific school officials. On receiving the notification, the school principal opens up the security App and presses a button to initiate school lockdown. A belligerent student with a gun is contained within the second floor and the security officer is able to diffuse the emergency.

Example 5—Emergency Call Data Routing

"Just-in-Time," the hypothetical emergency response company from Example 1, aids ESPs (e.g. public safety answering points, or "PSAPs") by gathering emergency data from a variety of sources and delivering the data directly to the public safety services. A plurality of dispatch operators at various PSAP located across the country are logged into their respective emergency response applications on their computing workstations. Each emergency response application presents a jurisdiction view on a computer display to its operator through the emergency response application GUI, where the operator can view a master list and/or an interactive map showing one or more ongoing and recent incidents within the jurisdiction. A number of emergency calls are made from smartphones located in different PSAP jurisdictions. The smartphones send their respective GPS locations to the emergency response company server (referred to as an "emergency data manager") which associates the locations with the smartphone identifiers (e.g., their phone numbers), respectively, and stores them temporarily. Specifically, the smartphones automatically send their current locations (determined using the phone's hybrid location rather than just cell tower triangulation) to a location database, which then relays the information to the emergency data manager 100. Each emergency call is routed to the PSAP that corresponds to the geographic boundary delineating the PSAP's jurisdiction or area of responsibility for emergency services.

For each emergency call, the emergency data manager 100 searches its records for additional information including the caller's home and work addresses, medical history, and a phone number for the caller's emergency contact. The emergency data manager 100 then uses the identifier of the PSAP to retrieve the processed geofence having the geographic boundary delineating the PSAP's area of responsibility. The emergency data manager 100 then determines whether or not the caller's current location is within the geofence. When the emergency data manager 100 determines that the caller's current location is within the processed geofence. The emergency data manager 100 also accesses the ALI feed or CAD spill of the PSAP to locate the phone identifier corresponding to the current location for Eric's phone. Once the location has been successfully matched to the phone identifier, the emergency data manager 100 automatically pushes all of the emergency data associated with Eric's phone number to the operator to be visualized using the jurisdiction view. The jurisdiction view displays a graphical representation of the caller's current location within a map view on the GUI along with a textual description of the caller's current location (e.g., latitude and longitude) within a text box. The emergency data is already available when the operator accesses the jurisdiction view, allowing the operator to immediately dispatch emergency help to the caller's current location.

In addition, the jurisdiction view optionally shows information for other emergencies in the PSAP's jurisdiction. The jurisdiction view shows a historical list of emergency calls within the past 20 minutes sorted by time of the call. The map view shows ongoing emergencies on the map with graphical representations of the current locations of the callers. This graphical view allows the operator to determine when multiple emergency calls may be related to the same emergency, e.g., when the map shows multiple ongoing emergency calls clustered close together.

Example 6—Emergency Type Determination

"Just-in-Time," emergency data manager may be used to determine the appropriate ESP to respond to an emergency, and determine a specific geofence for a specific emergency where a single ESP may have multiple geofences. For example, specific emergency data (e.g., health sensor data, etc.) obtained by the emergency data manager may indicate a medical emergency. The emergency data manager will determine the specific geofence that will be used by the ESP for the response. For example, the ESP may have a defined geofence specifically for medical emergencies. Additionally, other factors such as, but not limited to, the proximity of the accident to the national highway etc. may also be used by the emergency data manager to determine which specific geofence should apply.

Various other use cases may be contemplated by one of ordinary skill in light of the various embodiments and various examples disclosed herein. While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
providing a plurality of jurisdictional map views to a plurality of emergency network entities, each jurisdictional map view corresponding to an emergency network entity's respective geographic boundary, and having emergency alerts and emergency data associated with the emergency alerts within each emergency network entity's respective geographic boundary, as the emergency alerts are received;
determining portions of emergency data corresponding to emergencies occurring within each emergency network entity's respective geographic boundary; and
providing a plurality of location indicators within each respective jurisdictional map view, with each location indicator corresponding to an emergency.

2. The method of claim 1, further comprising:
providing a regional jurisdictional map view to a regional emergency network entity, the regional emergency network entity corresponding to a given regional geographic boundary incorporating subordinate emergency network entity geographic boundaries.

3. The method of claim 1, further comprising:
determining at least one complex polygon as an emergency network entity's geographic boundary; and providing a buffer zone defining an expanded boundary, in the jurisdictional map view.

4. The method of claim 1, further comprising:
determining associations between portions of the emergency data and specific emergency network entities based on each emergency network entity's geographic boundary; and
providing the location indicators based on the associations.

5. The method of claim 4, further comprising:
establishing a plurality of network connections with the plurality of emergency network entities; and
sending determined portions of the emergency data to a respective associated emergency network entity based on the associations.

6. The method of claim 1, further comprising:
obtaining the emergency data from a plurality of emergency data sources.

7. A method comprising:
establishing a plurality of network connections with a plurality of emergency network entities, each emergency network entity corresponding to a given geographic boundary defined by at least one geofence;
determining associations between portions of emergency data and specific emergency network entities based on each emergency network entity's geographic boundary and corresponding at least one geofence;
sending each determined portion of emergency data to a respective associated emergency network entity based on the determined associations; and
providing a jurisdictional map view to each emergency network entity, the jurisdictional map view corresponding to a respective emergency network entity's geographic boundary, where a determined portion of emergency data corresponding to the respective emergency network entity is related to emergencies occurring within a displayed geographic boundary.

8. The method of claim 7, further comprising:
providing a regional jurisdictional map view to a regional emergency network entity, the regional emergency network entity corresponding to a given regional geographic boundary incorporating subordinate emergency network entity geographic boundaries.

9. The method of claim 7, further comprising:
displaying a selectable list of the emergencies occurring within the displayed geographic boundary.

10. The method of claim 7, further comprising:
showing location indicators within the jurisdictional map view, with each location indicator corresponding to an emergency.

11. The method of claim 10, further comprising:
providing a selectable link corresponding to each location indicator within the jurisdictional map view; and
providing emergency data related to an emergency at a location corresponding to the location indicator, in response to selection input via the selectable link.

12. The method of claim 7, wherein determining associations between portions of the emergency data and specific emergency network entities based on each emergency network entity's geographic boundary, comprises:
determining at least one complex polygon as an emergency network entity's geographic boundary;
providing buffer zones defining expanded boundaries for each of the emergency network entities; and determining associations between portions of the emergency data and specific emergency network entities based on each emergency network entity's expanded boundary.

13. The method of claim 7, wherein establishing a plurality of network connections with a plurality of emergency network entities:
   establishing a transport control protocol (TCP) connection with the plurality of emergency network entities.

14. The method of claim 10, further comprising:
   obtaining emergency data related to the emergency at the location corresponding to the location indicator comprising an estimated address, longitude and latitude coordinates, an indicator of location accuracy, or any combination thereof.

15. The method of claim 11, wherein obtaining an indicator of location accuracy comprises:
   obtaining the indicator of location accuracy comprising an uncertainty radius.

16. An apparatus comprising:
   a network component, operative to connect to the Internet;
   a processor, operatively coupled to the network component, the processor operative to:
   provide a plurality of jurisdictional map views to a plurality of emergency network entities, each jurisdictional map view corresponding to an emergency network entity's respective geographic boundary, and having emergency alerts and emergency data associated with the emergency alerts within each emergency network entity's respective geographic boundary, as the emergency alerts are received;
   determine portions of emergency data corresponding to emergencies occurring within each emergency network entity's respective geographic boundary; and
   provide a plurality of location indicators within each respective jurisdictional map view, with each location indicator corresponding to an emergency.

17. The apparatus of claim 16, wherein the processor is further operative to:
   provide a regional jurisdictional map view to a regional emergency network entity, the regional emergency network entity corresponding to a given regional geographic boundary incorporating subordinate emergency network entity geographic boundaries.

18. The apparatus of claim 16, wherein the processor is further operative to:
   determine at least one complex polygon as an emergency network entity's geographic boundary; and
   provide a buffer zone defining an expanded boundary, in the jurisdictional map view.

19. The apparatus of claim 16, wherein the processor is further operative to:
   determine associations between portions of the emergency data and specific emergency network entities based on each emergency network entity's geographic boundary; and
   provide the location indicators based on the associations.

20. The apparatus of claim 19, wherein the processor is further operative to:
   establish a plurality of network connections with the plurality of emergency network entities; and
   send determined portions of the emergency data to a respective associated emergency network entity based on the associations.

21. The apparatus of claim 16, wherein the processor is further operative to:
   obtain emergency data from a plurality of emergency data sources.

22. An apparatus comprising:
   a network component, operative to connect to the Internet;
   a processor, operatively coupled to the network component, the processor operative to:
   establish a plurality of network connections with a plurality of emergency network entities, each emergency network entity corresponding to a given geographic boundary defined by at least one geofence;
   determine associations between portions of emergency data and specific emergency network entities based on each emergency network entity's geographic boundary and corresponding at least one geofence;
   send each determined portion of emergency data to a respective associated emergency network entity based on the determined associations; and
   provide a jurisdictional map view to each emergency network entity, the jurisdictional map view corresponding to a respective emergency network entity's geographic boundary, where a determined portion of emergency data corresponding to the respective emergency network entity is related to emergencies occurring within a displayed geographic boundary.

23. The apparatus of claim 22, wherein the processor is further operative to:
   provide a regional jurisdictional map view to a regional emergency network entity, the regional emergency network entity corresponding to a given regional geographic boundary incorporating subordinate emergency network entity geographic boundaries.

24. The apparatus of claim 22, wherein the processor is further operative to:
   show location indicators within the jurisdictional map view, with each location indicator corresponding to an emergency.

25. The apparatus of claim 24, wherein the processor is further operative to:
   provide a selectable link corresponding to each location indicator within the jurisdictional map view; and
   provide emergency data related to an emergency at a location corresponding to the location indicator, in response to selection input via the selectable link.

26. The apparatus of claim 22, wherein the processor is further operative to:
   obtain emergency data for multiple device types from a plurality of emergency data sources.

27. The apparatus of claim 24, wherein the processor is further operative to:
   obtain emergency data related to the emergency at the location corresponding to the location indicator comprising an estimated address, longitude and latitude coordinates, an indicator of location accuracy, or any combination thereof.

28. The apparatus of claim 27, wherein the processor is further operative to:
   obtain the indicator of location accuracy comprising an uncertainty radius.

* * * * *